US012256238B2

(12) United States Patent
Ji et al.

(10) Patent No.: US 12,256,238 B2
(45) Date of Patent: Mar. 18, 2025

(54) METHOD AND APPARATUS FOR CONFIGURING DEFAULT BEAM FOR NETWORK COOPERATIVE COMMUNICATION

(71) Applicant: Samsung Electronics Co., Ltd., Suwon-si (KR)

(72) Inventors: Hyoungju Ji, Suwon-si (KR); Jinhyun Park, Suwon-si (KR); Hoondong Noh, Suwon-si (KR); Youngrok Jang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 17/779,849

(22) PCT Filed: Nov. 24, 2020

(86) PCT No.: PCT/KR2020/016697
§ 371 (c)(1),
(2) Date: May 25, 2022

(87) PCT Pub. No.: WO2021/107564
PCT Pub. Date: Jun. 3, 2021

(65) Prior Publication Data
US 2023/0023719 A1    Jan. 26, 2023

Related U.S. Application Data

(60) Provisional application No. 62/939,811, filed on Nov. 25, 2019.

(30) Foreign Application Priority Data

Feb. 10, 2020    (KR) .................. 10-2020-0015435

(51) Int. Cl.
H04W 16/28    (2009.01)
H04W 72/02    (2009.01)
(Continued)

(52) U.S. Cl.
CPC ........... *H04W 16/28* (2013.01); *H04W 72/02* (2013.01); *H04W 72/046* (2013.01); *H04W 72/21* (2023.01)

(58) Field of Classification Search
CPC ..... H04W 16/28; H04W 72/02; H04W 72/21; H04W 72/046
See application file for complete search history.

(56) References Cited

U.S. PATENT DOCUMENTS 10,986,616 B2    4/2021    Kim et al.
2019/0230730 A1    7/2019    Wang et al.
(Continued)

FOREIGN PATENT DOCUMENTS

CN    110024344 A    7/2019
KR    10-2021-0045884 A    4/2021
WO    2019/195814 A1    10/2019

OTHER PUBLICATIONS

Apple Inc., 'Remaining Issues on Multi-beam operation', R1-1912824, 3GPP TSG RAN WG1 Meeting #99, Reno, USA, Nov. 9, 2019.
(Continued)

*Primary Examiner* — Melanie Jagannathan
(74) *Attorney, Agent, or Firm* — Jefferson IP Law, LLP

(57) ABSTRACT

The present disclosure relates to a communication technique for combining an IoT technology with a 5G communication system for supporting a higher data transmission rate than a 4G system, and a system therefor. The present disclosure can be applied to intelligent services (for example, smart homes, smart buildings, smart cities, smart cars or connected cars, healthcare, digital education, small businesses, security- and (Continued)

safety-related services, and the like) on the basis of a 5G communication technology and an IoT-related technology. The present disclosure discloses a method and apparatus for transmitting control information by a terminal for cooperative communication between a plurality of transmission points/panels/beams.

15 Claims, 28 Drawing Sheets

(51) Int. Cl.
*H04W 72/044* (2023.01)
*H04W 72/21* (2023.01)

(56) References Cited

U.S. PATENT DOCUMENTS

| | | | | |
|---|---|---|---|---|
| 2019/0297547 | A1* | 9/2019 | Tsai | H04W 72/046 |
| 2020/0195334 | A1* | 6/2020 | Zhou | H04B 7/088 |
| 2020/0314860 | A1* | 10/2020 | Zhou | H04W 72/23 |
| 2021/0243659 | A1* | 8/2021 | Cirik | H04L 5/0048 |
| 2021/0367655 | A1* | 11/2021 | Jiang | H04B 7/0691 |
| 2021/0377825 | A1* | 12/2021 | Deenoo | H04W 36/322 |
| 2021/0410124 | A1* | 12/2021 | Chen | H04W 72/0453 |
| 2022/0086769 | A1* | 3/2022 | Guo | H04W 52/146 |
| 2022/0109541 | A1* | 4/2022 | Cirik | H04B 7/06966 |
| 2022/0158783 | A1* | 5/2022 | Matsumura | H04L 5/0032 |
| 2022/0224470 | A1* | 7/2022 | Matsumura | H04B 7/0404 |
| 2022/0279450 | A1* | 9/2022 | Zhang | H04B 7/0695 |
| 2022/0345903 | A1* | 10/2022 | Liu | H04L 5/0053 |
| 2023/0041109 | A1* | 2/2023 | Ling | H04L 5/0023 |
| 2023/0403108 | A1* | 12/2023 | Grossmann | H04L 5/001 |

OTHER PUBLICATIONS

Oppo, 'Discussion on Multi-beam Operation Enhancements', R1-1910117, 3GPP TSG RAN WG1 Meeting #98bis, Chongqing, China, Oct. 4, 2019.
CATT, 'Remaining issues on multi-beam enhancements', R1-1912177, 3GPP TSG RAN WG1 Meeting #99, Reno, USA, Nov. 9, 2019.
Lenovo et al., 'Discussion of multi-beam operation', R1-1912317, 3GPP TSG RAN WG1 Meeting #99, Reno, USA, Nov. 8, 2019.
3GPP TSG-RAN WG1 Meeting #98bis, R1-1911143 Chongqing, China, Oct. 14-20, 2019 Oct. 5, 2019.
Apple Inc, "Remaining Issues on Multi-beam operation", 3rd Generation Partnership Project (3GPP) Draft; R1-2008437, 3GPP, Mobile Competence Centre ; 650, Route Des, Lucioles ; F-06921 Sophia-Antipolis Cedex; France Vol. RAN WG1, No. e-Meeting; Oct. 26, 2020-Nov. 13, 2020 Oct. 17, 2020 (Oct. 17, 2020), XP051940151.
European Search Report dated Mar. 20, 2023, issued in European Application No. 20891480.4.
Vivo, R1-1910230 "Discussion on remaining issues on multi beam enhancement", 3GPP tsg_ran\wg1_rl1,tsgr1_98b, Oct. 4, 2019.
Chinese Office Action dated Aug. 16, 2024, issued in Chinese Application No. 202080081974.0.

* cited by examiner

| R | Serving Cell ID | BWP ID | | Oct 1 |
| $T_7$ | $T_6$ | $T_5$ | $T_4$ | $T_3$ | $T_2$ | $T_1$ | $T_0$ | Oct 2 |
| $T_{15}$ | $T_{14}$ | $T_{13}$ | $T_{12}$ | $T_{11}$ | $T_{10}$ | $T_9$ | $T_8$ | Oct 3 |

. . .

| $T_{(N-2)\times8+7}$ | $T_{(N-2)\times8+6}$ | $T_{(N-2)\times8+5}$ | $T_{(N-2)\times8+4}$ | $T_{(N-2)\times8+3}$ | $T_{(N-2)\times8+2}$ | $T_{(N-2)\times8+1}$ | $T_{(N-2)\times8}$ | Oct N |

15-50

| Serving Cell ID | CORESET ID | Oct 1 |
| CORESET ID | TCI state ID | Oct 2 |

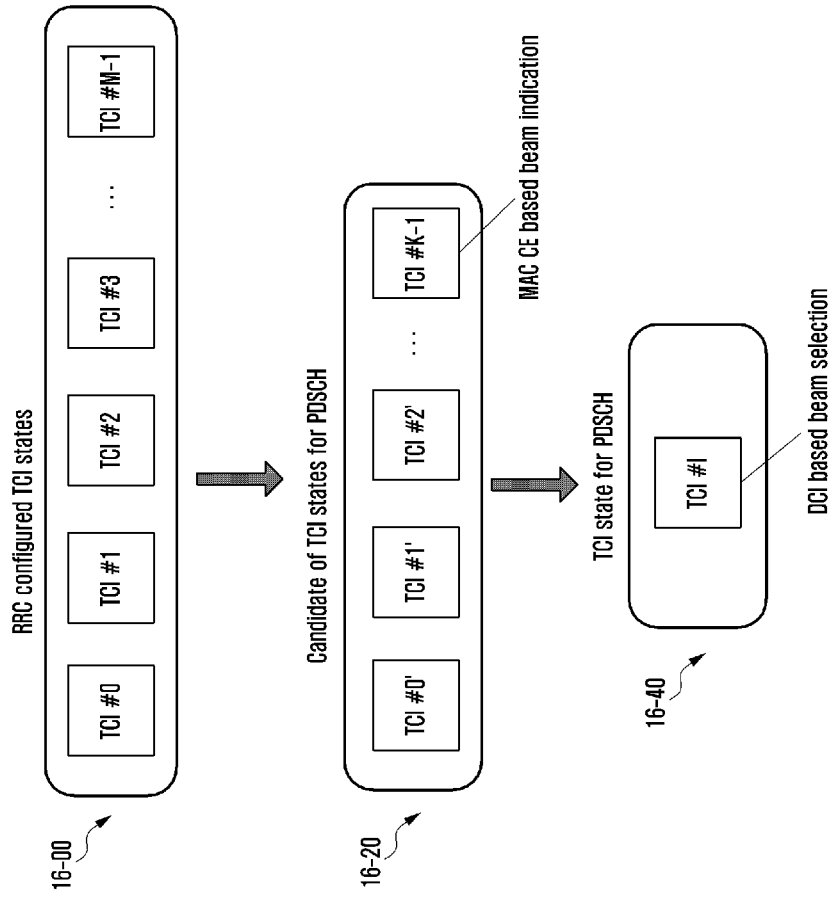

METHOD AND APPARATUS FOR CONFIGURING DEFAULT BEAM FOR NETWORK COOPERATIVE COMMUNICATION

CROSS-REFERENCE TO RELATED APPLICATION(S)

This application is a U.S. National Stage application under 35 U.S.C. § 371 of an International application number PCT/KR2020/016697, filed on Nov. 24, 2020, which is based on and claims priority of a U.S. Provisional application Ser. No. 62/939,811, filed on Nov. 25, 2019, in the U.S. Patent and Trademark Office, and of a Korean patent application number 10-2020-0015435, filed on Feb. 10, 2020, in the Korean Intellectual Property Office, the disclosure of which is incorporated by reference herein in its entirety.

TECHNICAL FIELD

The disclosure relates to a wireless communication system and, more particularly, to a method and an apparatus for transmitting control information for cooperative communication between multiple transmission points (TPs)/panels/beams by a user equipment (UE) through multiple transmission points/panels/beams.

BACKGROUND ART

To meet the demand for wireless data traffic having increased since deployment of 4G communication systems, efforts have been made to develop an improved 5G or pre-5G communication system. Therefore, the 5G or pre-5G communication system is also called a "Beyond 4G Network" communication system or a "Post LTE" system. The 5G communication system defined by 3GPP is called a "New Radio (NR) system".

The 5G communication system is considered to be implemented in ultrahigh frequency (mmWave) bands (e.g., 60 GHz bands) so as to accomplish higher data rates. To decrease propagation loss of the radio waves and increase the transmission distance in the ultrahigh frequency bands, beamforming, massive multiple-input multiple-output (massive MIMO), full dimensional MIMO (FD-MIMO), array antenna, analog beam forming, large scale antenna techniques have been discussed in 5G communication systems and applied to the NR system.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid FSK and QAM modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have also been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, machine type communication (MTC), and machine-to-machine (M2M) communication may be implemented by beamforming, MIMO, and array antennas. Application of a cloud radio access network (cloud RAN) as the above-described big data processing technology may also be considered an example of convergence of the 5G technology with the IoT technology.

According to the recent development of communication systems, various research on beam-based cooperative communication has been conducted.

DISCLOSURE

Technical Problem

The disclosure provides a method by which a UE transmits control information through a plurality of transmission points/panels/beams for network cooperative communication (network coordination) in a wireless communication system.

Technical Solution

A method of performing transmission by a UE in a wireless communication according to an embodiment of the disclosure includes: identifying index information related to a control region corresponding to downlink control information for scheduling downlink data; identifying a default beam corresponding to the index information related to the control region; and transmitting uplink control information for the downlink data to a base station (BS) using the default beam.

A method of performing reception by a BS in a wireless communication according to an embodiment of the disclosure includes: transmitting downlink control information for scheduling downlink data; identifying a default beam corresponding to index information related to a control region for transmitting the downlink control information; and receiving uplink control information for the downlink data from a UE using the default beam.

A UE in a wireless communication system according to an embodiment of the disclosure includes a transceiver and a controller configured to perform control to identify index information related to a control region corresponding to downlink control information for scheduling downlink data, identify a default beam corresponding to the index information related to the control region, and transmit uplink control information for the downlink data to a BS using the default beam.

A BS in a wireless communication system according to an embodiment of the disclosure includes a transceiver and a controller configured to perform control to transmit downlink control information for scheduling downlink data, identify a default beam corresponding to index information related to a control region for transmitting the downlink control information, and receive uplink control information for the downlink data from a UE using the default beam.

Advantageous Effects

According to the disclosure, when network cooperative communication is used in a wireless communication system, a default value of a transmission point/panel/beam for transmitting control information by the UE is pre-appointed, and thus overhead for configuring the transmission point/panel/beam for each piece of the control information can be reduced.

DESCRIPTION OF DRAWINGS

FIG. 15 illustrates a structure of a medium access control (MAC) control element (CE) for transmission configuration indicator (TCI) state activation of a UE-specific physical downlink control channel (PDCCH) according to an embodiment of the disclosure.

FIG. 16 illustrates an example of a configuration of TCI states according to an embodiment of the disclosure.

MODE FOR INVENTION

Figure 1:
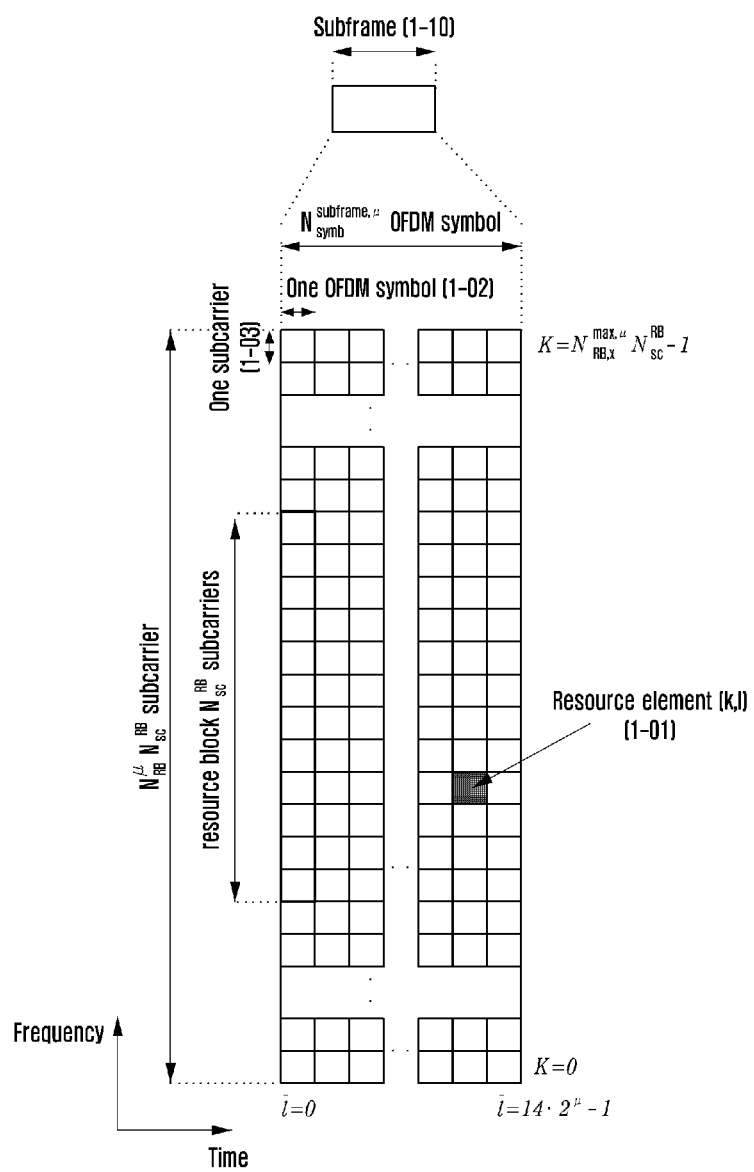
FIG. 1 illustrates the basic structure of time-frequency resources in a wireless communication system according to an embodiment of the disclosure.

Hereinafter, embodiments of the disclosure will be described in detail with reference to the accompanying drawings.

In describing the embodiments, descriptions related to technical contents well-known in the art and not associated directly with the disclosure will be omitted. Such an omission of unnecessary descriptions is intended to prevent obscuring of the main idea of the disclosure and more clearly transfer the main idea.

For the same reason, in the accompanying drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose the disclosure and inform those skilled in the art of the scope of the disclosure, and the disclosure is defined only by the scope of the appended claims. Throughout the specification, the same or like reference numerals designate the same or like elements.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

As used herein, the "unit" refers to a software element or a hardware element, such as a Field Programmable Gate Array (FPGA) or an Application Specific Integrated Circuit (ASIC), which performs a predetermined function. However, the "unit" does not always have a meaning limited to software or hardware. The "unit" may be constructed either to be stored in an addressable storage medium or to execute one or more processors. Therefore, the "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may be either combined into a smaller number of elements, or a "unit", or divided into a larger number of elements, or a "unit". Moreover, the elements and "units" or may be implemented to reproduce one or more CPUs within a device or a security multimedia card. Further, the "unit" in the embodiments may include one or more processors.

Hereinafter, the operation principle of the disclosure will be described in detail with reference to the accompanying drawings. In the following description of the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification. In the following description, a base station is an entity that allocates resources to terminals, and may be at least one of a gNode B, an eNode B, a Node B, a base station (BS), a wireless access unit, a base station controller, and a node on a network. A terminal may include a user equipment (UE), a mobile station (MS), a cellular phone, a smartphone, a computer, or a multimedia system capable of performing communication functions. Of course, examples of the base station and the terminal are not limited thereto. The following description of the disclosure is directed to technology for receiving broadcast information from a base station by a terminal in a wireless communication system. The disclosure relates to a communication technique for converging Internet of Things (IoT) technology with a 5th generation (5G) communication system designed to support a higher data transfer rate beyond the 4th generation (4G) system, and a system therefor. The disclosure may be applied to intelligent services (e.g., smart homes, smart buildings, smart cities, smart cars or connected cars, healthcare, digital education, retail business, security and safety-related services, etc.) on the basis of 5G communication technology and IoT-related technology.

In the following description, terms referring to broadcast information, terms referring to control information, terms related to communication coverage, terms referring to state changes (e.g., an event), terms referring to network entities, terms referring to messages, terms referring to device elements, and the like are illustratively used for the sake of convenience. Therefore, the disclosure is not limited by the terms as used below, and other terms referring to subjects having equivalent technical meanings may be used.

In the following description, some of terms and names defined in the 3rd generation partnership project long term evolution (3GPP LTE) standards may be used for the convenience of description. However, the disclosure is not limited by these terms and names, and may be applied in the same way to systems that conform other standards.

A wireless communication system has developed into a broadband wireless communication system that provides a high-speed and high-quality packet data service according to communication standards such as high-speed packet access (HSPA) of 3GPP, long-term evolution (LTE) or evolved universal terrestrial radio access (E-UTRA), LTE-advanced (LTE-A), LTE-Pro, high rate packet data (HRPD) of 3GPP2, ultra mobile broadband (UMB), and 802.16e of IEEE beyond the initially provided voice-based service.

In an LTE system, which is a representative example of broadband wireless communication systems, a downlink (DL) adopts an orthogonal frequency division multiplexing (OFDM) scheme and an uplink (UL) adopts a single-carrier frequency division multiple access (SC-FDMA) scheme. The uplink is a radio link through which a user equipment (UE) (or a mobile station (MS)) transmits data or a control signal to a base station (BS) (or an eNode B), and the downlink is a radio link through which the BS transmits data or a control signal to the UE. In such a multi-access scheme, time-frequency resources for carrying data or control information are allocated and operated in a manner to prevent overlapping of resources, that is, to establish orthogonality, between users so as to identify data or control information of each user.

A post-LTE communication system, that is, a 5G communication system, should be able to freely reflect various requirements of a user and a service provider, and thus it is required to support a service which satisfies the various requirements. Services which are considered for the 5G communication system include enhanced mobile broadband (eMBB), massive machine type communication (mMTC), ultra reliability low latency communication (URLLC), and the like.

According to some embodiments, the eMBB aims to provide a data transmission rate that is improved so as to surpass the data transmission rate supported by LTE, LTE-A, or LTE-Pro. For example, in the 5G communication system, the eMBB should provide a peak downlink data rate of 20 Gbps and a peak uplink data rate of 10 Gbps from the viewpoint of one BS. Simultaneously, the eMBB should provide an increased user-perceived data rate of the UE. In order to satisfy these requirements, improvement of various transmission/reception technologies, including a further improved multi-input multi-output (MIMO) transmission technology, is needed. Further, a data transmission rate required by the 5G communication system can be satisfied through the use of a frequency bandwidth wider than 20 MHz in a frequency band from 3 to 6 GHz or a frequency band higher than or equal to 6 GHz instead of a band of 2 GHz used by current LTE.

Also, in order to support an application service such as the Internet of Things (IoT), mMTC is considered in the 5G communication system. The mMTC may be required to support access by massive numbers of UEs within a cell, improve coverage of the UE, increase a battery lifetime, and reduce the costs of the UE in order to efficiently provide IoT. IoT is attached to various sensors and devices to provide communication, and thus should support a large number of UEs (for example, 1,000,000 UEs/km$^2$) within the cell. Since the UE supporting the mMTC is highly likely to be located in a shaded area, such as a basement of a building, which a cell cannot cover due to service characteristics, the mMTC may require wider coverage than other services provided by the 5G communication system. The UE supporting the mMTC needs to be produced at low cost and it is difficult to frequently exchange a battery thereof, so that a very long battery lifetime may be required.

Last, the URLLC is a mission-critical cellular-based wireless communication service, which is used for remote control of a robot or machinery, industrial automation, a unmanned aerial vehicle, remote health care, emergency alert, and the like, and should provide ultra-low latency and ultra-high reliable communication. For example, services supporting the URLLS should satisfy a radio access delay time (air interface latency) shorter than 0.5 milliseconds and also have requirements of a packet error rate equal to or smaller than 10-5. Accordingly, for services supporting the URLLC, the 5G system should provide a transmit time interval (TTI) smaller than that of other systems and also has design requirements of allocating wide resources in a frequency band. However, the mMTC, the URLLC, and the eMBB are only different types of service, but service types to which the disclosure is applied are not limited thereto.

Services considered in the 5G communication system should be combined and provided on the basis of one framework. That is, in order to efficiently manage and control resources, it is preferable to perform control and transmission such that the services are integrated into one system rather than to independently operate the services.

Hereinafter, an embodiment of the disclosure is described on the basis of an LTE, LTE-A, LTE Pro, or NR system by way of example, but the embodiment of the disclosure can be applied to other communication systems having a similar technical background or channel form. In addition, the embodiment of the present disclosure may be applied to other communication systems through some modifications without departing from the scope of the present disclosure based on the determination of those skilled in the art.

The disclosure relates to a method and an apparatus for reporting channel state information to increase power saving efficiency of the UE in a wireless communication system.

According to the disclosure, when the UE operates in a power saving mode in a wireless communication system, it is possible to further improve power saving efficiency by optimizing a channel state information reporting method according to the power saving mode.

Hereinafter, the frame structure of the 5G system will be described in more detail with reference to the drawings.

FIG. 1 illustrates the basic structure of time-frequency resources in a wireless communication system according to an embodiment of the disclosure.

Referring to FIG. 1, the horizontal axis indicates a time domain and the vertical axis indicates a frequency domain in FIG. 1. A basic unit of resources in the time and frequency domains is a resource element (RE) 1-01 and may be defined as 1 orthogonal frequency division multiplexing (OFDM) symbol 1-02 in the time axis and 1 subcarrier 1-03 in the frequency axis. In the frequency domain, N_sc^RB (for example, 12) successive REs may be included in one resource block (RB) 1-04. In an embodiment, a plurality of OFDM symbols may be included in one subframe 1-10.

Figure 2:
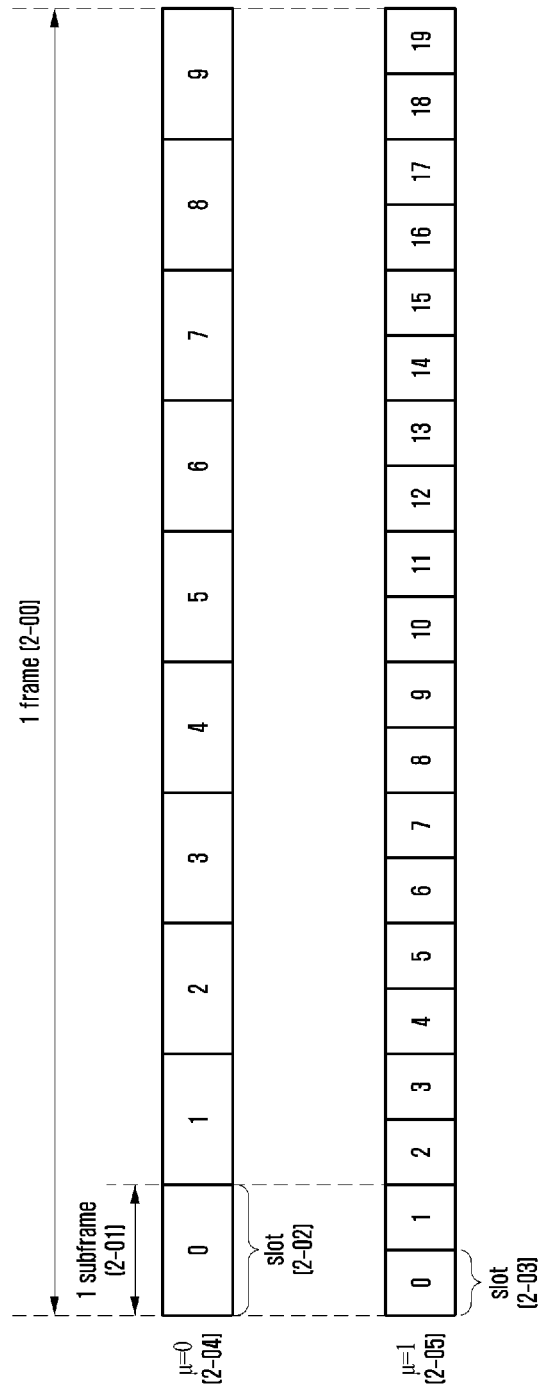
FIG. 2 illustrates the structure of a frame, a subframe, and a slot in a wireless communication system according to an embodiment of the disclosure.

FIG. 2 illustrates the structure of a frame, a subframe, and a slot in a wireless communication system according to an embodiment of the disclosure.

Referring to FIG. 2, one frame 2-00 may include one or more subframes 2-01, and one subframe may include one or more slots 2-02. For example, one frame 2-00 may be defined as 10 ms. One subframe 2-01 may be defined as 1 ms in which case one frame 2-00 may include a total of 10 subframes 2-01. One slot 2-02 or 2-03 may be defined as 14 OFDM symbols (that is, the number symbols $N_{symb}^{slot}$ per slot is 14). One subframe 2-01 may include one or a plurality of slots 2-02 and 2-03, and the number of slots 2-02 and 2-03 per subframe 2-01 may vary depending on configuration values μ2-04 and 2-05 for subcarrier spacing. In the example of FIG. 2, the cases in which the subcarrier configuration value is μ=0 2-04 and μ=1 2-05 are illustrated. One subframe 2-01 may include one slot 2-02 in the case of μ=0 2-04, and one subframe 2-01 may include two slots 2-03 in the case of μ=1 2-05. That is, the number of slots $N_{slot}^{subframe,\mu}$ per subframe may vary depending on the configuration value μ for subcarrier spacing, and the number of slots $N_{slot}^{frame,\mu}$ per frame may vary depending thereon. $N_{slot}^{subframe,\mu}$ and $N_{slot}^{frame,\mu}$ according to the subcarrier spacing configuration μ may be defined as shown in Table 1 below.

TABLE 1

| μ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

In NR, one component carrier (CC) or serving cell may include a maximum of 250 RBs. Accordingly, when the UE always receives entire serving cell bandwidths like in LTE, power consumption of the UE may be very large, and thus in order to solve the problem, the BS may configure one or more bandwidth parts (BWPs) in the UE and support the UE to change a reception area within the cell. In NR, the BS may configure an 'initial BWP' which is a bandwidth of CORESET #0 (or common search space (CSS)) in the UE through a master information block (MIB). Thereafter, the BS may configure a first BWP of the UE through radio resource control (RRC) signaling and notify of one or more pieces of BWP configuration information which can be indicated through downlink control information (DCI) in the future. Accordingly, the BS may indicate which band will be used by the UE by notifying of a BWP ID through DCI. When the UE does not receive the DCI in the currently allocated BWP for a specific time or longer, the UE may return to a 'default BWP' and attempt reception of the DCI.

Figure 3:
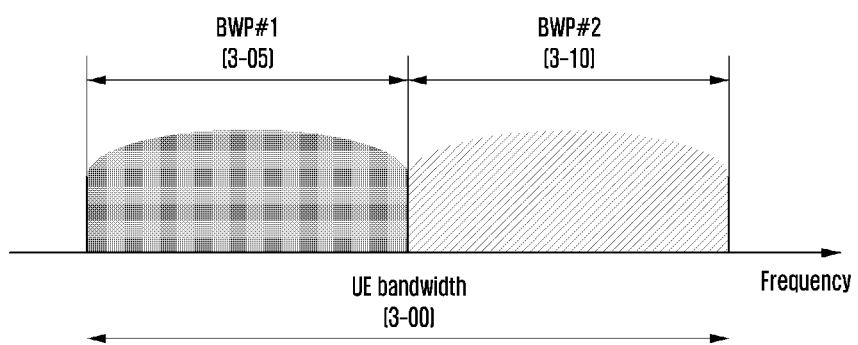
FIG. 3 illustrates an example of a configuration for a bandwidth part (BWP) in a wireless communication system according to an embodiment of the disclosure.

FIG. 3 illustrates an example of a configuration for a bandwidth part (BWP) in a wireless communication system according to an embodiment of the disclosure.

Referring to FIG. 3, FIG. 3 illustrates an example in which a UE bandwidth 3-00 is configured as two BWPs, that is, BWP #1 3-05 and BWP #2 3-10. The BS may configure one or a plurality of BWPs in the UE and configure information shown in Table 2 below for each BWP.

TABLE 2

| BWP::= | SEQUENCE{ |
|---|---|
| bwp-Id | BWP-Id |
| (BWP identifier) | |
| locationAndBandwidth | INTEGER(1..65536), |
| (BWP location) | |
| subcarrierSpacing | ENUMERATED{n0, n1, n2, n3, n4, n5} |
| (subcarrier spacing) | |
| cyclicPrefix | ENUMERATED{extended} |
| (cyclic prefix) | |
| } | |

Of course, the disclosure is not limited to the example, and various parameters related to the BWP as well as the configuration information may be configured in the UE. The information may be transferred to the UE by the BS through higher-layer signaling, for example, RRC signaling. Among one or a plurality of configured BWPs, at least one BWP may be activated. Whether to activate the configured BWPs may be semi-statically transferred from the BS to the UE through RRC signaling or may be dynamically transferred through a MAC control element (CE) or downlink control information (DCI).

According to an embodiment, the UE before the radio resource control (RRC) connection may receive a configuration of an initial BWP for initial access from the BS through a master information block (MIB). More specifically, the UE may receive configuration information for a control resource set (CORESET) and a search space in which a PDCCH can be transmitted to receive system information (remaining system information (RMSI) or system information block 1 (SIB1)) required for initial access through the MIB in an initial access step. Each of the CORESET and the search space configured through the MIB may be considered as an identity (ID) 0.

The BS may inform the UE of configuration information such as frequency allocation information, time allocation information, and numerology for CORESET #0 through the MIB. Further, the BS may inform the UE of configuration information for a monitoring period and an occasion of CORESET #0, that is, configuration information for search space #0 through the MIB. The UE may consider a frequency domain configured as CORESET #0 acquired from the MIB as an initial BWP for initial access. At this time, the ID of the initial BWP may be considered as 0.

A configuration of the BWP supported by the next-generation mobile communication system (5G or NR system) may be used for various purposes.

For example, when the bandwidth supported by the UE is smaller than the system bandwidth, the bandwidth supported by the UE may be supported through the configuration for the BWP. For example, in Table 2, as the frequency location (configuration information 2, locationAndBandwidth) of the BWP is configured in the UE, the UE may transmit and receive data at a specific frequency location within the system bandwidth.

In another example, the BS may configure a plurality of BWPs in the UE for the purpose of supporting different numerologies. For example, two BWPs may be configured to use subcarrier spacings of 15 kHz and 30 kHz, respectively, to support all of data transmission and reception of a predetermined UE using the subcarrier spacings of 15 kHz and 30 kHz. Different BWPs may be frequency-division-multiplexed (FDM), and when data is transmitted and received at particular subcarrier spacing, BWPs configured at the corresponding subcarrier spacing may be activated.

In another example, the BS may configure BWPs having different sizes of bandwidths in the UE to reduce power consumption of the UE. For example, when the UE supports a very large bandwidth, for example, a bandwidth of 100 MHz, and always transmits/receives data through the corresponding bandwidth, very high power consumption may result. Particularly, monitoring an unnecessary downlink control channel in a large bandwidth of 100 MHz by the UE in the state in which there is no traffic is very inefficient in the light of power consumption. Therefore, the BS may configure a BWP of a relatively small bandwidth, for example, a BWP of 20 MHz in the UE to reduce power consumption of the UE. The UE may perform a monitoring operation in the BWP of 20 MHz in the state in which there is no traffic, and if data is generated, may transmit and receive data through the BWP of 100 MHz according to an instruction from the BS.

In the method of configuring the BWP, UEs before the RRC connection may receive configuration information for an initial BWP through a master information block (MIB) in an initial access step. More specifically, the UE may receive a configuration of a CORESET for a downlink control channel in which downlink control information (DCI) for scheduling a system information block (SIB) can be transmitted from an MIB of a physical broadcast channel (PBCH). A BWP of the CORESET configured through the MIB may be considered as an initial BWP, and the UE may receive a PDSCH for transmitting an SIB through the configured initial BWP. The initial BWP may be used not only for receiving the SIB but also for other system information (OSI), paging, or random access.

Hereinafter, a synchronization signal (SS)/PBCH block (SSB) of the next-generation mobile communication system (5G or NR system) is described.

An SS/PBCH block may be a physical layer channel block including a primary SS (PSS), a secondary SS (SSS), and a PBCH. More specifically, the SS/PBCH block may be defined as follows.

- PSS: is a signal that is a reference for downlink time/frequency synchronization and may provide some pieces of information of a cell ID.
- SSS: is a reference for downlink time/frequency synchronization and may provide the remaining cell ID information that the PSS does not provide. In addition, the SSS serves as a reference signal for demodulation of a PBCH.
- PBCH: may provide necessary system information required for transmitting and receiving a data channel and a control channel by the UE. The necessary system information may include control information related to a search space indicating radio resource mapping information of a control channel, scheduling control information for a separate data channel for transmitting system information, and the like.
- SS/PBCH block: may include a combination of a PSS, an SSS, and a PBCH. One or a plurality of SS/PBCH blocks may be transmitted within a time of 5 ms, and each of the transmitted SS/PBCH blocks may be separated by an index.

The UE may detect the PSS and the SSS in an initial access stage and decode the PBCH. The UE may acquire the MIB from the PBCH and receive a configuration of CORE-SET #0 through the MIB. The UE may monitor CORESET #0 on the basis of the assumption that the selected SS/PBCH block and a demodulation reference signal (DMRS) transmitted in CORESET #0 are quasi co-located (QCL). The UE may receive system information from the downlink control information transmitted in CORESET #0. The UE may acquire configuration information related to a random access channel (RACH) required for initial access from the received system information. The UE may transmit a physical RACH (PRACH) to the BS in consideration of the selected SS/PBCH block index, and the BS receiving the PRACH may acquire information on the SS/PBCH block index selected by the UE. The BS may know which block is selected by the UE from among the SS/PBCH blocks and monitoring of CORESET #0 corresponding to (or associated with) the SS/PBCH block selected by the UE.

Hereinafter, downlink control information (DCI) in the next-generation mobile communication system (5G or NR system) is described in detail.

In the next-generation mobile communication system (5G or NR system), scheduling information for uplink data (or a physical uplink data channel (physical uplink shared channel (PUSCH)) or downlink data (or physical downlink data channel (physical downlink shared channel (PDSCH)) may be transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a physical downlink control channel (PDCCH) after passing through a channel coding and modulation process. A cyclic redundancy check (CRC) may be added to a DCI message payload and may be scrambled by a radio network temporary identifier (RNTI) corresponding to the identity of the UE. Depending on the purpose of the DCI message, for example, UE-specific data transmission, a power control command, a random access response, or the like, different RNTIs may be used for scrambling of the CRC added to the payload of the DCI message. That is, the RNTI is not explicitly transmitted but may be transmitted while being inserted into the CRC calculation process. When the DCI message transmitted on the PDCCH is received, the UE may identify the CRC by using the allocated RNTI. When the CRC identification result is correct, the UE may know that the corresponding message is transmitted to the UE.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled by a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. In an embodiment, DCI format 0_0 in which the CRC is scrambled by the C-RNTI may include information as shown in Table 3 below.

TABLE 3

- Identifier for DCI formats - [1] bit
- Frequency domain resource assignment - $[\lceil \log_2(N^{UL,BWP}_{RB}(N^{UL,BWP}_{RB} + 1)/2) \rceil]$ bits
- Time domain resource assignment - X bits
- Frequency hopping flag - 1 bit
- Modulation and coding scheme - 5 bits
- New data indicator - 1 bit
- Redundancy version - 2 bits
- HARQ process number - 4 bits
- Transmit power control (TPC) command for scheduled PUSCH - [2] bits
- Uplink (UL)/supplementary UL (SUL) indicator - 0 or 1 bit DCI format 0_1 may be used for non-fallback DCI for scheduling a PUSCH in which case the CRC may be scrambled by a C-RNTI. In an embodiment, DCI format 0_1 in which the CRC is scrambled by the C-RNTI may include information as shown in Table 4 below.

TABLE 4

Carrier indicator-0 or 3 bits
UL/SUL indicator-0 or 1 bit
Identifier for DCI formats-[1] bits
Bandwidth part indicator-0, 1 or 2 bits
Frequency domain resource assignment TABLE 4-continued For resource allocation type 0, $\lceil N_{RB}^{UL,BWP}/P \rceil$ bits
For resource allocation type 1, $\lceil \log_2(N_{RB}^{UL,BWP}(N_{RB}^{UL,BWP} + 1)/2) \rceil$ bits
Time domain resource assignment-1, 2, 3, or 4 bits
Virtual resource block (VRB)-to-physical resource block (PRB) mapping-0 or 1 bit, only for resource allocation type 1.
0 bit if only resource allocation type 0 is configured;
1 bit otherwise.
Frequency hopping flag-0 or 1 bit, only for resource allocation type 1.
0 bit if only resource allocation type 0 is configured;
1 bit otherwise.
Modulation and coding scheme-5 bits
New data indicator-1 bit
Redundancy version-2 bits
HARQ process number-4 bits
1st downlink assignment index-1 or 2 bits
1 bit for semi-static HARQ-ACK codebook;
2 bits for dynamic HARQ-ACK codebook with single HARQ-ACK codebook.
2nd downlink assignment index-0 or 2 bits
2 bits for dynamic HARQ-ACK codebook with two HARQ-ACK sub-codebooks;
0 bit otherwise.
TPC command for scheduled PUSCH-2 bits SRS resource indicator $\left\lceil \log\left(\sum_{k=1}^{L_{max}} \binom{N_{SRS}}{k}\right)\right\rceil$ or $\lceil \log_2(N_{SRS}) \rceil$ bits $\left\lceil \log\left(\sum_{k=1}^{L_{max}} \binom{N_{SRS}}{k}\right)\right\rceil$ bits for non-codebook based PUSCH transmission;

$\lceil \log_2(N_{SRS}) \rceil$ bits for codebook based PUSCH transmission.
Precoding information and number of layers-up to 6 bits
Antenna ports-up to 5 bits
SRS request-2 bits
Channel state information (CSI) request-0, 1, 2, 3, 4, 5, or 6 bits
Code block group (CBG) transmission information-0, 2, 4, 6, or 8 bits
Phase tracking reference signal (PTRS)-demodulation reference signal (DMRS) association-0 or 2 bits.
beta_offset indicator-0 or 2 bits
DMRS sequence initialization-0 or 1 bit DCI format 1_0 may be used for fallback DCI for scheduling a PUSCH in which case the CRC may be scrambled by a C-RNTI. In an embodiment, DCI format 1_0 in which the CRC is scrambled by the C-RNTI may include information as shown in Table 5 below.

TABLE 5

- Identifier for DCI formats - [1] bit
- Frequency domain resource assignment - $\lceil \log_2(N^{DL,BWP}_{RB}(N^{DL,BWP}_{RB} + 1)/2) \rceil$ bits
- Time domain resource assignment - X bits
- VRB-to-PRB mapping - 1 bit
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits Alternatively, DCI format 1_0 may be used for DCI for scheduling a PDSCH for an RAR message in which case the CRC may be scrambled with an RA-RNTI. In an embodiment, DCI format 1_0 in which the CRC is scrambled by the C-RNTI may include information as shown in Table 6 below. Table 6

TABLE 6

- Frequency domain resource assignment - $\lceil \log_2(N^{DL,BWP}_{RB}(N^{DL,BWP}_{RB} + 1)/2) \rceil$ bits
- Time domain resource assignment - 4 bits
- VRB-to-PRB mapping - 1 bit
- Modulation and coding scheme - 5 bits
- TB scaling - 2 bit
- Reserved bits - 16 bits DCI format 1_1 may be used for non-fallback DCI for scheduling a PUSCH in which case the CRC may be scrambled by a C-RNTI. In an embodiment, DCI format 1_1 in which the CRC is scrambled by the C-RNTI may include information as shown in Table 7 below.

TABLE 7

- Carrier indicator - 0 or 3 bits
- Identifier for DCI formats - [1] bits
- Bandwidth part indicator - 0, 1 or 2 bits
- Frequency domain resource assignment
  •For resource allocation type 0, $\lceil N^{DL,BWP}_{RB}/P \rceil$ bits
  •For resource allocation type 1, $\lceil \log_2(N^{DL,BWP}_{RB}(N^{DL,BWP}_{RB} + 1)/2) \rceil$ bits
- Time domain resource assignment - 1, 2, 3, or 4 bits
- VRB-to-PRB mapping - 0 or 1 bit, only for resource allocation type 1.
  •0 bit if only resource allocation type 0 is configured;
  •1 bit otherwise.
- Physical resource block (PRB) bundling size indicator - 0 or 1 bit
- Rate matching indicator - 0, 1, or 2 bits
- Zero power (ZP) channel state information (CSI)-reference signal (RS) trigger - 0, 1, or 2 bits
For transport block 1:

TABLE 7-continued

- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ_feedback timing indicator - 3 bits duration of two symbols and CORSET #2 4-02 may be configured as CORESET duration of one symbol.

The CORESETs in the next-generation mobile communication system (5G or NR system) may be configured through higher-layer signaling (for example, system information, a master information block (MIB), or radio resource control (RRC) signaling) to the UE by the BS. Configuring the CORESET in the UE may mean providing information such as an identity of the CORESET, a frequency location of the CORESET, and a symbol length of the CORESET. For example, the configuration of the CORESET may include information shown in Table 8 below.

TABLE 8

```
ControlResourceSet ::=                  SEQUENCE {
    -- Corresponds to L1 parameter 'CORESET-ID'
    controlResourceSetId                ControlResourceSetId,
(control resource set identity)
    frequencyDomainResources            BIT STRING (SIZE (45)),
(frequency axis resource allocation information)
    duration                            INTEGER (1..maxCoReSetDuration),
(time axis resource allocation information)
    cce-REG-MappingType                 CHOICE {
(CCE-to-REG mapping scheme)
        interleaved                     SEQUENCE {
            reg-BundleSize              ENUMERATED {n2, n3, n6},
        (REG bundle size)
            precoderGranularity         ENUMERATED    {sameAsREG-bundle,
allContiguousRBs},
            interleaverSize             ENUMERATED {n2, n3, n6}
            (interleaver size)
            shiftIndex
    INTEGER(0..maxNrofPhysicalResourceBlocks-1)
            (interleaver shift)
    },
        nonInterleaved                  NULL
    },
    tci-StatesPDCCH                     SEQUENCE(SIZE     (1..maxNrofTCI-
StatesPDCCH)) OF TCI-StateId            OPTIONAL,
(QCL configuration information)
    tci-PresentInDCI                    ENUMERATED {enabled}
}
```

TABLE 7-continued

Figure 4:
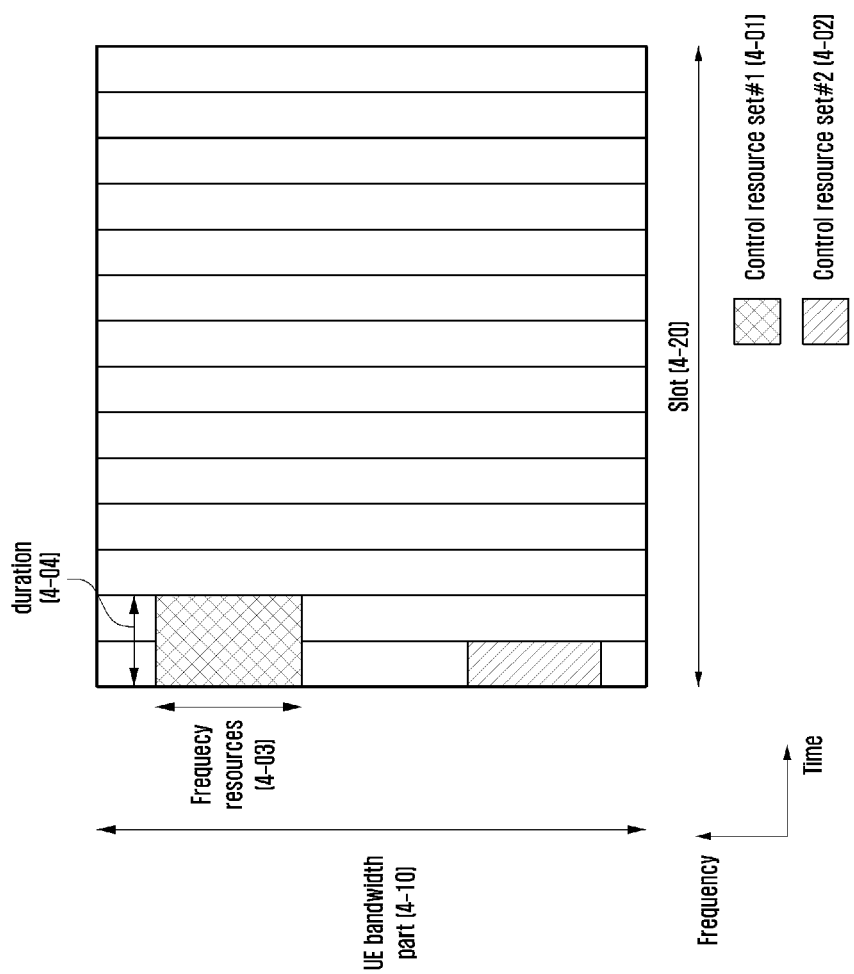
FIG. 4 illustrates an example of a configuration of a control resource set of a downlink control channel in a wireless communication system according to an embodiment of the disclosure.

- Antenna ports - 4, 5 or 6 bits
- Transmission configuration indication - 0 or 3 bits
- SRS request - 2 bits
- CBG transmission information - 0, 2, 4, 6, or 8 bits
- Code block group (CBG) flushing out information - 0 or 1 bit
- DMRS sequence initialization - 1 bit FIG. 4 illustrates an example of a configuration of a CORESET of a downlink control channel in a wireless communication system according to an embodiment of the disclosure. FIG. 4 illustrates an embodiment of a control resource set (CORESET) in which a downlink control channel is transmitted in the 5G wireless communication system according to an embodiment of the disclosure.

Referring to FIG. 4, FIG. 4 illustrates an embodiment in which a bandwidth part 4-10 of the UE is configured in the frequency axis and two CORESETs (CORESET #1 4-01 and CORESET #2 40-2) are configured within one slot 4-20 in the time axis. The CORESETs 4-01 and 4-02 may be configured in specific frequency resources 4-03 within the entire BWP 4-10 of the UE in the frequency axis. The CORESETs 4-01 and 4-02 may be configured as one or a plurality of OFDM symbols in the time axis, which may be defined as a control resource set duration 4-04. Referring to FIG. 4, CORESET #1 4-01 may be configured as CORESET In Table 8, tci-StatesPDCCH (hereinafter, referred to as a 'TCI state') configuration information may include information on one or a plurality of synchronization signal (SS)/physical broadcast channel (PBCH) block indexes or channel state information reference signal (CSI-RS) indexes having the quasi co location (QCL) relationship with a demodulation reference signal (DMRS) transmitted in the corresponding CORESET.

In the wireless communication system, one or more different antenna ports (or replaced with one or more channels, signals, and combinations thereof, but commonly referred to as different antenna ports for convenience in the following description of the disclosure) may be associated by a QCL configuration shown in Table 9 below.

TABLE 9

```
QCL-Info::=         SEQUENCE {
  Cell              ServiceCellIndex(index of serving cell for
transmitting QCL reference RS)
  bwp-Id            BWP-Id (BWP for transmitting QCL reference RS)
  referenceSignal   CHOIC{(indicator indicating one of CSI-RS or
SS/PBCH block to QCL reference RS)
    csi-rs          NZP-CSI-RS-ResourceId,
    ssb             SSB-Index
  },
```

TABLE 9-continued

```
Qcl-Type            ENUMERATED{typeA, typeB, typeC, typed},
(QCL type indicator)
...
}
```

Specifically, in the QCL configuration, two different antenna ports may be connected through association between a (QCL) target antenna port and a (QCL) reference antenna port, and when receiving the target antenna port, the UE may apply (or assume) all or some of the statistical characteristics of a channel (for example, a large scale parameter of the channel such as Doppler shift, Doppler spread, average delay, delay spread, average gain, spatial Rx (or Tx) parameter, and the like, and a reception spatial filter coefficient or a transmission spatial filter coefficient of the UE) measured by the reference antenna port. The target antenna port is an antenna port for transmitting a channel or a signal configured by a higher-layer configuration including the QCL configuration or an antenna port for transmitting a channel or a signal to which a transmission configuration indicator (TCI) state indicating the QCL configuration is applied. The reference antenna port is an antenna port for transmitting a channel or a signal indicated (specified) by a parameter referenceSignal within the QCL configuration.

Specifically, statistical characteristics of the channel (indicated by a parameter qcl-Type) within the QCL configuration) limited by the QCL configuration may be classified as follows according to the QCL types.
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}

At this time, the QCL types are not limited to the above four types, but all available combinations are not listed not to make the subject of the description unclear. The QCL-TypeA is a QCL type used when a bandwidth and a transmission section of the target antenna port are sufficient compared to the reference antenna port (that is, the number of samples of the target antenna ports and a transmission band/time are larger than the number of samples of the reference antenna ports and a transmission band/time in both the frequency axis and the time axis) and thus all statistical characteristics which can be measured in frequency and time axes can be referred to. The QCL-TypeB is a QCL type used when the bandwidth of the target antenna port is sufficient to measure statistical characteristics which can be measured in the frequency axis, that is, Doppler shifts and Doppler spreads. The QCL-TypeC is a QCL type used when a bandwidth and a transmission section of the target antenna port is insufficient to measure second-order statistics, that is, Doppler spreads and delay spreads, and thus only first-order statistics, that is, Doppler shifts and average delays can be referred to. The QCL-TypeD is a QCL type configured when spatial reception filter values used when the reference antenna port is received can be used when the target antenna port is received.

Meanwhile, the BS can configure or indicate a maximum of two QCL configurations in one target antenna port through a TCI state configuration shown in Table 9a below.

TABLE 9a

```
TCI-State ::=    SEQUENCE {
  tci-StateId    TCI-StateId, (TCI state indicator)
```

TABLE 9a-continued

```
    (ID of corresponding TCI state)
    qcl-Type1       QCL-Info, (first QCL configuration for target
antenna port to which corresponding TCI state is applied)
    qcl-Type2
      QCL-Info, (second QCL configuration for target antenna port to
which corresponding TCI state is applied)
        OPTIONAL, --Need R
    ...
}
```

Among the two QCL configurations included in one TCI state configuration, a first QCL configuration may be one of the QCL-TypeA, the QCL-TypeB, and the QCL-TypeC. At this time, configurable QCL types are specified according to types of the target antenna port and the reference antenna port, which will be described below in detail. Among the two QCL configurations included in one TCI state configuration, a second QCL configuration may be the QCL-TypeD and may be omitted according to circumstances.

Table 9ba to Table 9be below are tables showing valid TCI state configurations according to the target antenna port type.

Table 9ba shows valid TCI state configurations when the target antenna port is a CSI-RS for tracking (TRS). The TRS is an NZP CSI-RS for which a repetition parameter is not configured and trs-Info is configured as true among CSI-RSs. The third configuration in Table 9ba may be used for an aperiodic TRS.

TABLE 9ba

Valid TCI state configurations when target antenna port is CSI-RS for tracking (TRS)

| Valid TCI state Configuration | DL RS 1 | qcl-Type 1 | DL RS 2 (if configured) | qcl-Type 2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 9bb shows valid TCI state configurations when the target antenna port is a CSI-RS for CSI. The CSI-RS for CSI is an NZP CSI-RS for which a parameter repetition is not configured and trs-Info is not configured as true among the CSI-RSs.

TABLE 9bb

Valid TCI state configurations when target antenna port is CSI-RS for CSI

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 9bc shows valid TCI state configurations when the target antenna port is a CSI-RS for beam management (BM) (that is the same meaning as a CSI-RS for L1 RSRP reporting). Among the CSI-RSs, the CSI-RS for BM is an NZP CSI-RS for which a repetition parameter is configured to have a value of on or off and trs-Info is not configured as true.

TABLE 9bc

Valid TCI state configurations when target antenna port is CSI-RS for BM (for L1 RSRP reporting)

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH | QCL-TypeC | SS/PBCH block | QCL-TypeD |

Table 9d shows valid TCI state configurations when the target antenna port is a PDCCH DMRS.

TABLE 9bd

Valid TCI state configurations when target antenna port is PDCCH DMRS

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 9be shows valid TCI state configurations when the target antenna port is a PDSCH DMRS.

TABLE 9be

Valid TCI state configurations when target antenna port is PDSCH DMRS

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method by Table 9ba to Table 9be, the target antenna port and the reference antenna port for each step are configured and operated as "SSB"→"TRS"→"CSI-RS for CSI, CSI-RS for BM, PDCCH DMRS, or PDSCH DMRS". Accordingly, it is possible to assist the UE in the reception operation by associating statistical characteristics which can be measured from the SSB and the TRS with respective antenna ports.

Figure 5:
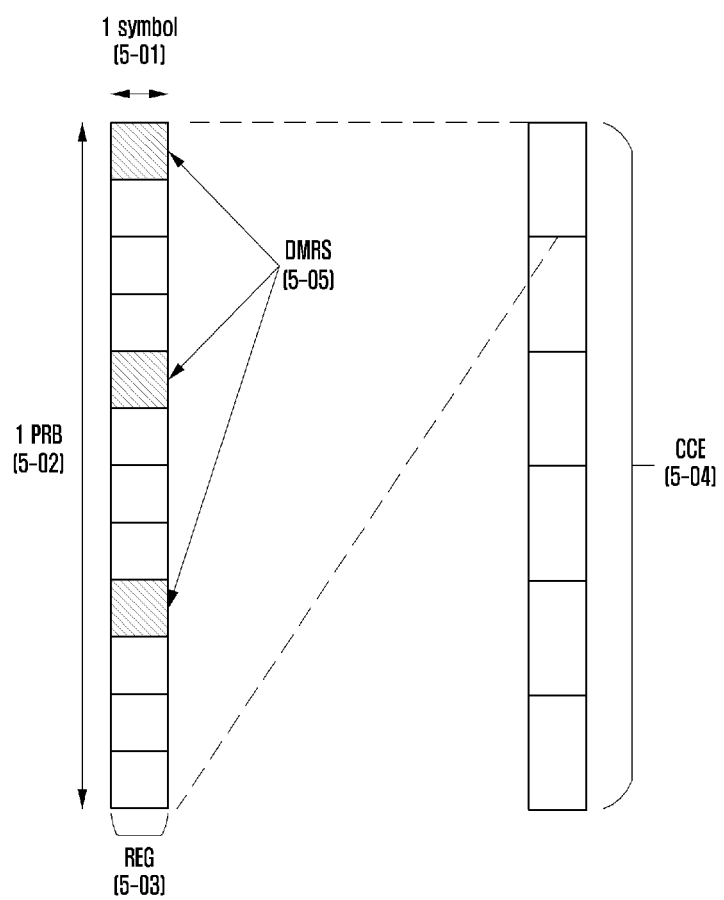
FIG. 5 illustrates the structure of a downlink control channel in a wireless communication system according to an embodiment of the disclosure.

FIG. 5 illustrates the structure of a downlink control channel in a wireless communication system according to an embodiment of the disclosure. That is, FIG. 5 illustrates an example of a basic unit of time and frequency resources included in a downlink control channel which can be used in 5G according to an embodiment of the disclosure.

Referring to FIG. 5, a basic unit of time and frequency resources included in the control channel may be defined as a resource element group (REG) 5-03. The REG 5-03 may be defined by one OFDM symbol 5-01 in the time axis and one physical resource block (PRB) 5-02, that is, 12 subcarriers in the frequency axis. The BS may configure a downlink control channel allocation unit by concatenating the REGs 5-03.

As illustrated in FIG. 5, when the basic unit in which the downlink control channel is allocated in 5G is a control channel element (CCE) 5-04, one CCE 5-04 may include a plurality of REGs 5-03. For example, when the REG 5-03 illustrated in FIG. 5 may include 12 Res and one CCE 5-04 includes 6 REGs 5-03, one CCE 5-04 may include 72 REs. When a downlink CORESET is configured, the corresponding area may include a plurality of CCEs 5-04, and a specific downlink control channel may be mapped to one or a plurality of CCEs 5-04 according to an aggregation level (AL) within the CORESET and then transmitted. CCEs 5-04 within the CORESET may be distinguished by numbers and the numbers of the CCEs 5-04 may be assigned according to a logical mapping scheme.

The basic unit of the downlink control channel illustrated in FIG. 5, that is, the REG 5-03 may include all REs to which the DCI is mapped and an area to which a DMRS 5-05, which is a reference signal for decoding the REs is mapped. As illustrated in FIG. 5, three DRMSs 5-05 may be transmitted within the one REG 5-03. The number of CCEs required to transmit the PDCCH may be 1, 2, 4, 8, or 16 according to the aggregation level (AL), and the different number of CCEs may be used to implement link adaptation of the downlink control channel. For example, in the case of AL=L, one downlink control channel may be transmitted through L CCEs.

The UE is required to detect a signal in the state in which the UE is not aware of information on the downlink control channel, and a search space indicating a set of CCEs may be used to assist such a blind decoding. The search space is a set of downlink control channel candidates including CCEs for which the UE attempts decoding at a given aggregation level. Since there are a plurality of aggregation levels at which one group is made of 1, 2, 4, 8, or 16 CCEs, the UE may have a plurality of search spaces. The search space set may be defined as a set of search spaces at all configured aggregation levels.

The search spaces may be classified into a common search space and a UE-specific search space. According to an embodiment of the disclosure, UEs in a predetermined groups or all UEs may search for a common search space of the PDCCH in order to receive cell-common control information such as dynamic scheduling or a paging message for system information.

For example, the UE may receive PDSCH scheduling allocation information for transmission of an SIB including information on a service provider of a cell by searching for a common search space of the PDCCH. In the case of the common search space, UEs in a predetermined group or all UEs should receive the PDCCH, so that the common search space may be defined as a set of pre-arranged CCEs. Meanwhile, the UE may receive scheduling allocation information for the UE-specific PDSCH or PUSCH by searching for a UE-specific search space of the PDCCH. The UE-specific search space may be UE-specifically defined as a UE identity and a function of various system parameters.

In 5G, parameters for the PDCCH search space may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common search space or a UE-specific search space, a combination of a DCI format and an RNTI to be monitored in the corresponding search space, and a CORESET index for monitoring the search space. For example, the configuration may include information shown in Table 10 below.

TABLE 10

```
SearchSpace ::=                           SEQUENCE {
    -- Identity of the search space. SearchSpaceId = 0 identifies the SearchSpace configured via
PBCH (MIB) or ServingCellConfigCommon.
    searchSpaceId                         SearchSpaceId,
    (search space indentifier)
    controlResourceSetId                  ControlResourceSetId,
    (CORESET identifier)
    monitoringSlotPeriodicityAndOffset    CHOICE {
    (monitoring slot level period)
        sl1                               NULL,
        sl2                               INTEGER (0..1),
        sl4                               INTEGER (0..3),
        sl5                               INTEGER (0..4),
        sl8                               INTEGER (0..7),
        sl10                              INTEGER (0..9),
        sl16                              INTEGER (0..15),
        sl20                              INTEGER (0..19)
    }
        OPTIONAL,
    duration(monitoring duration)         INTEGER (2..2559)
        monitoringSymbolsWithinSlot       BIT STRING (SIZE (14))
            OPTIONAL,
    (monitoring symbol within slot)
        nrofCandidates                    SEQUENCE {
    (number of PDCCH candidates for each AL)
        aggregationLevel1                 ENUMERATED {n0, n1, n2, n3, n4, n5, n6, n8},
        aggregationLevel2                 ENUMERATED {n0, n1, n2, n3, n4, n5, n6, n8},
        aggregationLevel4                 ENUMERATED {n0, n1, n2, n3, n4, n5, n6, n8},
        aggregationLevel8                 ENUMERATED {n0, n1, n2, n3, n4, n5, n6, n8},
        aggregationLevel16                ENUMERATED {n0, n1, n2, n3, n4, n5, n6, n8}
    },
    searchSpaceType                       CHOICE {
    (search space type)
        -- Configures this search space as common search space (CSS) and DCI formats to
monitor.
        common                            SEQUENCE {
    (common search space)
    }
        ue-Specific                       SEQUENCE {
    (UE-specific search space)
        -- Indicates whether the UE monitors in this USS for DCI formats 0-0 and 1-0 or for
formats 0-1 and 1-1.
        formats                           ENUMERATED {formats0-0-And-1-0,
formats0-1-And-1-1},
        ...
    }
```

The BS may configure one or a plurality of search space sets in the UE on the basis of configuration information. According to an embodiment of the disclosure, the BS may configure search space set 1 and search space set 2 in the UE, and the configuration may be performed such that DCI format A scrambled by an X-RNTI in search space set 1 is monitored in the common-search space and DCI format B scrambled by a Y-RNTI in search space set 2 is monitored in the UE-specific search space.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

Common search spaces may be classified into specific types of search space sets according to the purpose. RNTIs to be monitored for each of the predetermined search space set types may be different. For example, common search space types, purposes, and RNTIs to be monitored may be classified as shown in Table 10a below.

TABLE 10a

| Search space type | Purpose | RNTI |
|---|---|---|
| Type0 CSS | Transmit PDCCH for scheduling SIB | SI-RNTI |
| Type0A CSS | Transmit PDCCH for scheduling SI other than SIB1 (SIB2 and the like) | SI-RNTI |
| Type1 CSS | Transmit PDCCH for scheduling random access response (RAR), msg3 retransmission, and msg4 | RA-RNTI, TC-RNTI |
| Type2 CSS | Paging | P-RNTI |
| Type3 CSS | Transmit group control information | INT-RNTI, SFI-RNTI, TPC-PUSCH-RNTI, TPC-PUCCH-RNTI, TPC-SRS-RNTI |
| | Transmit PDCCH for scheduling data in case of PCell | C-RNTI, MCS-C-RNTI, CS-RNTI |

Meanwhile, in the common search space, the following combinations of DCI formats and RNTIs may be monitored. Of course, the disclosure is not limited to the following examples.

DCI format 0_0/1_0 with CRC scrambled by C-RNTI, CS-RNTI, SP-CSI-RNTI, RA-RNTI, TC-RNTI, P-RNTI, SI-RNTI DCI format 2_0 with CRC scrambled by SFI-RNTI DCI format 2_1 with CRC scrambled by INT-RNTI DCI format 2_2 with CRC scrambled by TPC-PUSCH-RNTI, TPC-PUCCH-RNTI DCI format 2_3 with CRC scrambled by TPC-SRS-RNTI In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, TC-RNTI

DCI format 1_0/1_1 with CRC scrambled by C-RNTI, CS-RNTI, TC-RNTI

The RNTIs may follow the following definitions and uses.

C-RNTI (cell RNTI): used for UE-specific PDSCH scheduling

TC-RNTI (temporary cell RNTI): used for UE-specific PDSCH scheduling

Configured scheduling (CS)-RNTI: used for semi-statically configured UE-specific PDSCH scheduling Random access (RA)-RNTI: used for scheduling PDSCH at random access stage Paging (P)-RNTI: used for scheduling PDSCH through which paging is transmitted System information (SI)-RNTI: used for scheduling PDSCH through which system information is transmitted Interruption (INT)-RNTI: used for indicating whether puncturing is performed for PDSCH Transmit power control for (TPC)-PUSCH-RNTI: used for indicating PUSCH power control command Transmit power control for (TPC)-PUCCH RNTI: used for indicating PUCCH power control command Transmit power control for (TPC)-SRS RNTI: used for indicating SRS power control command In an embodiment, the DCI formats may be defined as shown in Table 11 below.

TABLE 11

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

According to an embodiment of the disclosure, in 5G, a plurality of search space sets may be configured as different parameters (for example, the parameters in Table 10. Accordingly, a set of search spaces monitored by the UE may vary at every time point. For example, when search space set #1 is configured on an X-slot period, search space set #2 is configured on a Y-slot period, and X and Y are different from each other, the UE may monitor all of search space set #1 and search space set #2 in a specific slot and monitor one of search space set #1 and search space set #2 in another specific slot.

When a plurality of search space sets are configured in the UE, the following conditions may be considered to determine a search space set to be monitored by the UE.

[Condition 1: Limits on Maximum Number of PDCCH Candidates]

The number of PDCCH candidates which can be monitored per slot does not exceed $M^\mu$. $M^\mu$ may be defined as the maximum number of PDCCH candidates per slot in a cell configured to have subcarrier spacing of $15 \cdot \mu$ kHz as shown in Table 12 below.

TABLE 12

| μ | Maximum number of monitored PDCCH candidates per slot and per serving cell ($M^\mu$) |
|---|---|
| 0 | 44 |
| 1 | 36 |
| 2 | 22 |
| 3 | 20 |

[Condition 2: Limits on Maximum Number of CCEs]

The number of CCEs included in all search spaces per slot (all search spaces are all sets of CCEs corresponding to a union area of a plurality of search space sets) does not exceed $C^\mu$. $C^\mu$ may be defined as the maximum number of CCEs per slot in a cell configured to have subcarrier spacing of $15 \cdot 2$ μkHz as shown in Table 13 below.

TABLE 13

| μ | Maximum number of non-overlapped CCEs per slot and per serving cell ($C^\mu$) |
|---|---|
| 0 | 56 |
| 1 | 56 |
| 2 | 48 |
| 3 | 32 |

For convenience of description, a situation satisfying both conditions 1 and 2 at a specific time point may be defined as "condition A". Accordingly, non-satisfaction of condition A may mean that at least one of conditions 1 and 2 is not satisfied.

Condition A may not be satisfied at a specific time point according to a configuration of search space sets by the BS. When condition A is not satisfied at a specific time point, the UE may select and monitor only some of the search space sets configured to satisfy condition A at the corresponding time point, and the BS may transmit the PDCCH through the selected search space sets.

According to an embodiment of the disclosure, a method of selecting some search spaces from among all of the configured search space sets may include the following method.

[Method 1]

Condition A for the PDCCH is not satisfied at a specific time point (slot),

The UE (or the BS) may select a search space set having a search space type configured as a common search space in preference to a search space set having a search space type configured as a UE-specific search space from among the search space sets existing at the corresponding time point.

When all search space sets of which the search space type is configured as the common search space are selected (that is, when condition A is satisfied even after all search spaces of which the search space type is configured as the common search space are selected), the UE (or the BS) may select search space sets having the search space type configured as the UE-specific search space. At this time, when the number of search space sets configured as the UE-specific search space is plural, a search space set having a lower search space set index may have a higher priority. The UE or the BS may select UE-specific search space sets within a range in which condition A is satisfied in consideration of the priority.

Hereinafter, time and frequency resource allocation methods for data transmission in NR are described.

In NR, detailed frequency domain resource allocation (FD-RA) methods may be provided in addition to frequency axis (domain) resource candidate allocation through a BWP indication.

Figure 6:
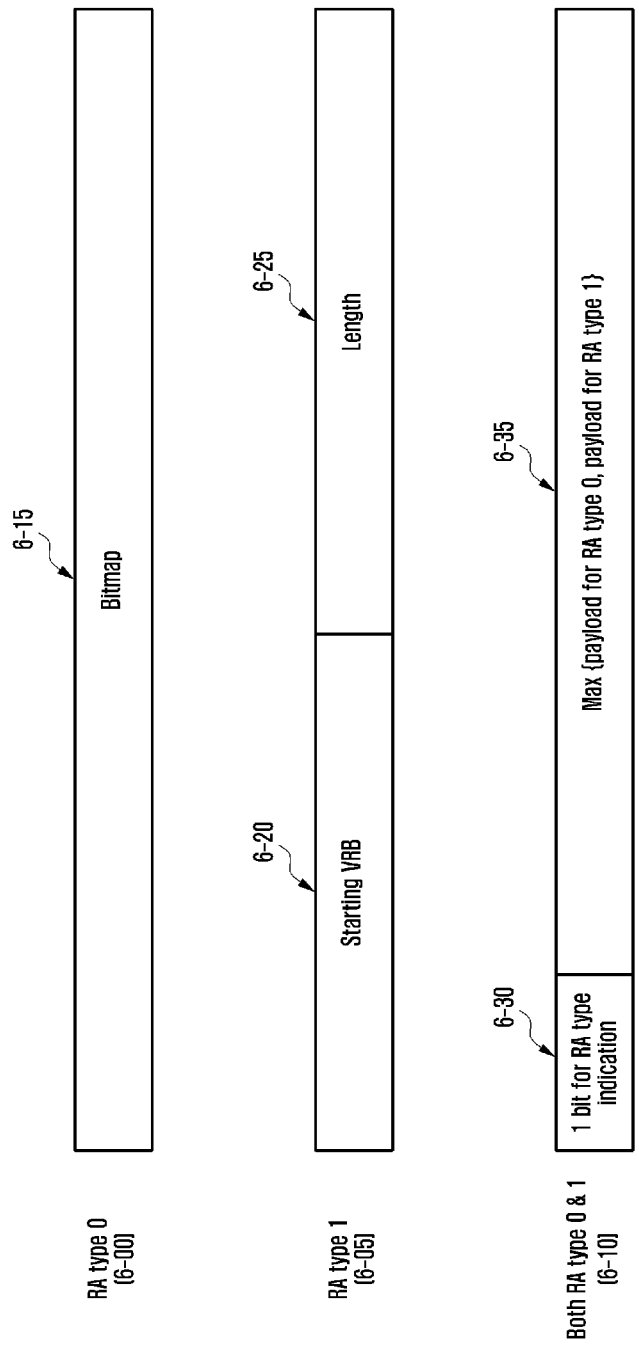
FIG. 6 illustrates an example of frequency axis resource allocation of a physical downlink shared channel (PDSCH) in a wireless communication system according to an embodiment of the disclosure.

FIG. 6 illustrates an example of frequency axis resource allocation of a physical downlink shared channel (PDSCH) in a wireless communication system according to an embodiment of the disclosure.

FIG. 6 illustrates three frequency axis resource allocation methods of type 0 6-00, type 1 6-05, and dynamic switch 6-10 which can be configured through a higher layer in NR.

Referring to FIG. 6, when the UE is configured to use only resource type 0 through higher-layer signaling as indicated by reference numeral 6-00, some pieces of downlink control information (DCI) for allocating the PDSCH to the corresponding UE has a bitmap including $N_{RBG}$ bits. A condition therefor is described again later. At this time, $N_{RBG}$ is the number of resource block groups (RBGs) determined as shown in Table 14 below according to a BWP size allocated by a BWP indicator and a higher-layer parameter rbg-Size, and data is transmitted in an RBG indicated as 1 by the bitmap.

TABLE 14

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher-layer signaling as indicated by reference numeral 6-05, some pieces of DCI for allocating the PDSCH to the corresponding UE has frequency axis resource allocation information including $[\log_2(N_{RB}^{DL,BWP}(N_{RB}^{DL,BWP}+1)/2)]$ bits. A condition therefor is described again later. The BS may configure a starting VRB 6-20 and a length 6-25 of frequency axis resources allocated successively therefrom.

When the UE is configured to use both resource type 0 and resource type 1 through higher-layer signaling as indicated by reference numeral 6-10, some pieces of DCI for allocating the PDSCH to the corresponding UE has frequency axis resource allocation information including bits of a larger value 6-35 among payload 6-15 for configuring resource type 0 and payload 6-20 and 6-25 for configuring resource type 1. A condition therefor is described again later. At this time, one bit may be added to the first part (MSB) of the frequency axis resource allocation information within the DCI, and the use of resource type 0 may be indicated when the corresponding bit is 0 and the use of resource type 1 may be indicated when the corresponding bit is 1.

Hereinafter, a time domain resource allocation method for a data channel in the next-generation mobile communication system (5G or NR system) is described.

The BS may configure a table for time domain resource allocation information for a downlink data channel (physical downlink shared channel (PDSCH)) and an uplink data channel (physical uplink shared channel (PUSCH)) in the UE through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. In an embodiment, the time domain resource allocation information may include PDCCH-to-PDSCH slot timing (corresponding to a time interval in units of slots between a time point at which a PDCCH is received and a time point at which a PDSCH scheduled by the received PDCCH is transmitted, and indicated by KG) or PDCCH-to-PUSCH slot timing (corresponding to a time interval in units of slots between a time point at which a PDCCH is received and a time point at which a PUSCH scheduled by the received PDCCH is transmitted, and indicated by K2), a location and a length of a start symbol in which a PDSCH or a PUSCH is scheduled within the slot, a mapping type of a PDSCH or a PUSCH, and the like. For example, information shown in Table 15 or Table 16 below may be notified to the UE from the BS.

TABLE 15

| PDSCH-TimeDomainResourceAllocationList information element | |
|---|---|
| PDSCH-TimeDomainResourceAllocationList ::= (SIZE(1..maxNrofDL-Allocations)) OF PDSCH-TimeDomainResourceAllocation | SEQUENCE |
| PDSCH-TimeDomainResourceAllocation ::= | SEQUENCE { |
| k0 | INTEGER(0..32) |
| OPTIONAL, -- Need S (PDCCH-to-PDSCH timing, slot unit) | |
| mappingType | ENUMERATED {typeA, typeB}, |
| (PDSCH mapping type) | |
| startSymbolAndLength | INTEGER (0..127) |
| (start symbol and length of PDSCH) | |
| } | |

TABLE 16

| PUSCH-TimeDomainResourceAllocation information element | |
| --- | --- |
| PUSCH-TimeDomainResourceAllocationList ::= (SIZE(1..maxNrofUL-Allocations)) OF PUSCH-TimeDomainResourceAllocation | SEQUENCE |
| PUSCH-TimeDomainResourceAllocation ::= | SEQUENCE { |
| k2 OPTIONAL, -- Need S (PDCCH-to-PUSCH timing, slot unit) | INTEGER(0..32) |
| mappingType typeB}, (PUSCH mapping type) | ENUMERATED {typeA, |
| startSymbolAndLength (start symbol and length of PUSCH) } | INTEGER (0..127) |

The BS may inform the UE of one of the entries in the table for the time domain resource allocation information through L1 signaling (for example, DCI) (for example, indicated through a 'time domain resource allocation field within DCI). The UE may acquire time domain resource allocation information for a PDSCH or a PUSCH on the basis of the DCI received from the BS.

Figure 7:
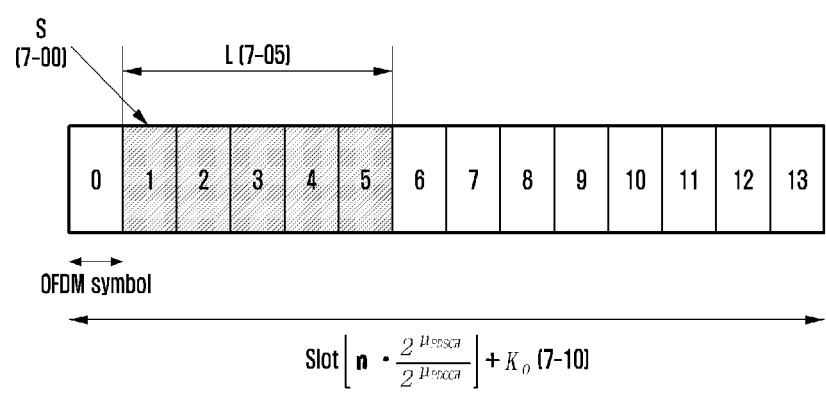
FIG. 7 illustrates a time axis resource allocation example of the PDSCH in a wireless communication system according to an embodiment of the disclosure.

FIG. 7 illustrates an example of time axis resource allocation of the PDSCH in a wireless communication system according to an embodiment of the disclosure.

Referring to FIG. 7, the BS may indicate a time axis location of PDSCH resources according to subcarrier spacing (SCS) ($\mu_{PDSCH}$, $\mu_{PDCCH}$) of a data channel and a control channel configured using a higher layer, a scheduling offset (K0) value, and an OFDM symbol start location 7-00 and length 7-05 within one slot dynamically indicated through DCI.

Figure 8:
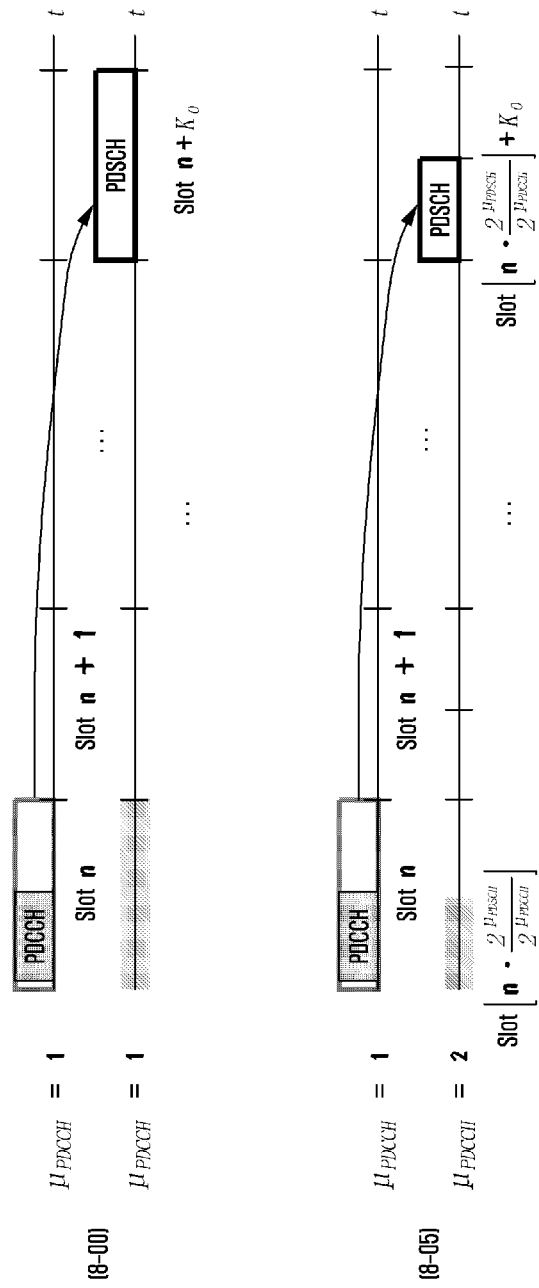
FIG. 8 illustrates an example of time axis resource allocation according to subcarrier spacing of a data channel and a control channel in a wireless communication system according to an embodiment of the disclosure.

FIG. 8 illustrates an example of time axis resource allocation according to subcarrier spacing of a data channel and a control channel in a wireless communication system according to an embodiment of the disclosure.

Referring to FIG. 8, when subcarrier spacings of a data channel and a control channel are the same as each other ($\mu_{PDSCH}=\mu_{PDCCH}$) as indicated by reference numeral 8-00, slot numbers for the data and the control are the same as each other, and thus the BS and the UE may know the generation of a scheduling offset according to a predetermined slot offset K0. On the other hand, when subcarrier spacings of a data channel and a control channel are different from each other ($\mu_{PDSCH}\neq\mu_{PDCCH}$) as indicated by reference numeral 8-05, slot numbers for the data and the control are different from each other, and thus the BS and the UE may know the generation of a scheduling offset according to a predetermined slot offset K0 on the basis of subcarrier spacing of the PDCCH.

In NR, the UE transmits control information (uplink control information (UCI) to the BS through the PUCCH. The control information may include at least one of HARQ-ACK indicating whether demodulation/decoding of a transport block (TB) which the UE receives through the PDSCH is successful, a scheduling request (SR) made by the UE to allocate resources to the BS for uplink data transmission of the PUSCH, and channel state information (CSI) which is information for reporting a channel state of the UE.

The PUCCH resources may be largely divided into a long PUCCH and a short PUCCH according to the length of allocated symbols. In NR, the long PUCCH as the length long than or equal to 4 symbols within the slot and the short PUCCH has the length equal to or shorter than 2 symbols within the slot.

In a more detailed description of the long PUCCH, the long PUCCH may be used to improve the uplink cell coverage and, accordingly, may be transmitted in a DFT-S-OFDM scheme which is single-carrier transmission rather than OFDM transmission. The long PUCCH may support transmission formats such as PUCCH format 1, PUCCH format 3, and PUCCH format 4 according to the number of supportable control information bits and whether UE multiplexing is supported through supporting of Pre-DFT OCC resources at an IFFT front.

First, PUCCH format 1 is a DFT-S-OFDM-based long PUCCH format which can support control information up to 2 bits and uses frequency resources of 1 RB. The control information may include a combination of HARQ-ACK and SR or each thereof. In PUCCH format 1, an OFDM symbol including a demodulation reference signal (DMRS) (or a reference signal) and an OFDM symbol including a UCI are repeated.

For example, when the number of transmission symbols of PUCCH format 1 is 8 symbols, the 8 symbols sequentially includes a DMRS symbol, a UCI symbol, a DMRS symbol, a UCI symbol, a DMRS symbol, a UCI symbol, a DMRS symbol, and a UCI symbol from the first start symbol. The DMRS symbol is spread using an orthogonal code (or orthogonal sequence or spreading code w_i(m)) in the time axis by the sequence corresponding to the length of 1 RB in the frequency axis within one OFDM symbol and transmitted after IFFT is performed.

The UCI symbol is generated as follows. The UE generates d(0) by modulating 1-bit control information to BPSK and 2-bit control information to QPSK, multiplies the generated d(0) by a sequence corresponding to the length of 1 RB in the frequency axis to perform scrambling, spreads the scrambling sequence by using an orthogonal order (or orthogonal sequence or spreading code, $w_{i(m)}$) in the time axis, performs IFFT, and then performs transmission.

The UE generates the sequence on the basis of a group hopping or sequence hopping configuration configured by the BS through a higher signal and a configured ID, perform cyclic shift on the generated sequence by using an initial cyclic shift (CS) value configured by a higher-layer signal, and generates a sequence corresponding to the length of 1 RB.

When the length of a spreading code (NSF) is given, $w_{i(m)}$ is determined as $$w_i(m) = e^{\frac{j2\pi\phi(m)}{N_{SF}}},$$

which is specifically as shown in Table 16a below. i denotes an index of the spreading code itself, and m denotes indexes of elements of the spreading code. Numbers in [ ] of Table 16a denotes $\phi(m)$, and when the length of the spreading code is 2 and an index of the configured spreading code is i=0, the spreading code $w_{i(m)}$ is determined as $w_i(0)=e^{j2\pi \cdot 0/N_{SF}}=1$, $w_i(1)=e^{j2\pi \cdot 0/N_{SF}}=1$, and thus $w_{i(m)}=[1\ 1]$ TABLE 16a spreading code for PUCCH format 1 $w_i(m) = e^{\frac{j2\pi\phi(m)}{N_{SF}}}$

| $N_{SF}$ | i = 0 | i = 1 | i = 2 | i = 3 | i = 4 | i = 5 | i = 6 |
|---|---|---|---|---|---|---|---|
| 1 | [0] | — | — | — | — | — | — |
| 2 | [0 0] | [0 1] | — | — | — | — | — |
| 3 | [0 0 0] | [0 1 2] | [0 2 1] | — | — | — | — |
| 4 | [0 0 0 0] | [0 2 0 2] | [0 0 2 2] | [0 2 2 0] | — | — | — |
| 5 | [0 0 0 0 0] | [0 1 2 3 4] | [0 2 4 1 3] | [0 3 1 4 2] | [0 4 3 2 1] | — | — |
| 6 | [0 0 0 0 0 0] | [0 1 2 3 4 5] | [0 2 4 0 2 4] | [0 3 0 3 0 3] | [0 4 2 0 4 2] | [0 5 4 3 2 1] | — |
| 7 | [0 0 0 0 0 0 0] | [0 1 2 3 4 5 6] | [0 2 4 6 1 3 5] | [0 3 6 2 5 1 4] | [0 4 1 5 2 6 3] | [0 5 3 1 6 4 2] | [0 6 5 4 3 2 1] |

PUCCH format 3 is a DFT-S-OFDM-based long PUCCH which can support control information larger than 2 bits, and the number of used RBs can be configured through a higher layer. The control information may include a combination of HARQ-ACK, SR, and CSI, or each thereof. In PUCCH format 3, the DMRS symbol location is presented in Table 17 below according to whether frequency hopping is performed within the slot and whether an additional DMRS symbol is configured.

TABLE 17

DMRS location within PUCCH format ¾ transmission

| PUCCH format | no additional DMRS configuration | | additional DMRS configuration | |
|---|---|---|---|---|
| ¾ transmission duration | no frequency hopping configuration | frequency hopping configuration | no frequency hopping configuration | frequency hopping configuration |
| 4 | 1 | 0, 2 | 1 | 0, 2 |
| 5 | 0, 3 | | 0, 3 | |
| 6 | 1, 4 | | 1, 4 | |
| 7 | 1, 4 | | 1, 4 | |
| 8 | 1, 5 | | 1, 5 | |
| 9 | 1, 6 | | 1, 6 | |
| 10 | 2, 7 | | 1, 3, 6, 8 | |
| 11 | 2, 7 | | 1, 3, 6, 9 | |
| 12 | 2, 8 | | 1, 4, 7, 10 | |
| 13 | 2, 9 | | 1, 4, 7, 11 | |
| 14 | 3, 10 | | 1, 5, 8, 12 | |

When the number of transmission symbols of PUCCH format 3 is 8, the 8 symbols have the first start symbol of 0, and the DMRS is transmitted in first and fifth symbols. The above table is applied to the DMRS symbol location of PUCCH format 4 in the same way.

PUCCH format 4 is a DFT-S-OFDM-based long PUCCH format which can support control information larger than 2 bits and uses frequency resources of 1 RB. The control information may include a combination of HARQ-ACK, SR, and CSI, or each thereof. A difference between PUCCH format 4 and PUCCH format 3 is that PUCCH format 4 of a plurality of UEs can be multiplexed in one RB in the case of PUCCH format 4. PUCCH format 4 of the UE can be multiplexed through the application of Pre-DFT OCC to control information at the IFFT front end. However, the number of control information symbols of the UE which can be transmitted is reduced according to the number of multiplexed UEs. The number of UEs which can be multiplexed, that is, the number of different available OCCs may be 2 or 4, and the number of OCCs and applicable OCC indexes may be configured through a higher layer.

Subsequently, the short PUCCH is described. The short PUCCH may be transmitted through both a downlink-centric slot and an uplink-centric slot and may generally be transmitted through the last symbol of the slot or an OFDM symbol in the back (for example, the last OFDM symbol, the second-to-last OFDM symbol, or the last two OFDM symbols). Of course, the short PUCCH can be transmitted at a random location within the slot. The short PUCCH may be transmitted using one OFDM symbol or two OFDM symbols. The short PUCCH may be used to reduce a delay time compared to the long PUCCH in the state in which the uplink cell coverage is good, and is transmitted in a CP-OFDM scheme.

The short PUCCH supports transmission formats such as PUCCH format 0 and PUCCH format 2 according to the number of supportable control information bits. First, PUCCH format 0 is a short PUCCH format which can support control information up to 2 bits and uses frequency resources of 1 RB. The control information may include a combination of HARQ-ACK and SR or each thereof. PUCCH format 0 has the structure in which no DMRS is transmitted and only a sequence mapped to 12 subcarriers in the frequency axis within one OFDM symbol is transmitted. The UE configures group hopping or sequence hopping configured by the BS through a higher-layer signal, generates a sequence on the basis of a configured ID, performs cyclic shift on the generated sequence by a final CS value obtained by adding another CS value to an indicated initial cyclic shift (CS) value according to ACK or NACK, maps the sequence to 12 subcarriers, and perform transmission.

For example, when HARQ-ACK is 1 bit as shown in Table 18 below, the final CS is generated by adding 6 to the initial CS value in the case of ACK and the final CS is generated by adding 0 to the initial CS in the case of NACK. 0 which is the CS value for NACK and 6 which is the CS value for ACK are defined in the standard, and the UE always generates PUCCH format 0 according to the value and transmit 1-bit HARQ-ACK.

TABLE 18

| 1-bit HARQ-ACK | NACK | ACK |
|---|---|---|
| Final CS | (Initial CS + 0)mod12 = initial CS | (Initial CS + 6)mod12 |

For example, when HARQ-ACK is 2 bits, 0 is added to the initial CS value in the case of (NACK, NACK), 3 is added to the initial CS value in the case of (NACK, ACK), and 6 is added to the initial CS value in the case of (ACK, ACK), and 9 is added to the initial CS value in the case of (ACK, NACK) as shown in Table 19 below. 0 which is the CS value for (NACK, NACK), 3 which is the CS value for (NACK, ACK), 6 which is the CS value for (ACK, ACK), and 9 which is the CS value for (ACK, NACK) are defined in the standard, and the UE always generates PUCCH format 0 according to the value and transmit 2-bit HARQ-ACK.

When the final CS value is larger than 12 by the CS value added to the initial CS value according to ACK or NACK, the length of the sequence is 12 and thus modulo 12 is applied to the final CS value.

TABLE 19

| 2-bit HARQ-ACK | NACK, NACK | NACK, ACK | ACK, ACK | ACK, NACK |
|---|---|---|---|---|
| Final CS | (Initial CS + 0)mod12 = initial CS | (Initial CS + 3)mod12 | (Initial CS + 6)mod12 | (Initial CS + 9)mod12 |

Figure 14:
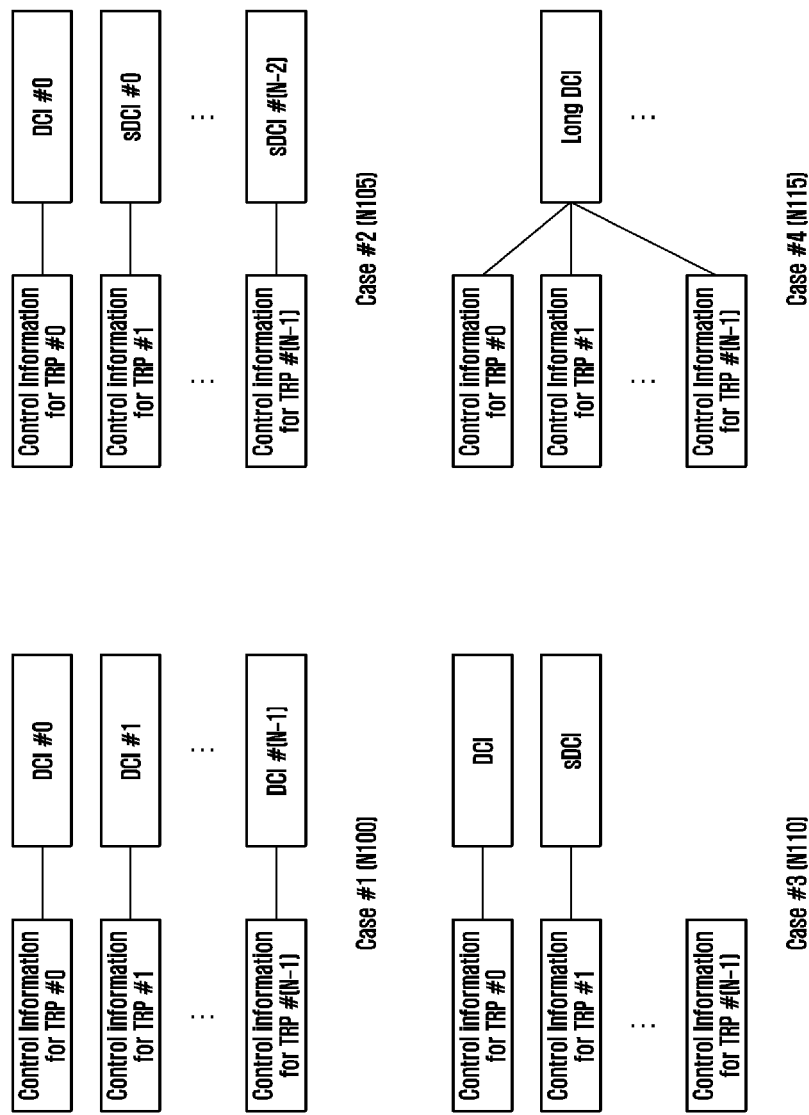
FIG. 14 illustrates an example for a configuration of downlink control information (DCI) for cooperative communication in a wireless communication system according to an embodiment of the disclosure.

PUCCH format 2 is a short PUCCH format supporting control information larger than 2 bits, and the number of used RBs can be configured through a higher layer. The control information may include a combination of HARQ-ACK, SR, and CSI, or each thereof. In PUCCH format 2, when an index of a first subcarrier is #0 as shown in FIG. 14, the location of subcarriers for transmitting the DMRS within one OFDM symbol is fixed to subcarriers having indexes #1, #4, #7, and #10. The control information is mapped to the remaining subcarriers except for the subcarriers in which the DMRS is located through a channel coding and modulation process.

In summary, values which can be configured for the respective PUCCH formats and ranges thereof are as shown in Table 20 below. In the table, the case in which there is no need to configure a value is indicated by N.A.

TABLE 20

| | | PUCCH Format 0 | PUCCH Format 1 | PUCCH Format 2 | PUCCH Format 3 | PUCCH Format 4 |
|---|---|---|---|---|---|---|
| Starting symbol | Configurability | ✓ | ✓ | ✓ | ✓ | ✓ |
| | Value range | 0-13 | 0-10 | 0-13 | 0-10 | 0-10 |
| Number of symbols in a slot | Configurability | ✓ | ✓ | ✓ | ✓ | ✓ |
| | Value range | 1, 2 | 4-14 | 1, 2 | 4-14 | 4-14 |
| Index for identifying starting PRB | Configurability | ✓ | ✓ | ✓ | ✓ | ✓ |
| | Value range | 0-274 | 0-274 | 0-274 | 0-274 | 0-274 |
| Number of PRBs | Configurability | N.A. | N.A. | ✓ | ✓ | N.A. |
| | Value range | N.A. (Default is 1) | N.A. (Default is 1) | 1-16 | 1-6, 8-10, 12, 15, 16 | N.A. (Default is 1) |
| Enabling a FH | Configurability | ✓ | ✓ | ✓ | ✓ | ✓ |
| | Value range | On/Off (only for 2 symbol) | On/Off | On/Off (only for 2 symbol) | On/Off | On/Off |
| Freq.cy resource of $2^{nd}$ hop if FH is enabled | Configurability | ✓ | ✓ | ✓ | ✓ | ✓ |
| | Value range | 0-274 | 0-274 | 0-274 | 0-274 | 0-274 |
| Index of initial cyclic shift | Configurability | ✓ | ✓ | N.A. | N.A. | N.A. |
| | Value range | 0-11 | 0-11 | N.A. | N.A. | N.A. |
| Index of time-domain OCC | Configurability | N.A. | ✓ | N.A. | N.A. | N.A. |
| | Value range | N.A. | 0-6 | N.A. | N.A. | N.A. |
| Length of Pre-DFT OCC | Configurability | N.A. | N.A. | N.A. | N.A. | ✓ |
| | Value range | N.A. | N.A. | N.A. | N.A. | 2, 4 |
| Index of Pre-DFT OCC | Configurability | N.A. | N.A. | N.A. | N.A. | ✓ |
| | Value range | N.A. | N.A. | N.A. | N.A. | 0, 1, 2, 3 |

Meanwhile, in order to improve the uplink coverage, multi-slot repetitive can be supported for PUCCH formats 1, 3, and 4, and the PUCCH repetition can be configured for each PUCCH format.

The UE performs repetitive transmission for the PUCCH including UCI by the number of times corresponding to the number of slots configured through higher-layer signaling nrofSlots. For PUCCH repetitive transmission, PUCCH transmission of each slot may be performed using the same number of successive symbols, and the number of corresponding successive symbols may be configured through nrofSymbols in PUCCH-format 1, PUCCH-format 3, or PUCCH-format 4 which is higher-layer signaling. For PUCCH repetitive transmission, PUCCH transmission of each slot may be performed using the same start symbol, and corresponding start symbol may be configured through startingSymbolIndex in PUCCH-format 1, PUCCH-format 3, or PUCCH-format 4 which is higher-layer signaling.

When the UE receives a configuration of frequency hopping in PUCCH transmission in different slots for PUCCH repetitive transmission, the UE performs frequency hopping in units of slots. Further, when the UE receives a configuration of frequency hopping in PUCCH transmission in different slots, the UE starts PUCCH transmission from a first PRB index configured through higher-layer signaling startingPRB in an even-numbered slot and starts PUCCH transmission from a second PRB index configured through higher-layer signaling secondHopPRB in an odd-numbered slot.

In addition, when the UE receives a configuration of frequency hopping in PUCCH transmission in different slots, an index of a slot for first PUCCH transmission indicated to the UE is 0, and the number of PUCCH repetitive transmissions increases regardless of PUCCH transmission in each slot during all of the configured PUCCH repetitive transmissions. When the UE receives a configuration of frequency hopping in PUCCH transmission in different slots, the UE does not expect a configuration of frequency hopping within the slot for PUCCH transmission. When the UE does not receive a configuration of frequency hopping in PUCCH transmission in different slots and receives a configuration of frequency hopping within the slot, first and second RPB indexes are equally applied within the slot.

Subsequently, a PUCCH resource configuration of the BS or the UE is described. The BS can configure PUCCH resources for each BWP through a higher layer for a specific UE. The corresponding configuration may be as shown in Table 21 below.

TABLE 21

```
PUCCH-Config ::=                    SEQUENCE {
    resourceSetToAddModList         SEQUENCE (SIZE
(1..maxNrofPUCCH-ResourceSets)) OF PUCCH-ResourceSet
OPTIONAL, -- Need N
    resourceSetToReleaseList        SEQUENCE (SIZE
(1..maxNrofPUCCH-ResourceSets)) OF PUCCH-ResourceSetId
OPTIONAL, -- Need N
    resourceToAddModList            SEQUENCE (SIZE
(1..maxNrofPUCCH-Resources)) OF PUCCH-Resource
OPTIONAL, -- Need N
    resourceToReleaseList           SEQUENCE (SIZE
(1..maxNrofPUCCH-Resources)) OF PUCCH-ResourceId
OPTIONAL, -- Need N
    format1                         SetupRelease {
PUCCH-FormatConfig }
OPTIONAL, -- Need M
    format2                         SetupRelease {
PUCCH-FormatConfig }
OPTIONAL, -- Need M
    format3                         SetupRelease {
PUCCH-FormatConfig }
OPTIONAL, -- Need M
    format4                         SetupRelease {
PUCCH-FormatConfig }
OPTIONAL, -- Need M
    schedulingRequestResourceToAddModList  SEQUENCE (SIZE
(1..maxNrofSR-Resources)) OF SchedulingRequestResourceConfig
OPTIONAL, -- Need N
    schedulingRequestResourceToReleaseList SEQUENCE (SIZE
(1..maxNrofSR-Resources)) OF SchedulingRequestResourceId
OPTIONAL, -- Need N
    multi-CSI-PUCCH-ResourceList    SEQUENCE (SIZE
(1..2)) OF PUCCH-ResourceId
OPTIONAL, -- Need M
    dl-DataToUL-ACK                 SEQUENCE (SIZE
(1..8)) OF INTEGER (0..15)
OPTIONAL, -- Need M
```

TABLE 21-continued

```
    spatialRelationInfoToAddModList         SEQUENCE (SIZE
(1..maxNrofSpatialRelationInfos)) OF PUCCH-
SpatialRelationInfo
OPTIONAL, -- Need N
    spatialRelationInfoToReleaseList        SEQUENCE (SIZE
(1..maxNrofSpatialRelationInfos)) OF PUCCH-
SpatialRelationInfoId
OPTIONAL, -- Need N
    pucch-PowerControl                      PUCCH-
PowerControl
OPTIONAL, -- Need M
    ...,
}
```

According to the above table, one or a plurality of PUCCH resource sets may be configured within a PUCCH resource configuration for a specific BWP, and a maximum payload value for UCI transmission may be configured in some of the PUCCH resource sets. One or a plurality of PUCCH resources may belong to each PUCCH resource set, and each PUCCH resource may belong to one of the PUCCH formats.

Among the PUCCH resource sets, a maximum payload value of a first PUCCH resource set may be fixed to 2 bits, and accordingly the corresponding value may not be separately configured through a higher layer. When the remaining PUCCH resource sets are configured, indexes of the corresponding PUCCH resource sets may be configured in an ascending order according to the maximum payload value, and no maximum payload value may be configured in the last PUCCH resource set. A higher-layer configuration for the PUCCH resource set may be as shown in Table 22 below.

TABLE 22

```
PUCCH-ResourceSet ::=              SEQUENCE {
    pucch-ResourceSetId            PUCCH-
ResourceSetId,
    resourceList                   SEQUENCE (SIZE
(1..maxNrofPUCCH-ResourcesPerSet)) OF PUCCH-ResourceId,
    maxPayloadSize                 INTEGER (4..256)
OPTIONAL  -- Need R
}
```

IDs of the PUCCH resources belonging to the PUCCH resource set may be included in a parameter resourceList of the above table.

In initial access or when no PUCCH resource set is configured, a PUCCH resource set shown in Table 23 below including a plurality of cell-specific PUCCH resources may be used in the initial BWP. In the PUCCH resource set, a PUCCH resource to be used for initial access may be indicated through SIB1.

TABLE 23

| Index | PUCCH format | First symbol | Number of symbols | PRB offset $RB_{BWP}^{offset}$ | Set of initial CS indexes |
|---|---|---|---|---|---|
| 0 | 0 | 12 | 2 | 0 | {0, 3} |
| 1 | 0 | 12 | 2 | 0 | {0, 4, 8} |
| 2 | 0 | 12 | 2 | 3 | {0, 4, 8} |
| 3 | 1 | 10 | 4 | 0 | {0, 6} |
| 4 | 1 | 10 | 4 | 0 | {0, 3, 6, 9} |
| 5 | 1 | 10 | 4 | 2 | {0, 3, 6, 9} |
| 6 | 1 | 10 | 4 | 4 | {0, 3, 6, 9} |
| 7 | 1 | 4 | 10 | 0 | {0, 6} |
| 8 | 1 | 4 | 10 | 0 | {0, 3, 6, 9} |
| 9 | 1 | 4 | 10 | 2 | {0, 3, 6, 9} |

TABLE 23-continued

| Index | PUCCH format | First symbol | Number of symbols | PRB offset $RB_{BWP}^{offset}$ | Set of initial CS indexes |
|---|---|---|---|---|---|
| 10 | 1 | 4 | 10 | 4 | {0, 3, 6, 9} |
| 11 | 1 | 0 | 14 | 0 | {0, 6} |
| 12 | 1 | 0 | 14 | 0 | {0, 3, 6, 9} |
| 13 | 1 | 0 | 14 | 2 | {0, 3, 6, 9} |
| 14 | 1 | 0 | 14 | 4 | {0, 3, 6, 9} |
| 15 | 1 | 0 | 14 | $\lfloor N_{BWP}^{size}/4 \rfloor$ | {0, 3, 6, 9} |

A maximum payload of each PUCCH resource included in the PUCCH resource set may be 2 bits in the case of PUCCH format 0 or 1, and may be determined by the symbol length, the number of PRBs, and a maximum code rate in the case of remaining formats. The symbol length and the number of PRBs may be configured for each PUCCH resource, and the maximum code rate may be configured for each PUCCH format.

Subsequently, selection of PUCCH resources for UCI transmission is described. In the case of SR transmission, a PUCCH resource for an SR corresponding to schedulingRequestID may be configured through a higher layer as show in Table 24. The PUCCH resource may be a resource belonging to PUCCH format 0 or PUCCH format 1.

TABLE 24

```
SchedulingRequestResourceConfig ::=    SEQUENCE {
    schedulingRequestResourceId
SchedulingRequestResourceId,
    schedulingRequestID                 SchedulingRequestId,
    periodicityAndOffset                CHOICE {
        sym2                            NULL,
        sym6or7                         NULL,
        sl1                             NULL,
-- Recurs in every slot
        sl2                             INTEGER (0..1),
        sl4                             INTEGER (0..3),
        sl5                             INTEGER (0..4),
        sl8                             INTEGER (0..7),
        sl10                            INTEGER (0..9),
        sl16                            INTEGER (0..15),
        sl20                            INTEGER (0..19),
        sl40                            INTEGER (0..39),
        sl80                            INTEGER (0..79),
        sl160                           INTEGER (0..159),
        sl320                           INTEGER (0..319),
        sl640                           INTEGER (0..639)
    }
OPTIONAL,                               -- Need M
    resource                            PUCCH-ResourceId
OPTIONAL                                -- Need M
}
```

A transmission period and an offset of the configured PUCCH resource may be configured through a parameter periodicityAndOffset in Table 24. When there is uplink data to be transmitted by the UE at a time point corresponding to the configured period and offset, the corresponding PUCCH resource may be transmitted, and otherwise, the corresponding PUCCH resource may not be transmitted.

In the case of CSI transmission, PUCCH resources to transmit a periodic or semi-persistent CSI report through the PUCCH may be configured in a parameter pucch-CSI-ResourceList through higher-layer signaling as shown in Table 25 below. The parameter includes a list of the PUCCH resource for each BWP for a cell or a CC to which the corresponding CSI report is transmitted. The PUCCH resource may be a resource belonging to PUCCH format 2, PUCCH format 3, or PUCCH format 4.

TABLE 25

```
CSI-ReportConfig ::=    SEQUENCE {
    reportConfigId          CSI-ReportConfigId,
    carrier                 ServCellIndex       OPTIONAL,  -- Need S
    ...
    reportConfigType        CHOICE {
        periodic            SEQUENCE {
            reportSlotConfig        CSI-ReportPeriodicityAndOffset,
            pucch-CSI-ResourceList  SEQUENCE (SIZE (1..maxNrofBWPs)) OF
PUCCH-CSI-Resource
        },
    ...
}
```

The transmission period and the offset of the PUCCH resource are configured through reportSlotConfig in Table 25.

In the case of HARQ-ACK transmission, a resource set of the PUCCH resource to be transmitted is first selected according to a payload of UCI including the corresponding HARQ-ACK. That is, a PUCCH resource set having a minimum payload which is not smaller than the UCI payload is selected. Subsequently, a PUCCH resource within the PUCCH resource set may be selected through a PUCCH resource indicator (PRI) within DCI scheduling a TB corresponding to the corresponding HARQ-ACK, and the PRI may be a PUCCH resource indicator shown in Table 5 or Table 6. The relation between the PRI configured through higher-layer signaling and the PUCCH resource selected from the PUCCH resource set may be as shown in Table 26 below.

TABLE 26

| PUCCH resource indicator | PUCCH resource |
|---|---|
| '000' | $1^{st}$ PUCCH resource provided by pucch-ResourceId obtained from the $1^{st}$ value of resourceList |
| '001' | $2^{nd}$ PUCCH resource provided by pucch-ResouceId obtained from the $2^{nd}$ value of resourceList |
| '010' | $3^{rd}$ PUCCH resource provided by pucch-ResourceId obtained from the $3^{rd}$ value of resourceList |
| '011' | $4^{th}$ PUCCH resource provided by pucch-ResourceId obtained from the $4^{th}$ value of resourceList |
| '100' | $5^{th}$ PUCCH resource provided by pucch-ResourceId obtained from the $5^{th}$ value of resourceList |
| '101' | $6^{th}$ PUCCH resource provided by pucch-ResourceId obtained from the $6^{th}$ value of resourceList |

TABLE 26-continued

| PUCCH resource indicator | PUCCH resource |
|---|---|
| '110' | 7th PUCCH resource provided by pucch-ResourceId obtained from the 7th value of resourceList |
| '111' | 8th PUCCH resource provided by pucch-ResourceId obtained from the 8th value of resourceList |

When the number of PUCCH resources within the selected PUCCH resource set is larger than 8, a PUCCH resource may be selected by the following equation.

$$r_{PUCCH} = \begin{cases} \left\lfloor \frac{n_{CCE,p} \cdot \lfloor R_{PUCCH}/8 \rfloor}{N_{CCE,p}} \right\rfloor + \Delta_{PRI} \cdot \left\lceil \frac{R_{PUCCH}}{8} \right\rceil & \text{if } \Delta_{PRI} < R_{PUCCH} \bmod 8 \\ \left\lfloor \frac{n_{CCE,p} \cdot \lfloor R_{PUCCH}/8 \rfloor}{N_{CCE,p}} \right\rfloor + & \\ \Delta_{PRI} \cdot \left\lfloor \frac{R_{PUCCH}}{8} \right\rfloor + R_{PUCCH} \bmod 8 & \text{if } \Delta_{PRI} \geq R_{PUCCH} \bmod 8 \end{cases}$$

Equation 1

In the above equation, $r_{PUCCH}$ denotes an index of a PUCCH resource selected within a PUCCH resource set, $R_{PUCCH}$ denotes the number of PUCCH resources belonging to a PUCCH resource set, $\Delta_{PRI}$ denotes a PRI value, $N_{CCE,p}$ denotes the total number of CCEs of a CORESET p to which received DCI belongs, and $n_{CCE,p}$ denotes a first CCE index for received DCI.

A time point at which the corresponding PUCCH resource is transmitted is after $K_1$ slots from TB transmission corresponding to the corresponding HARQ-ACK. Candidates of $K_1$ are configured through a higher layer and, more specifically, are configured in a parameter dl-DataToUL-ACK within PUCCH-Config shown in Table 21. Among the candidates, one value of $K_1$ may be selected by a PDSCH-to-HARQ feedback timing indicator within DCI scheduling TB, and the value may be a value shown in Table 5 or Table 6. Meanwhile, the unit of $K_1$ may be a slot or a subslot. The subslot is a unit of the length smaller than the slot, and one or a plurality of symbols may correspond to one subslot.

Subsequently, the case in which two or more PUCCH resources are located within one slot is described. The UE may transmit UCI through one or two PUCCH resources within one slot or subslot, and when UCI is transmitted through two PUCCH resources within one slot/subslot, i) each PUCCH resource may not overlap in units of symbols and ii) at least one PUCCH resource may be short PUCCHs. Meanwhile, the UE may not expect transmission of a plurality of PUCCH resources for HARQ-ACK transmission within one slot.

Subsequently, a PUCCH transmission procedure in which two or more PUCCH resources overlap is described. When two or more PUCCH resources overlap, one of the PUCCH resources which overlap may be selected or a new PUCCH resource may be selected according to the above-described condition, that is, a condition in which transmission PUCCH resources does not overlap in units of symbols. Further, a UCI payload transmitted through the overlapping PUCCH resource may be all multiplexed and transmitted or some thereof may be dropped. First, the case (case 1) in which no multi-slot repetitive is configured in the PUCCH resource and the case (case 2) in which multi-slot repetition is configured are described.

In case 1, the case in which the PUCCH resources overlap may be divided into case 1-1) in which two or more PUCCH resources for HARQ-ACK transmission overlap and case 1-2) corresponding to the remaining cases.

Figure 9:
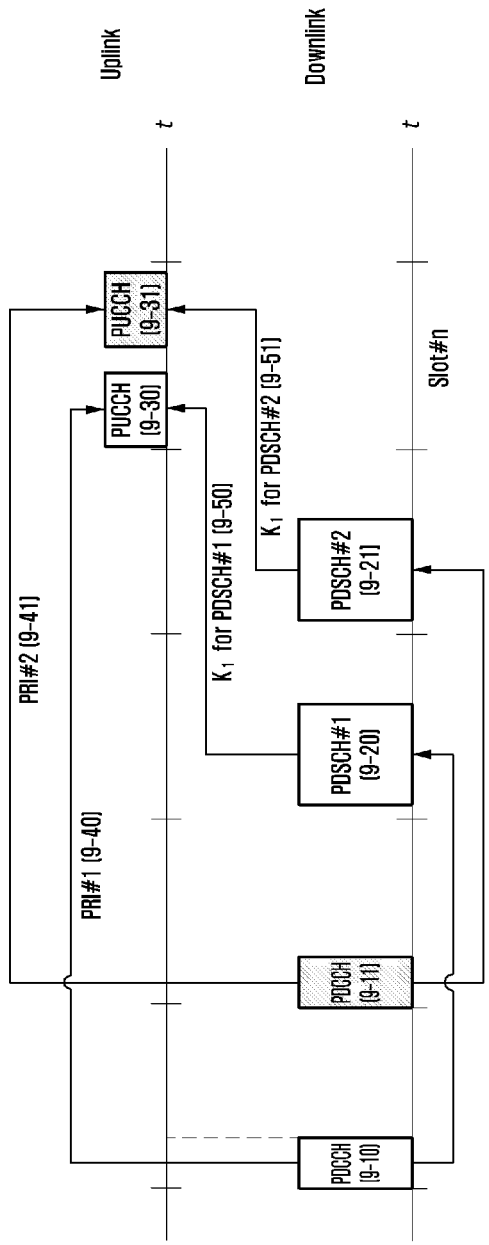
FIG. 9 illustrates the case in which, when no multi-slot repetition is configured, a plurality of physical uplink control channel (PUCCH) resources for hybrid automatic repeat request (HARQ)-acknowledgement (ACK) transmission for a PDSCH overlap according to an embodiment of the disclosure.

The case corresponding to case 1-1 is illustrated in FIG. 9.

FIG. 9 illustrates the case in which, when no multi-slot repetition is configured, a plurality of physical uplink control channel (PUCCH) resources for hybrid automatic repeat request (HARQ)-acknowledgement (ACK) transmission for a PDSCH overlap according to an embodiment of the disclosure. Referring to FIG. 9, when transmission slots of PUCCH resources corresponding to respective PDCCHs are the same, the respective PDCCHs being two or more different PDCCHs 9-10 and 9-11 for scheduling PDSCHs, it may be considered that the corresponding PUCCH resources overlap each other. That is, when uplink slots corresponding to values of $K_1$ 9-50 and 9-51 indicated by a plurality of PDCCHs are the same, it may be considered that PUCCH resources corresponding to the corresponding PDCCHs overlap each other.

At this time, only a PUCCH resource 9-31 selected on the basis of a PRI 9-41 corresponding to a PDCCH 9-11 transmitted last among PUCCH resources indicated by PRIs 9-40 and 9-41 within the PDCCHs is selected and HARQ-ACK information is transmitted in the PUCCH resource. Accordingly, all of the HARQ-ACK information for the PDSCH 9-21 and the HARQ-ACK information for another PUCCH 9-30 overlapping the PUCCH resource 9-31 are encoded by a predefined HARQ-ACK codebook and then transmitted through the selected PUCCH resource 9-31.

Subsequently, the case corresponding to case 1-2) in which the PUCCH resource for HARQ-ACK resource and the PUCCH resource for SR and/or CSI transmission overlap or a plurality of PUCCH resources for SR and/or CSI transmission overlap is described. In the above case, it may be defined that, when a plurality of PUCCH resources transmitted in the same slots overlap in the time axis by one or more symbols, and whether UCIs within the resources are multiplexed may be as shown in Table 27 below.

TABLE 27

| PUCCH 1 / PUCCH 2 | SR | HARQ-ACK | CSI |
|---|---|---|---|
| SR | — | Case 1-2-1 (Multiple or not depending on PUCCH format) | Always multiplex |
| HARQ-ACK | | Always multiplex (HARQ-ACK codebook) | Case 1-2-2 (Multiplex or not by higher layer) |
| CSI | Always multiplex | Case 1-2-2 | Case 1-2-2 |

According to the above table, when PUCCH resources for transmitting HARQ-ACK overlap or when PUCCHs for transmitting the SR and the CSI overlap, UCIs thereof are always multiplexed.

Meanwhile, PUCCH resources for transmitting the SR and the HARQ-ACK overlap, that is, in case 1-2-1, whether to multiplex the UCI is determined according to formats of the PUCCH resources.

SR on PUCCH format 0+HARQ-ACK on PUCCH format 1: SR is dropped and only HARQ-ACK is transmitted Remaining cases: both SR and HARQ-ACK are multiplexed Further, in the remaining cases corresponding to case 1-2-2, that is, the case in which PUCCH resources for transmitting HARQ-ACK and the CSI overlap or a plurality of PUCCH resources for transmitting CSIs overlap, whether to multiplex UCIs thereof may be determined by a higher-layer configuration. Further, the configuration indicating whether to multiplex the HARQ-ACK and the CSI and the configuration indicating whether to multiplex a plurality of CSIs may be independently made.

For example, whether to multiplex the HARQ-ACK and the CSI may be configured through a parameter simultaneousHARQ-ACK-CSI for each PUCCH format 2, 3, or 4, and the corresponding parameters may have the same value for all of the PUCCH formats. When the parameter is configured to not perform multiplexing, only HARQ-ACK is transmitted and the overlapping CSI may be dropped. Further, whether to multiplex a plurality of CSIs may be configured through a parameter multi-CSI-PUCCH-ResourceList within PUCCH-Config. That is, when the parameter multi-CSI-PUCCH-ResourceList is configured, multiplexing between CSIs may be performed, and otherwise, only a PUCCH corresponding to CSI having a higher priority may be transmitted according to a CSI priority.

When the UCI multiplexing is performed as described above, a method of selecting a PUCCH resource to transmit a UCI resource and a multiplexing method may follow information on overlapping UCI and a format of the PUCCH resource, which may be defined as shown in Table 28 below.

TABLE 28

| PUCCH 1<br>PUCCH 2 | SR<br>(format 0/1) | HARQ-ACK |  | CSI<br>(format 2/3/4) |
|---|---|---|---|---|
|  |  | Format 1 | Format 0/2/3/4 |  |
| SR<br>(format 0/1) | — | Option 1 | Option 2 | Option 3 |
| HARQ-ACN | Option 1 | Option 4 | Option 4 | Option 5<br>(grant-based)<br>Option 6 (SPS) |
|  | Option 2 | Option 4 | Option 4 | Option 5<br>(grant-based)<br>Option 6 (SPS) |
| CSI<br>(format 2/3/4) | Option 3 | Option 5<br>(grant-based)<br>Option 6<br>(SPS) | Option 5<br>(grant-based)<br>Option 6<br>(SPS) | Option 7 |

Each option in the above table is described below.

Option 1: the UE selects a different PUCCH resource according to an SR value of an SR PUCCH resource overlapping an HARQ-ACK PUCCH resource. That is, the UE selects a PUCCH resource for SR when the SR value is positive, and selects a PUCCH resource for HARQ-ACK when the SR value is negative. HARQ-ACK information is transmitted through the selected PUCCH resource.

Option 2: the UE multiplex and transmit HARQ-ACK information and SR information through the PUCCH resource for HARQ-ACK transmission.

Option 3: the UE multiplexes and transmits SR information and CSI through the PUCCH resource for CSI transmission.

Option 4: PUCCH resource transmission for overlapping between HARQ—ACKs—a detailed operation is described in case 1-1).

Option 5: when the PUCCH resource for HARQ-ACK corresponding to a PDSCH scheduled by a PDCCH overlaps the PUCCH resource for CSI transmission and multiplexing between HARQ-ACK and CSI is configured through a higher layer, the UE multiplexes and transmits HARQ-ACK information and CSI information through the PUCCH resource for HARQ-ACK.

Option 6: when the PUCCH resource for HARQ-ACK corresponding to a semi-persistent scheduling PDSCH overlaps the PUCCH resource for CSI transmission and multiplexing between HARQ-ACK and CSI is configured through a higher layer, the UE multiplexes and transmits HARQ-ACK information and CSI information through the PUCCH resource for CSI transmission.

When a PUCCH resource list, that is, multi-CSI-PUCCH-ResourceList for multiplexing is configured through a higher layer, the UE selects one resource having the lowest index which can transmit all of the multiplexed UCI payloads from among the resources in the list and then transmits the UCI payloads. When there is no resource which can transmit all of the multiplexed UCI payloads in the list, the UE selects a resource having the highest index and then transmit HARQ-ACK and CSI reports which can be transmitted through the corresponding resource.

Option 7: when a plurality of PUCCH resources for CSI transmission overlap and multiplexing between a plurality of CSIs is configured through a higher layer, the UE selects one resource having the lowest index which can transmit all of the multiplexed UCI payload in a PUCCH resource list, that is, multi-CSI-PUCCH-ResourceList for CSI multiplexing configured through a higher layer and then transmits the UCI payloads. When there is no resource which can transmit all of the multiplexed UCI payloads in the list, the UE selects a resource having the highest index and then transmit CSI reports which can be transmitted through the corresponding resource.

For convenience of description, the case in which two PUCCH resources overlap has been mainly described, but the method may be equally applied to the case in which three or more PUCCH resources overlap. For example, when a PUCCH resource multiplexing SR-HARQ-ACK overlaps a CSI PUCCH resource, a multiplexing method between HARQ-ACK and CSI may be performed.

When no multiplexing between specific UCIs is configured, UCI having a high priority is transmitted according to the priority of HARQ-ACK>SR>CSI and UCI having a low priority may be dropped. When no multiplexing is configured for overlapping between a plurality of CSI PUCCH resources, a PUCCH corresponding to a high priority CSI may be transmitted and PUCCHs corresponding to other CSIs may be dropped.

Case 2, that is, the case in which multi-slot repetition is configured is divided into case 2-1) in which two or more PUCCH resources for HARQ-ACK transmission are located in the same start slot and case 2-2) corresponding to the remaining cases. Respective cases are illustrated in FIG. 10.

Figure 10:
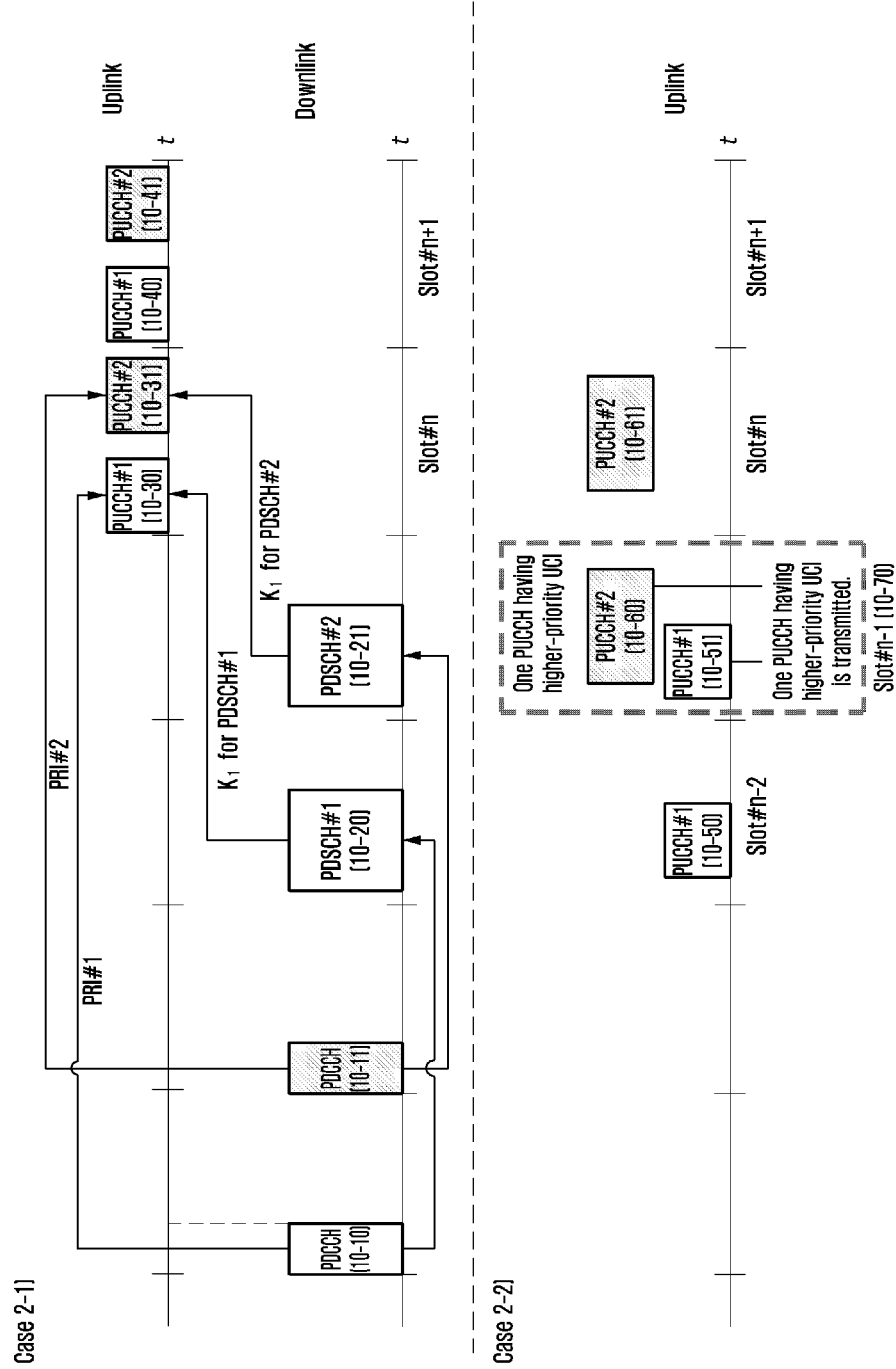
FIG. 10 illustrates the case in which PUCCH resources overlap when multi-slot repetitive is configured according to an embodiment of the disclosure.

FIG. 10 illustrates the case in which PUCCH resources overlap when multi-slot repetitive is configured according to an embodiment of the disclosure.

Referring to case 2-1), when multi-slot repetition is configured in a PUCCH resource for HARQ-ACK, that is, when PUCCH #1 is repeatedly transmitted over a plurality of slots as indicated by reference numerals 10-30 and 10-40 and PUCCH #2 is also repeatedly transmitted over a plurality of slots as indicated by reference numerals 10-31 and 10-41, if start slots of the two PUCCHs indicated by $K_1$ are the same, a single PUCCH resource (a PUCCH transmitted last in one slot), that is, PUCCH #2 may be selected like in case 1-1). Accordingly, HARQ-ACK information corresponding to PDSCH #1 and PDSCH #2 are multiplexed and transmitted to the corresponding PUCCH through an HARQ-ACK codebook.

For convenience of description, although the case in which a plurality of PUCCHs of multi-slot repetition overlap has been described as an example, the same method may be applied to the case in which multi-slot repetition PUCCH overlaps a PUCCH transmitted in a single slot.

Case 2-2) corresponds to the case in which symbol unit overlapping is generated between a PUCCH for HARQ-ACK transmission and a PUCCH for SR or CSI transmission or between PUCCHs for a plurality of SRs or CSI transmissions. That is, the case in which PUCCH #1 is repeatedly transmitted over a plurality of slots as indicated by reference numerals 10-50 and 10-51 and PUCCH #2 is also repeatedly transmitted over a plurality of slots as indicated by reference numerals 10-60 and 10-61 corresponds to the case in which PUCCH #1 and PUCCH #2 overlap by one or more symbols in one slot 10-70.

In PUCCHs overlapping by one or more symbols in the corresponding slot 10-70, priorities of UCIs within the PUCCHs are compared, and then a UCI having a high priority is transmitted and the other UCIs are dropped in the corresponding slot. At this time, the UCI priorities are HARQ-ACK>SR>CSI sequentially from the highest order.

Further, when a plurality of CSI PUCCH resources overlap, a PUCCH corresponding to a CSI having a higher priority may be transmitted and PUCCHs corresponding to the other CSIs may be dropped in the corresponding slot. The PUCCH transmission or drop according to the priority is performed only in a slot having symbol unit overlapping and it not performed in other slots. That is, the PUCCH in which multi-slot repetition is configured may be dropped in the slot having symbol unit overlapping but may be transmitted in the remaining slots as configured.

For convenience of description, although the case in which a plurality of PUCCHs of multi-slot repetition overlap has been described as an example, the same method may also be applied to the case in which the multi-slot repetition PUCCH overlaps a PUCCH transmitted in a single slot.

Overlapping between PUCCH and PUSCH transmissions is described. When the UE performs PUCCH transmission in a first slot and PUSCH transmission in a second slot among $N_{PUCCH}^{repeat}$ >1 repetitive transmissions and the PUCCH transmission overlaps the PUSCH transmission in one or a plurality of slots, and when UCIs within the PUSCHs are multiplexed in overlapping slots, the UE transmits the PUCCH but does not transmit the PUSCH in slots in which the PUCCH and the PUSCH overlap.

In single slot transmission and multi-slot repetition of the PUCCH, the slot described for a low-latency service such as URLLC may be replaced with a mini-slot. The mini-slot has a length shorter than the slot in the time axis, and one mini-slot includes symbols smaller than 14 symbols. For example, two or seven symbols may correspond to one mini-slot. When the mini-slot is configured through a higher layer, the unit of the HARQ-ACK feedback timing K1 and the number of repetitive transmissions may be changed from the unit of the conventional slot to the unit of the mini-slot. The mini-slot configuration may be applied to all PUCCH transmissions or may be limited to PUCCH transmission for a specific service. For example, while slot unit transmission may be applied to a PUCCH for an eMBB service, mini-slot unit transmission may be applied to a PUCCH for a URLLC service.

Subsequently, a beam configuration to be applied to PUCCH transmission is described. When the UE does not have a UE-specific configuration for a P"UCCH resource configuration (dedicated PUCCH resource configuration), the PUCCH resource set is provided through higher-layer signaling pucch-ResourceCommon in which case a beam configuration for PUCCH transmission follows a beam configuration used in PUSCH transmission scheduled through a random access response (RAR) UL grant. When the UE has a UE-specific configuration for a PUCCH resource configuration (dedicated PUCCH resource configuration), a beam configuration for PUCCH transmission is provided through higher-layer signaling pucch-spatialRelationInfold shown in Table 29 below. When the UE receives a configuration of one pucch-spatialRelationInfold, the beam configuration for PUCCH transmission of the UE is provided through one pucch-spatialRelationInfold. When the UE receives a configuration of a plurality of pucch-spatialRelationInfoID, the UE receives an indication of activation for one of the plurality of pucch-spatialRelationInfoID through a MAC control element (CE). The UE may receive a configuration of a maximum of eight pucch-spatialRelationInfoID through higher-layer signaling and receive an indication of activation for only one pucch-spatialRelationInfoID.

When the UE receives an indication of activation for pucch-spatialRelationInfoID through the MAC CE, the UE applies activation of pucch-spatialRelationInfoID through the MAC CE, starting at a first slot after $3N_{slot}^{subframe,\mu}$ slots from a slot for HARQ-ACK transmission for a PDSCH transmitting the MAC CE including activation information of pucch-spatialRelationInfoID. μ is numerology applied to PUCCH transmission, and $N_{slot}^{subframe,\mu}$ is the number of slots per subframe in the given numerology. A higher-layer configuration for pucch-spatialRelationInfo may be as shown in Table 29 below. pucch-spatialRelationInfo may be interchangeably used with PUCCH beam information.

TABLE 29

| | |
|---|---|
| PUCCH-SpatialRelationInfo ::= | SEQUENCE { |
| pucch-SpatialRelationInfoId | PUCCH-SpatialRelationInfoId, |
| servingCellId | ServCellIndex         OPTIONAL, -- |
| Need S | |
| referenceSignal | CHOICE { |
| ssb-Index | SSB-Index, |
| csi-RS-Index | NZP-CSI-RS-ResourceId, |
| srs | SEQUENCE { |
| | resource |
| SRS-ResourceId, | |
| | uplinkBWP     BWP-Id |
| | } |
| }, | |
| pucch-PathlossReferenceRS-Id | PUCCH-PathlossReferenceRS-Id, |
| p0-PUCCH-Id | P0-PUCCH-Id, |

TABLE 29-continued

| closedLoopIndex | ENUMERATED { i0, i1 } |
|---|---|
| } | |
| PUCCH-SpatialRelationInfoId ::= | INTEGER (1..maxNrofSpatialRelationInfos) |

According to Table 29 above, one referenceSignal configuration may exist within a specific pucch-spatialRelationInfo configuration, and the corresponding referenceSignal may be ssb-Index indicating a specific SS/PBCH, csi-RS-Index indicating a specific CSI-RS, or srs indicating a specific SRS. When referenceSignal is configured as ssb-Index, the UE may configure a beam used for reception of an SS/PBCH corresponding to ssb-Index among the SS/PBCHs within the same serving cell as the beam for PUCCH transmission or, when servingCellId is provided, configure a beam used for reception of an SS/PBCH corresponding to ssb-Index among the SS/PBCHs within a cell indicated by servingCellId as the beam for pucch transmission. When referenceSignal is configured as csi-RS-Index, the UE may configure a beam used for reception of a CSI-RS corresponding to csi-RS-Index among the CSI-RSs within the same serving cell as the beam for PUCCH transmission or, when servingCellId is provided, configure a beam used for reception of a CSI-RS corresponding to csi-RS-Index among the CSI-RSs within a cell indicated by servingCellId as the beam for pucch transmission. When referenceSignal is configured as srs, the UE may configure a transmission beam used for transmission of an SRS corresponding to a resource index provided through a higher-layer signaling resource within the same serving cell and/or an activated uplink BWP as the beam for PUCCH transmission or, when servingCellID and/or uplinkBWP is provided, configure a transmission beam used for transmission of an SRS corresponding to a resource index provided through a higher-layer signaling resource within a cell indicated by serving-CellID and/or uplinkBWP and/or an uplink BWP as the beam for PUCCH transmission.

Within a specific pucch-spatialRelationInfo configuration, one pucch-PathlossReferenceRS-Id configuration may exist.

PUCCH-PathlossReferenceRS in Table 30 can be mapped to pucch-PathlossReferenceRS-Id of Table 29, and a maximum of four PUCCH-PathlossReferenceRS can be configured through pathlossReferenceRSs within higher-layer signaling PUCCH-PowerControl in Table 30. The ssb-Index is configured when PUCCH-PathlossReferenceRS is connected to the SS/PBCH through referenceSignal in Table 30, and csi-RS-Index is configured when PUCCH-PathlossReferenceRS is connected to the CSI-RS.

TABLE 30

```
PUCCH-PowerControl ::=           SEQUENCE {
    deltaF-PUCCH-f0              INTEGER (-16..15)   OPTIONAL, -- Need R
    deltaF-PUCCH-f1              INTEGER (-16..15)   OPTIONAL, -- Need R
    deltaF-PUCCH-f2              INTEGER (-16..15)   OPTIONAL, -- Need R
    deltaF-PUCCH-f3              INTEGER (-16..15)   OPTIONAL, -- Need R
    deltaF-PUCCH-f4              INTEGER (-16..15)   OPTIONAL, -- Need R
    p0-Set                       SEQUENCE (SIZE (1..maxNrofPUCCH-P0-PerSet)) OF
P0-PUCCH OPTIONAL, -- Need M
    pathlossReferenceRSs         SEQUENCE (SIZE
(1..maxNrofPUCCH-PathlossReferenceRSs)) OF PUCCH-PathlossReferenceRS   OPTIONAL, --
Need M
    twoPUCCH-PC-AdjustmentStates ENUMERATED {twoStates}       OPTIONAL, -- Need
S
    ...,
}
P0-PUCCH ::=                     SEQUENCE {
    p0-PUCCH-Id                  P0-PUCCH-Id,
    p0-PUCCH-Value               INTEGER (-16..15)
}
P0-PUCCH-Id ::=                  INTEGER (1..8)
PUCCH-PathlossReferenceRS ::=    SEQUENCE {
    pucch-PathlossReferenceRS-Id PUCCH-PathlossReferenceRS-Id,
    referenceSignal              CHOICE {
        ssb-Index                   SSB-Index,
        csi-RS-Index                NZP-CSI-RS-ResourceId
    }
}
```

Figure 11:
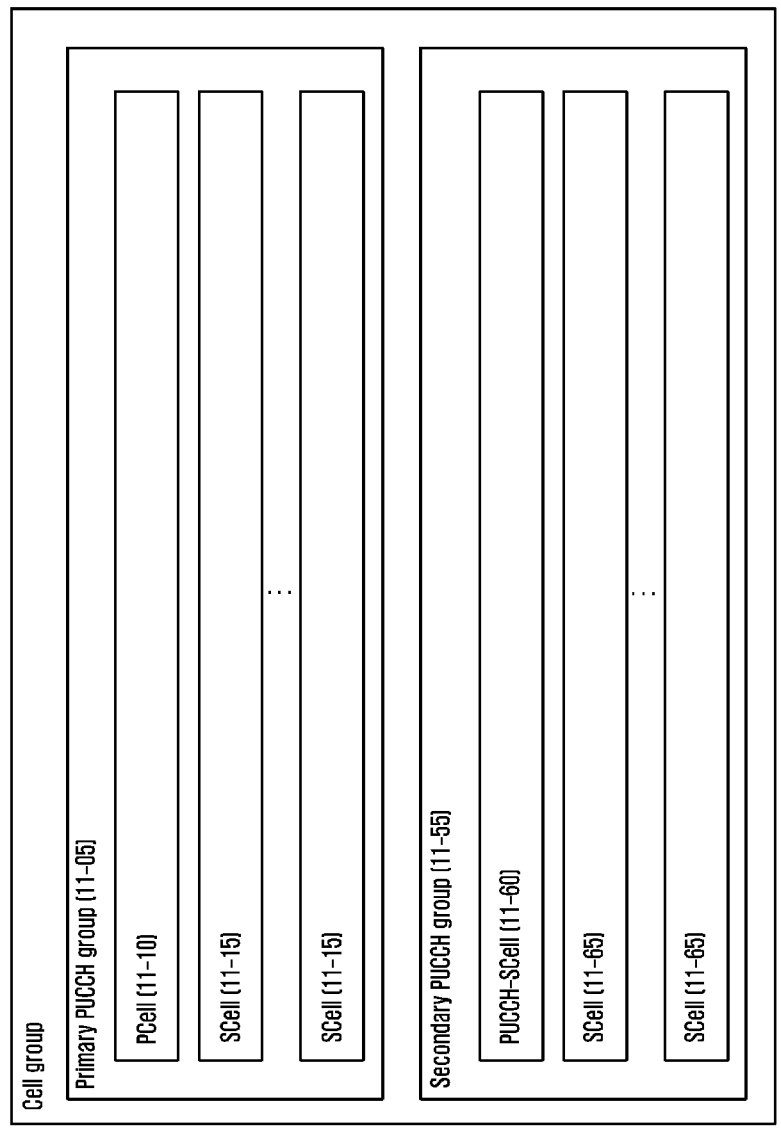
FIG. 11 illustrates an example of the type of uplink carriers which can be configured with a cell group and channels which can be transmitted for each carrier according to an embodiment of the disclosure.

The BS and/or the UE can transmit and receive a downlink and/or uplink signal in a plurality of carriers through carrier aggregation. FIG. 11 illustrates an example of the type of uplink carriers which can be configured with a cell group and channels which can be transmitted for each carrier according to an embodiment of the disclosure. In Rel-15 NR, one or two PUCCH groups may be configured within one cell group. The number of PUCCH groups is the number of uplink carriers which can transmit a PUCCH within one cell group. Among the PUCCH groups, a first PUCCH group may be named a primary PUCCH group 11-05, and the primary PUCCH group includes a PCell and one or more SCells. Alternatively, the SCell may not be configured.

The PCell indicates a carrier having an initial access and handover process, and contention-based and/or contention-free-based random access, a PUCCH, a PUSCH, and an SRS channel may be transmitted in the PCell 11-10. Meanwhile, the SCell indicates a carrier which can be added/changed to SCell addition/modification after the RRC Connection, and a contention-free-based random access, a PUSCH, and an SRS channel may be transmitted in the SCell. PUCCH transmission for HARQ-ACK for SCells 11-15 belonging to the primary PUCCH group may be performed in the PCell.

Meanwhile, among the PUCCH groups, a second PUCCH group may be named a secondary PUCCH group 11-55, and the secondary PUCCH group may not be configured. When the secondary PUCCH group is configured, the group includes one PUCCH-SCell 11-60 and one or more SCells. Alternatively, the SCell may not be configured. The PUCCH-SCell indicates a carrier in which a PUCCH can be transmitted within the secondary PUCCH group, and thus contention-free-based random access, a PUCCH, a PUSCH, and an SRS channel may be transmitted therein. PUCCH transmission for HARQ-ACK for SCells 11-65 belonging to the second PUCCH group may be performed in the PUCCH-SCell.

The term carrier used in embodiments described above and below may be replaced with another term. For example, the carrier may be replaced with a cell, a serving cell, or a component carrier (CC), and the terms may have the same meaning.

In LTE and NR, the UE may have a procedure of reporting a capability supported by the UE to the corresponding BS in the state in which the UE is connected to a serving BS. In the following description, this is referred to as a UE capability (report). The BS may transfer a UE capability enquiry message making a request for reporting a capability to the UE in the connected state. The message may include a UE capability request for each RAT type from the BS. The request for each RAT Type may include requested frequency band information. Further, the UE capability enquiry message may make a request for a plurality of RAT types in one RRC message container, or include a plurality of UE capability enquiry messages including the request for each RAT type and transmit the same to the UE. That is, the UE capability enquiry may be repeated multiple times and the UE may configure a UE capability information message corresponding thereto and report the same multiple times. In the next-generation mobile communication system, a UE capability for NR, LTE, and MR-DC including EN-DC may be requested. For example, the UE capability enquiry message is generally transmitted at the beginning after the connection of the UE, but may be requested under any condition when the BS needs it.

The UE receiving the UE capability report request from the BS in the above step configures a UE capability according to RAT type and band information requested by the BS. Hereinafter, a method by which the UE configures the UE capability in the NR system is described.

1. When the UE receives a list of LTE and/or NR bands from the BS through a UE capability request, the UE configures a band combination (BC) for EN-DC and NR stand alone (SA). That is, the UE configures a candidate list of BCs for EN-DC and NR SA on the basis of requested bands in FreqBandList. The bands sequentially have priorities as stated in FreqBandList.

2. When the BS sets an "eutra-nr-only" flag or an "eutra" flag and makes a request for the UE capability report, the UE completely removes NR SA BCs from the configured candidate list of BCs. Such an operation may occur only when the LTE BS (eNB) makes a request for an "eutra" capability.

3. Thereafter, the UE removes fallback BCs from the candidate list of BCs configured in the above stage. The fallback BC corresponds to the case in which a band corresponding to at least one SCell is removed from any super set BS, and can be omitted since the super set BS is already able to cover the fallback BC. This step is applied to MR-DC, that is, LTE bands. BCs left after the step are a final "candidate BC list".

4. The UE selects BCs suitable for a requested RAT type in the final "candidate BC list" and selects BCs to be reported. In this step, the UE configures supportedBandCombinationList according to a determined order. That is, the UE configures BCs and UE capability to be reported according to an order of a preset rat-Type (nr→eutra-nr→eutra). Further, the UE configures featureSetCombination for the configured supportedBandCombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.

5. When the requested rat Type is eutra-nr and influences, featureSetCombinations are included in all of the two containers of UE-MRDC-Capabilities and UE-NR-Capabilities. However, the NR feature set includes only UE-NR-Capabilities.

After the UE capability is configured, the UE transmits a UE capability information message including the UE capability to the BS. The BS performs scheduling and transmission/reception management suitable for the corresponding UE on the basis of the UE capability received from the UE.

Figure 12:
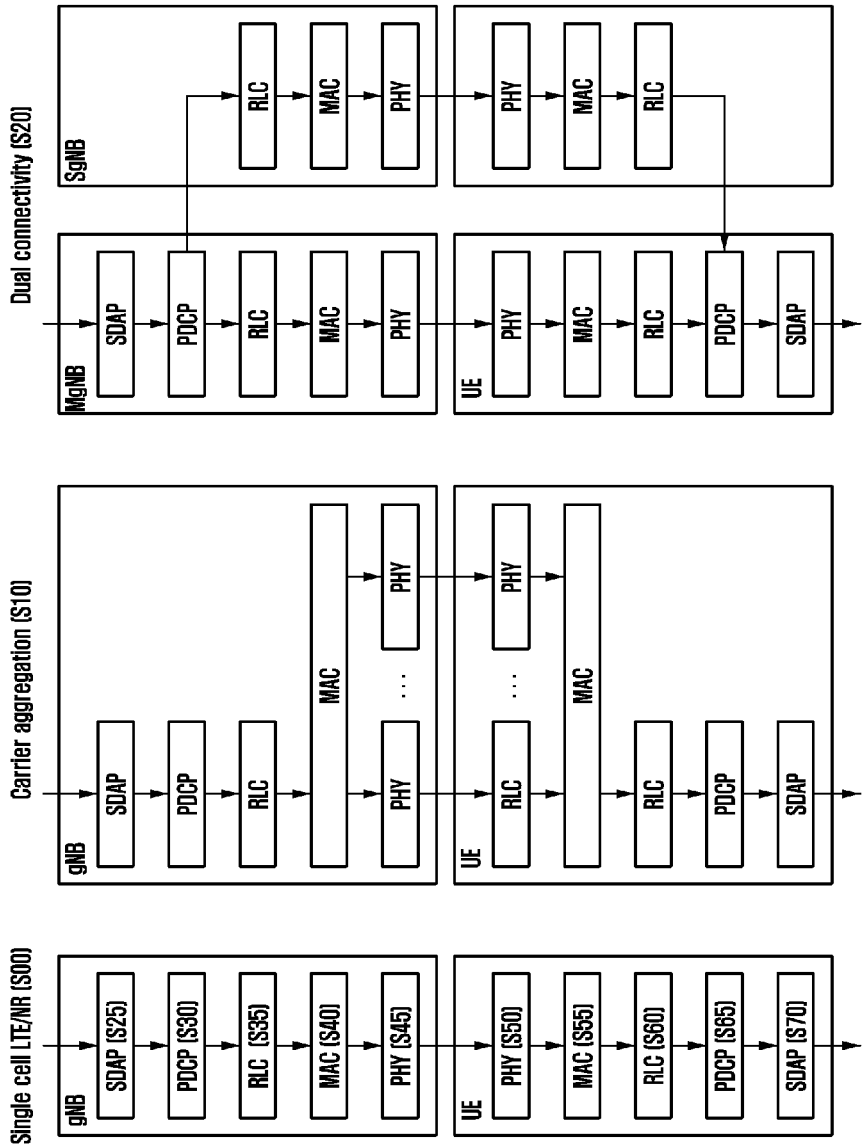
FIG. 12 illustrates a wireless protocol structure of the BS and the UE in a situation of single cell, carrier aggregation, and dual connectivity according to an embodiment of the disclosure.

FIG. 12 illustrates a wireless protocol structure of the BS and the UE in a situation of single cell, carrier aggregation, and dual connectivity according to an embodiment of the disclosure.

Referring to FIG. 12, in a wireless protocol of the next-generation mobile communication system, the UE and the NR BS include NR service data adaptation protocols (SDAPs) S25 and S70, NR packet data convergence protocols (PDCPs) S30 and S65, NR radio link controls (RLCs) S35 and S60, and NR medium access controls (MACs) S40 and S55, respectively.

Main functions of the NR SDAPs S25 and S70 may include some of the following functions.

User data transmission function (transfer of user-plane data)

Function of mapping QoS flow and a data bearer for uplink and downlink (mapping between a QoS flow and a DRB for both DL and UL)

Function of marking a QoS flow ID for uplink and downlink (marking QoS flow ID in both DL and UL packets)

Function of mapping reflective QoS flow to a data bearer for uplink SDAP PDUs (reflective QoS flow to DRB mapping for the UL SDAP PDUs)

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of NAS reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCPs 10-30 and 10-65 may include some of the following functions.

Header compression and decompression function (Header compression and decompression: ROHC only)

User data transmission function (transfer of user data)

Sequential delivery function (in-sequence delivery of upper-layer PDUs)

Non-sequential delivery function (out-of-sequence delivery of upper-layer PDUs)
Reordering function (PDCP PDU reordering for reception)
Duplicate detection function (duplicate detection of lower-layer SDUs)
Retransmission function (retransmission of PDCP SDUs)
Ciphering and deciphering function (Ciphering and deciphering)
Timer-based SDU removal function (timer-based SDU discard in uplink)

The reordering function of the NR PDCP device is a function of sequentially reordering PDCP PDUs received by a lower layer on the basis of a PDCP Sequence Number (SN), and may include a function of sequentially transferring the reordered data to a higher layer, a function of directly transmitting the reordered data without regard to the order, a function of recording PDCP PDUs lost due to the reordering, a function of reporting statuses of the lost PDCP PDUs to a transmitting side, and a function of making a request for retransmitting the lost PDCP PDUs.

Main functions of the NR RLCs S35 and S60 may include some of the following functions.
Data transmission function (transfer of upper-layer PDUs)
Sequential delivery function (in-sequence delivery of upper-layer PDUs)
Non-sequential delivery function (out-of-sequence delivery of upper-layer PDUs)
ARQ function (error correction through ARQ)
Concatenation, segmentation, and reassembly function (concatenation, segmentation and reassembly of RLC SDUs)
Re-segmentation function (re-segmentation of RLC data PDUs)
Reordering function (reordering of RLC data PDUs)
Duplicate detection function (duplicate detection)
Error detection function (protocol error detection)
RLC SDU deletion function (RLC SDU discard)
RLC reestablishment function (RLC reestablishment)

The sequential delivery function (In-sequence delivery) of the NR RLC device is a function of sequentially transferring RLC PDUs received from a lower layer to a higher layer, and may include, when one original RLC SDU is divided into a plurality of RLC SDUs and then received, a function of reassembling and transmitting the RLC SDUs, a function of reordering the received RLC PDUs on the basis of an RLC Sequence Number (SN) or a PDCP SN, a function of recording RLC PDUs lost due to the reordering, a function of reporting statuses of the lost RLC PDUs to a transmitting side, a function of making a request for retransmitting the lost RLC PDUs, if there is a lost RLC SDU, a function of sequentially transferring only RLC SDUs preceding the lost RLC SDU to the higher layer if a predetermined timer expires when there is a lost RLC SDU, a function of sequentially transferring all RLC SDUs received before the timer starts to the higher layer, or if a predetermined timer expires when there is a lost RLC SDU, and a function of sequentially transferring all RLC SDUs received up to that point in time to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer may not include a concatenation function, and the function may be performed by the NR MAC layer, or may be replaced with a multiplexing function of the NR MAC layer.

The non-sequential delivery function (Out-of-sequence delivery) of the NR RLC device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MACs S40 and S55 may be connected to a plurality of NR RLC layer devices configured in one UE and main functions of the NR MAC may include some of the following functions.
Mapping function (Mapping between logical channels and transport channels)
Multiplexing and demultiplexing function (multiplexing/demultiplexing of MAC SDUs)
Scheduling information report function (scheduling information reporting)
HARQ function (error correction through HARQ)
Logical channel priority control function (priority handling between logical channels of one UE)
UE priority control function (priority handling between UEs by means of dynamic scheduling)
MBMS service identification function (MBMS service identification)
Transport format selection function (transport format selection)
Padding function (padding)

The NR PHY layers S45 and S50 perform an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol structure may be variously changed according to a carrier (or cell) operation scheme. For example, when the BS transmits data to the UE on the basis of a single carrier (or cell), the BS and the UE use a protocol structure having a single structure for each layer as indicated by reference numeral S00. On the other hand, when the BS transmits data to the UE on the basis of carrier aggregation (CA) using multiple carriers in a single TRP, the BS and the UE use a protocol structure in which layers up to RLC have a single structure but the PHY layer is multiplexed through the MAC layer as indicated by reference numeral S10. In another example, when the BS transmits data to the UE on the basis of dual connectivity (DC) using multiple carriers in multiple TRPs, the BS and the UE have a single structure up to SDAP and use a protocol structure in which RLC and layers thereafter are multiplexed through the PDCP layer as indicated by reference numeral S20.

Referring to the PUCCH and beam configuration-related description, a configuration of spatial relation information and an activation process are needed to configure the beam for PUCCH transmission in current Rel-15 and Rel-16 NR. In order to perform the activation for each PUCCH, signaling overhead may be large, and accordingly, a default beam for all PUCCHs may be configured and thus the beam can be applied without activation signaling for each PUCCH, thereby reducing signaling overhead. The disclosure provides a PUCCH beam configuration method for a single TRP and a plurality of TRPs. A detailed method is described in the following embodiments in detail.

Hereinafter, embodiments of the disclosure will be described in detail with reference to the accompanying drawings. The content in the disclosure can be applied to FDD and TDD systems. Hereinafter, in the disclosure, higher signaling (or higher-layer signaling) may be a method of transmitting a signal from the BS to the UE through a downlink data channel of a physical layer or from the UE to the BS through an uplink data channel of a physical layer, and may also be referred to as RRC signaling, PDCP signaling, or a medium access control (MAC) control element (CE).

Hereinafter, in the disclosure, when determining whether to apply cooperative communication, the UE can use various methods by which PDCCH(s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as a non-coherent joint transmission (NC-JT) case.

Hereinafter, determining priorities of A and B in the disclosure may be variously expressed as selecting one having a higher priority according to a predetermined priority rule and performing an operation corresponding thereto or omitting (or dropping) an operation for one having a lower priority.

Hereinafter, the disclosure describes the examples through a plurality of embodiments, but the embodiments are not independent and one or more embodiments can be simultaneously or complexly applied without departing from the scope of the disclosure.

Embodiment 1: DCI Reception for NC-JT

Unlike the conventional system, the 5G wireless communication system supports not only a service requiring a high transmission rate but also both a service having a very short transmission delay and a service requiring a high connection density. In a wireless communication network including a plurality of cells, transmission and reception points (TRPs), or beams, cooperative communication (coordinated transmission) between respective cells, TRPs, or/and beams is one of element technologies for satisfying various service requirements by increasing the strength of a signal received by the UE or efficiently controlling interference between the cells, TRPs, or/and beams.

Joint transmission (JT) is a representative transmission technology for the coordinated transmission and may support one UE through different cells, TRPs, or/and beams on the basis of JT to increase the strength of the signal received by the UE. Meanwhile, since characteristics of channels between the UE and respective cells, TRPs, or/and beams may be different, it is required to apply different precodings, MCSs, and resource allocations to links between the UE and respective cells, TRPs, or/and beams. Particularly, in the case of non-coherent joint transmission (NC-JT) supporting non-coherent precoding between respective cells, TRPs, or/and beams, individual downlink (DL) transmission information configurations for the respective cells, TRPs, or/and beams are important. Meanwhile, the individual downlink (DL) transmission information configurations for the respective cells, TRPs, or/and beams are main factors that increase a payload required for DL DCI transmission, which have a bad influence on the reception performance of a physical downlink control channel (PDDCH) transmitting DCI. Accordingly, in order to support JT, it is required to carefully design tradeoff between an amount of DCI information and PDCCH reception performance.

Figure 13:
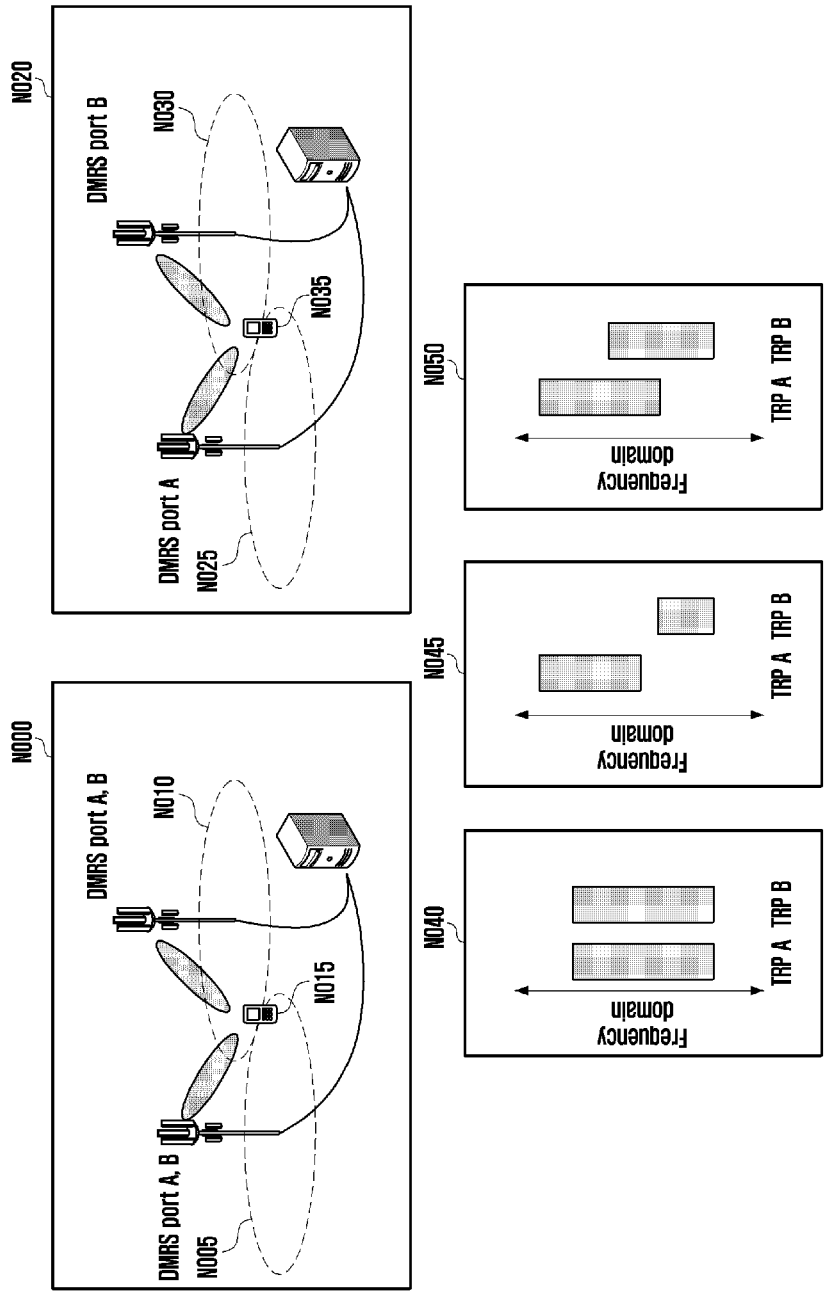
FIG. 13 illustrates a configuration of antenna ports and an example of resource allocation for cooperative communication in a wireless communication system according to an embodiment of the disclosure.

FIG. 13 illustrates a configuration of antenna ports and an example of resource allocation for cooperative communication in a wireless communication system according to an embodiment of the disclosure.

Referring to FIG. 13, examples of radio resource allocation for each TRP according to a joint transmission (JT) scheme and a situation are illustrated. In FIG. 13, reference numeral N000 is an example of coherent joint transmission (C-JT) supporting coherent precoding between respective cells, TRPs, or/and beams. In C-JT, a TRP A N005 and a TRP B N010 transmit single data (PDSCH) to a UE N015, and the plurality of TRPs may perform joint precoding. This means that the TRP A N005 and the TRP B N010 transmit the same DMRS ports (for example, all of the two TRPs transmit DMRS ports A and B) for the PDSCH transmission. In this case, the UE may receive one piece of DCI information for receiving one PDSCH demodulated on the basis of the DMRSs transmitted through the DMRS ports A and B.

In FIG. 13, reference numeral N020 is an example of non-coherent joint transmission (NC-JT) supporting non-coherent precoding between respective cells, TRPs, or/and beams. In the case of NC-JT, the PDSCH is transmitted to a UE N035 for each cell, TPR, or/and beam, and individual precoding may be applied to each PDSCH. Respective cells, TRPs, or/and beams transmit different PDSCHs to improve throughput compared to single cell, TRP, or/and beam transmission, or respective cells, TRPs, or/and beams repeatedly transmit the same PDSCH to improve reliability compared to single cell, TRP, or/and beam transmission.

Various radio resource allocations such as the case N040 in which frequency and time resources used by a plurality of TRPs for PDSCH transmission are all the same, the case N045 in which frequency and time resources used by a plurality of TRPs do not overlap at all, and the case N050 in which some of the frequency and time resources used by a plurality of TRPs overlap each other may be considered. When a plurality of TRPs repeatedly transmit the same PDSCH in order to improve reliability in each case of the radio resource allocation, if the reception UE does not know whether the corresponding PDSCH is repeatedly transmitted, the corresponding UE cannot perform combining in the physical layer for the corresponding PDSCH and thus may have a limit in improvement of reliability. Therefore, the disclosure provides a method of indicating and configuring repetitive transmission for improving reliability of NC-JT transmission.

In order to support NC-JT, DCIs in various forms, structures, and relations may be considered to simultaneously allocate a plurality of PDSCHs to one UE.

FIG. 14 illustrates an example for a configuration of downlink control information (DCI) for cooperative communication in a wireless communication system according to an embodiment of the disclosure.

Referring to FIG. 14, four examples of the DCI design for supporting NC-JT are illustrated.

Referring to FIG. 14, case #1 N100 is an example in which control information for PDSCHs transmitted from (N−1) additional TRPs is transmitted in a format (same DCI format) which is the same as control information for a PDSCH transmitted by a serving TRP in a situation in which (N−1) different PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted by different TRPs (TRP #0 to TRP #(N−1)) through DCI (DCI #0 to DCI #(N−1)) all having the same DCI format and the same payload.

In case #1, a degree of freedom of PDSCH control (allocation) can be completely guaranteed, but when respective pieces of DCI are transmitted by different TRPs, a difference between DCI coverages may be generated and reception performance may deteriorate.

Case #2 N105 is an example in which control information for PDSCHs transmitted from (N−1) additional TRPs is transmitted in a format (different DCI format or different DCI payload) which is different from control information for a PDSCH transmitted by a serving TRP in a situation in which (N−1) different PDSCHs are transmitted from the (N−1) additional TRPs (TRP #1 to TRP #(N−1)) other than the serving TRP (TRP #0) used for single PDSCH transmission.

For example, DCI #0 that is control information for a PDSCH transmitted from the serving TRP (TRP #0) may include all information elements of DCI format 1_0 and DCI format 1_1, but shortened DCIs (hereinafter, referred to as sDCIs) (sDCI #0 to sDCI #(N−2)) that are control information for PDSCHs transmitted from the cooperative TRPs (TRP #1 to TRP #(N−1)) may include only some of the information elements of DCI format 1_0 and DCI format 1_1. Accordingly, the sDCI for transmitting control information of PDSCHs transmitted from cooperative TPRs has smaller payload compared to the normal DCI (nDCI) for transmitting control information related to the PDSCH transmitted from the serving TRP, and thus can include reserved bits corresponding to bits obtained by subtracting the bits of sDCI from the bits of nDCI.

In case #2, a degree of freedom of each PDSCH control (allocation) may be limited according to contents of information elements included in the sDCI, but reception performance of the sDCI is better than the nDCI, and thus a probability of the generation of difference between DCI coverages may become lower.

Case #3 N110 is an example in which control information for PDSCHs transmitted from (N−1) additional TRPs is transmitted in a format (different DCI format or different DCI payload) which is different from control information for a PDSCH transmitted by a serving TRP in a situation in which (N−1) different PDSCHs are transmitted from the (N−1) additional TRPs (TRP #1 to TRP #(N−1)) other than the serving TRP (TRP #0) used for single PDSCH transmission.

For example, in the case of DCI #0 that is control information for the PDSCH transmitted from the serving TRP (TRP #0), all information elements of DCI format 1_0 and DCI format 1_1 may be included, and in the case of control information for PDSCHs transmitted from cooperative TRPs (TRP #1 to TRP #(N−1)), only some of the information elements of DCI format 1_0 and DCI format 1_1 may be gathered in one "secondary" DCI (sDCI) and transmitted. For example, the sDCI may include at least one piece of HARQ-related information such as frequency domain resource assignment and time domain resource assignment of the cooperative TRPs and the MCS. In addition, information that is not included in the sDCI such as a BWP indicator and a carrier indicator may follow DCI (DCI #0, normal DCI, or nDCI) of the serving TRP.

In case #3, a degree of freedom of PDSCH control (allocation) may be limited according to contents of the information elements included in the sDCI but reception performance of the sDCI can be controlled, and case #3 may have lower complexity of DCI blind decoding of the UE compared to case #1 or case #2.

Case #4 N115 is an example in which control information for PDSCHs transmitted from (N−1) additional TRPs is transmitted in DCI (long DCI (lDCI)) which is the same as control information for the PDSCH transmitted from the serving TRP in a situation in which different (N−1) PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through single DCI. In case #4, complexity of DCI blind decoding of the UE may not be increased, but a degree of freedom of PDSCH control (allocation) may be low like the number of cooperative TRPs is limited according to long DCI payload restriction.

In the following description and embodiments, the sDCI may refer to various pieces of supplementary DCI such as shortened DCI, secondary DCI, or normal DCI (DCI formats 1_0 and 1_1) including PDSCH control information transmitted by the cooperative TRP, and unless specific restriction is mentioned, the corresponding description may be similarly applied to the various pieces of supplementary DCI.

In the following description and embodiments, case #1, case #2, and case #3 in which one or more pieces of DCI (or PDCCHs) are used to support NC-JT may be classified as multiple PDCCHs-based NC-JT and case #4 in which single DCI (or PDCCH) is used to support NC-JT may be classified as single PDCCH-based NC-JT.

In embodiments of the disclosure, the "cooperative TRP" may be replaced with various terms such as a "cooperative panel" or a "cooperative beam" in the actual application.

In embodiments of the disclosure, "the case to which NC-JT is applied" may be variously interpreted as "the case in which the UE simultaneously receives one or more PDSCHs in one BWP", "the case in which the UE simultaneously receives PDSCHs on the basis of two or more transmission configuration indicator (TCI) indications in one BWP", and "the case in which the PDSCHs received by the UE are associated with one or more DMRS port groups" according to circumstances, but is used by one expression for convenience of description.

In the disclosure, a wireless protocol structure for NC-JT may be variously used according to a TRP development scenario. For example, when there is no backhaul delay between cooperative TRPs or there is a small backhaul delay, a method (CA-like method) using a structure based on MAC layer multiplexing can be used similarly to reference numeral S10 of FIG. 12. On the other hand, when the backhaul delay between cooperative TRPs is too large to be ignored (for example, when a time of 2 ms or longer is needed to exchange information such as CSI, scheduling, and HARQ-ACK between cooperative TRPs), a method (DC-like method) of securing a characteristic robust to a delay can be used through an independent structure for each TRP from an RLC layer similarly to reference numeral S20 of FIG. 12.

The UE supporting C-JT/NC-JT may receive a C-JT/NC-JT-related parameter or a setting value from a higher-layer configuration and set an RRC parameter of the UE on the basis thereof. For the higher-layer configuration, the UE may use a UE capability parameter, for example, tci-StatePDSCH. The UE capability parameter, for example, tci-StatePDSCH may define TCI states for the purpose of PDSCH transmission, the number of TCI states may be configured as 4, 8, 16, 32, 64, and 128 in FR1 and as 64 and 128 in FR2, and a maximum of 8 states which can be indicated by 3 bits of a TCI field of the DCI may be configured through a MAC CE message among the configured numbers. A maximum value 128 means a value indicated by maxNumberConfiguredTCIstatesPerCC within the parameter tci-StatePDSCH which is included in capability signaling of the UE. As described above, a series of configuration processes from the higher-layer configuration to the MAC CE configuration may be applied to a beamforming indication or a beamforming change command for at least one PDSCH in one TRP.

Various embodiments of the disclosure describe how the UE activates/deactivates the TCI state through different MAC CE signaling of the BS in rel-15 and rel-16. Particularly, when PDSCHs are allocated for a specific UE like in DCI format 1_1, a beamforming direction indication or a beamforming direction change command may be dynamically supported using the TCI field.

The beamforming direction indication or the beamforming direction change command is an operation applied when the UE identifying TCI state field information within DCI format 1_1 receives the PDSCH in the downlink after a predetermined time, in which case the direction is a beamforming configuration direction corresponding to a DL RS of the QCLed BS/TRP.

The BS or the UE may determine to first use an Rel-15 MAC CE for an Rel-15 DCI format and an Rel-16 MAC CE for an Rel-16 DCI format. Different solution methods are proposed according to methods divided by a MAC CE format of rel-15 and a MAC CE format of rel-16.

FIG. 15 illustrates a structure of a medium access control (MAC) control element (CE) for transmission configuration indicator (TCI) state activation of a UE-specific physical downlink control channel (PDCCH) according to an embodiment of the disclosure.

Reference numeral 15-50 of FIG. 15 shows a MAC CE format for TCI state activation of a UE-specific PDCCH based on Rel-15.

The meaning of each field within the MAC CE and a value configurable in each field are as shown in Table 31 below.

TABLE 31

Serving Cell ID (serving cell identifier): This field indicates the identity of the Serving Cell for which the MAC CE applies. The length of the field is 5 bits;
CORESET ID (CORESET identifier): This field indicates a Control Resource Set identified with ControlResourceSetId as specified in TS 38.331 [5], for which the TCI State is being indicated. In case the value of the field is 0, the field refers to the Control Resource Set configured by controlResourceSetZero as specified in TS 38.331 [5]. The length of the field is 4 bits;
TCI State ID (transmission configuration indication identifier): This field indicates the TCI state identified by TCI-StateId as specified in TS 38.331 [5] applicable to the Control Resource Set identified by TABLE 31-continued CORESET ID field. If the field of CORESET ID is set to 0, this field indicates a TCI-StateId for a TCI state of the first 64 TCI-states configured by tci-StatesToAddModList and tci-StatesToReleaseList in the PDSCH-Config in the active BWP. If the field of CORESET ID is set to the other value than 0, this field indicates a TCI-StateId configured by tci-StatesPDCCH-ToAddList and tci-StatesPDCCH-ToReleaseList in the controlResourceSet identified by the indicated CORESET ID. The length of the field is 7 bits Reference numeral 15-50 of FIG. 15 shows a MAC CE format for TCI state activation/deactivation of a UE-specific PDCCH based on Rel-15.

The meaning of each field within the MAC CE and a value configurable in each field are as shown in Table 32 below

TABLE 32

Serving Cell ID (serving cell identifier): This field indicates the identity of the Serving Cell for which the MAC CE applies. The length of the field is 5 bits;
BWP ID (bandwidth part identifier): This field indicates a DL BWP for which the MAC CE applies as the codepoint of the DCI bandwidth part indicator field as specified in TS 38.212 [9]. The length of the BWP ID field is 2 bits;
Ti (TCI state identifier): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among
all the TCI States with Ti field set to 1, i.e. the first TCI State with Ti field
set to 1 shall be mapped to the codepoint value 0, second TCI State with Ti field set to 1 shall be mapped to the codepoint value 1 and so on. The maximum number of activated TCI states is 8;
R (reserved bit): Reserved bit, set to 0.

A MAC CE of rel-16 may be configured in the form of expanding some of the MAC CE message of rel-15. In the embodiment, all TCI states activated by the rel-15 MAC CE may be proposed to be included in TCI states activated by the rel-16 MAC CE.

FIG. 16 illustrates an example of a configuration of TCI states according to an embodiment of the disclosure. For example, as shown in FIG. 16, the BS may determine that all TCI states of RRC configured TCI states 16-00 in rel-15 are M states such as TCI #0, TCI #1, TCI #2, . . . , TCI #M−1, and select TCI #0', TCI #1', TCI #2', . . . , TCI #K−1 as a subset 16-20 of the TCI states selected by the MAC CE of rel-15. On the other hand, the BS and the UE supporting rel-16 may separately configure RRC configured TCI states supporting rel-16 or may use the same RRC configured TCI states configured in rel-15. At this time, the RRC configured TCI states supporting rel-16 may include some or all of the RRC configured TCI states configured in rel-15. If M=128, TCI states of rel-16 may be larger than or equal to 128. When the BS or the UE increases the number of TCI states supported by rel-15 in proportion to the number of BSs/TRPs operating in C-JT/NC-JT of rel-16, for example, when 2 TRPs operate, a maximum of 256 TCI states may be configured. The rel-16 MAC CE may include some or all of the TCI states supported by the rel-15 MAC CE among the RRC configured TCI states for rel-16. Specifically, when the rel-16 MAC CE includes all of the TCI states supported by the rel-15 MAC CE and increases in proportion to the number of BSs/TRPs operating in C-JT/NC-JT of rel-16, for example, when 2 TRPs operate, a maximum of 2K TCI states may be configured.

Table 33 shows a detailed description of the parameter tci-StatePDSCH described in the embodiment. Specifically, an FR2 mandatory value of a parameter maxNumberConfiguredTClstatesPerCC may be changed from 64 to 128 or 256, or 64, 128, or 256 may be separately added for C-JT/NC-JT.

Table 33

TABLE 33

| Definitions for parameters | Per | M | FDD – TDD DIFF | FR1 – FR2 DIFF |
|---|---|---|---|---|
| tci-StatePDSCH Defines support of TCI-States for PDSCH. The capability signalling comprises the following parameters: maxNumberConfiguredTClstatesPerCC indicates the maximum number of configured TCI-states per CC for PDSCH. For FR2, the UE is mandated to set the value to 64 (i.e. value 128 is an optional value). For FR1, the UE is mandated to set these values to the maximum number of allowed SSBs in the supported band; maxNumberActiveTCI-PerBWP indicates the maximum number of activated TCI-states per BWP per CC, including control and data. If a UE reports X active TCI state(s), it is not expected that more than X active QCL type D assumption(s) for any PDSCH and any CORESETS for a given BWP of a serving cell become active for the UE. The UE shall include this field. | Band | Yes | N/A | N/A |

Note
the UE is required to track only the active TCI states.
The UE is mandated to reprot tci-StatePDSCH.

For example, the BS or the UE supporting rel-15 and rel-16 may configure a maximum value of the number of TCI states for each of rel-15 and rel-16 for a TCI state configuration through the MAC CE and configure the number of TCI states to be equal to or smaller than the configured maximum value. Various embodiments below may be proposed for a method of configuring the number of TCI states to be equal to or smaller than the maximum value.

The number of TCI states activated by the MAC CE messages of rel-15 and rel-16 may be configured according to a UE capability value reported by the UE. In another example, the number of TCI states activated by the MAC CE messages of rel-15 and rel-16 may be determined as a value pre-configured by the BS. In another example, the number of TCI states activated by the MAC CE messages of rel-15 and rel-16 may be determined as a value pre-appointed between the BS and the UE.

For example, as shown in FIG. 16, the BS and the UE may determine that all TCI states of RRC configured TCI states in rel-15 are M states such as TCI #0, TCI #1, TCI #2, . . . , TCI #M−1, select the subset 16-20 of the TCI states selected by the MAC CE of rel-15 from among the determined TCI states, and arrange TCI #0', TCI #1', TCI #2', . . . , TCI #K−1. When TCI #0 is selected from among the M TCI states, it may be arranged on TCI #0'. For example, a maximum value of K for the BS and the UE supporting rel-15 may be configured or determined as 8, and a maximum value of K for the BS and the UE supporting rel-16 may also be configured as 8. When the maximum value is configured as 8, the BS may indicate selection of a beam for the PDSCH to the UE through a DCI-based beam selection operation within one CORESET. The beam may be selected from among a maximum of 8 beams through identification of TCI field information 16-40 in DCI. A TCI field #1 shown in FIG. 16 may be selected from values 0 to 7. For example, when the TCI field within DCI is indicated as 000, it may be determined that TCI #0'(TCI #1=TCI #0') is indicated among TCI #0', TCI #1', TCI #2', TCI #3', TCI #4', TCI #5', TCI #6', and TCI #7'. TCI field #1 may be named a TCI codepoint. The embodiment describes the case in which the maximum value is configured as 8 (K=8), the value may be configured as a value smaller than 8. The embodiment describes the case in which the maximum value K of the MAC CE of Rel-15 is the same as the maximum value K of the MAC CE of rel-15, but the values may be configured to be different from each other.

In another example, when the value increases in proportion to the number of BSs/TRPs operating in C-JT/NC-JT, for example, 2 TRPs operate, the maximum value K for the BS and the UE supporting rel-16 may be configured as 16. When the maximum value is configured as 16, the BS may indicate selection of one or more beams for the PDSCH to the UE through a DCI-based beam selection operation within one CORESET. When K is 16, #1 selected and indicated by the BS may be selected from values 0 to 15. The embodiment describes that case in which the maximum value is configured as 16 (K=16), but the value may be configured as a value smaller than 16.

Embodiment 1-1: Method of Configuring Downlink Control Channel for Multi-PDCCH-Based NC-JT Transmission In NC-JT based on multiple PDCCHs, there may be a CORESET or a search space separated for each TRP when DCI for scheduling the PDSCH of each TRP is transmitted. The CORESET or the search space for each TRP can be configured like in at least one of the following cases.

A configuration of a higher-layer index for each CORESET: CORESET configuration information configured by a higher layer may include an index value, and a TRP for transmitting a PDCCH in the corresponding CORESET may be identified by the configured index value for each CORESET. That is, in a set of CORESETs having the same higher-layer index value, it may be considered that the same TRP transmits the PDCCH or the PDCCH for scheduling the PDSCH of the same TRP is transmitted. The index for each CORESET may be named CORESETPoolIndex, and it may be considered that the PDCCH is transmitted from the same TRP in CORESETs in which the same CORESETPoolIndex value is configured. In the CORESET in which the same CORESETPoolIndex value is not configured, it may be considered that a default value of CORESET-PoolIndex is configured, and the default value may be 0.

- A configuration of multiple PDCCH-Config: a plurality of PDCCH-Config are configured in one BWP, and each PDCCH-Config may include a PDCCH configuration for each TRP. That is, a list of CORESETs for each TRP and/or a list of search spaces for each TRP may be included in one PDCCH-Config, and one or more CORESETs and one or more search spaces included in one PDCCH-Config may be considered to correspond to a specific TRP.
- A configuration of a CORESET beam/beam group: a TRP corresponding to the corresponding CORESET may be identified through a beam or a beam group configured for each CORESET. For example, when the same TCI state is configured in a plurality of CORESETs, it may be considered that the corresponding CORESETs are transmitted through the same TRP or a PDCCH for scheduling a PDSCH of the same TRP is transmitted in the corresponding CORESET.
- A configuration of a search space beam/beam group: a beam or a beam group is configured for each search space, and a TRP for each search space may be identified therethrough. For example, when the same beam/beam group or TCI state is configured in a plurality of search spaces, it may be considered that the same TRP transmits the PDCCH in the corresponding search space or a PDCCH for scheduling a PDSCH of the same TRP is transmitted in the corresponding search space.

As described above, by separating the CORESETs or search spaces for each TRP, it is possible to divide PDSCHs and HARQ-ACK for each TRP and accordingly to generate an independent HARQ-ACK codebook for each TRP and use an independent PUCCH resource.

The configuration may be independent for each cell or BWP. For example, while two different CORESETPoolIndex values may be configured in the PCell, no CORESETPoolIndex value may be configured in a specific SCell. In this case, it may be considered that NC-JT transmission is configured in the PCell, but NC-JT is not configured in the SCell in which no CORESETPoolIndex value is configured.

Embodiment 1-2: Method of Configuring Downlink Beam for Single-PDCCH-Based NC-JT Transmission In single PDCCH-based NC-JT, PDSCHs transmitted by a plurality of TRPs may be scheduled by one piece of DCI. At this time, as a method of indicating the number of TRPs transmitting the corresponding PDSCHs, the number of TCI states may be used. That is, single PDCCH-based NC-JT transmission may be considered when the number of TCI states indicated by DCI for scheduling the PDSCHs is 2, and single-TRP transmission may be considered when the number of TCI states is 1. The TCI states indicated by the DCI may correspond to one or two TCI states among TCI states activated by the MAC CE. When the TCI states of DCI correspond to two TCI states activated by the MAC CE, a TCI codepoint indicated by the DCI is associated with the TCI states activated by the MAC CE, in which case the number of TCI states activated by the MAC CE, corresponding to the TCI codepoint, may be 2.

The configuration may be independent for each cell or BWP. For example, while a maximum number of activated TCI states corresponding to one TCI codepoint is 2 in the PCell, a maximum number of activated TCI states corresponding to one TCI codepoint may be 1 in a specific SCell. In this case, it may be considered that NC-JT transmission is configured in the PCell but NC-JT is not configured in the SCell.

Embodiment 2: Method of Transmitting HACQ-ACK Information for NC-JT Transmission The following embodiment provides a detailed method of transmitting HARQ-ACK information for NC-JT transmission.

FIGS. 17A, 17B, 17C, and 17D illustrate a method of transmitting HARQ-ACK information according to various DCI formats and PUCCH formats for NC-JT transmission.

Figure 17A:
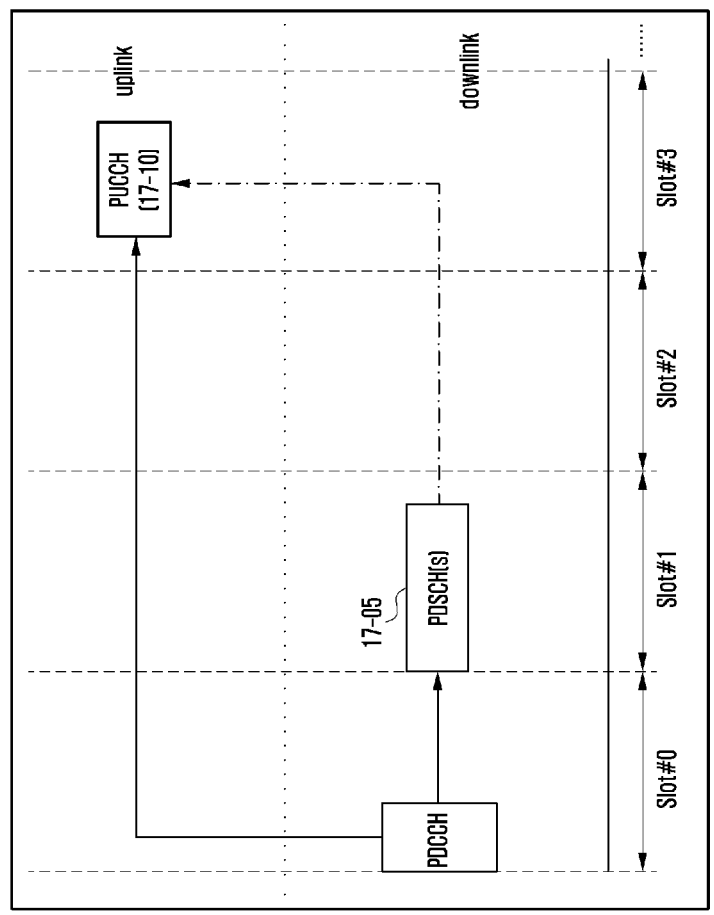
FIG. 17A illustrates a HARQ-ACK transmission method according to a DCI format and a PUCCH format for non coherent joint transmission (NC-JT) according to an embodiment of the disclosure.

FIG. 17A illustrates a HARQ-ACK transmission method according to a DCI format and a PUCCH format for non coherent joint transmission (NC-JT) according to an embodiment of the disclosure. First, FIG. 17A (option #1: HARQ-ACK for single-PDCCH NC-JT) 17-00 illustrates an example of transmitting HARQ-ACK information for one or a plurality of PDSCHs 17-05 scheduled by TRPs is transmitted through one PUCCH resource 17-10 in the case of single-PDCCH-based NC-JT. The PUCCH resource may be indicated through a PRI value and a $K_1$ value within the DCI.

Figure 17B:
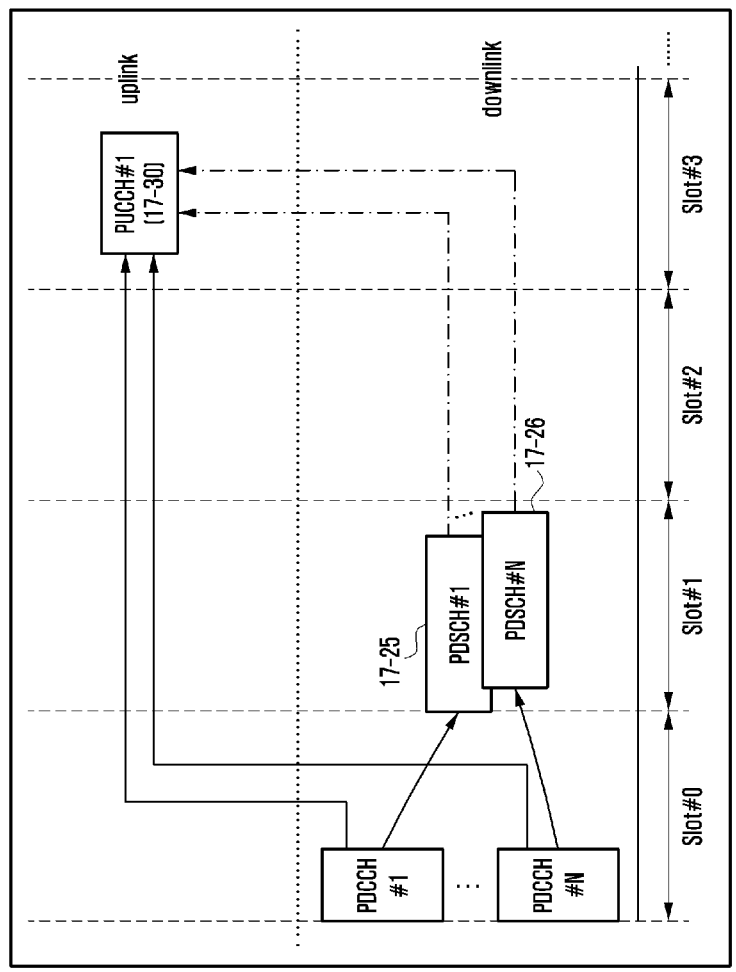
FIG. 17B illustrates a HARQ-ACK transmission method according to a DCI format and a PUCCH format for non coherent joint transmission (NC-JT) according to an embodiment of the disclosure.
Figure 17C:
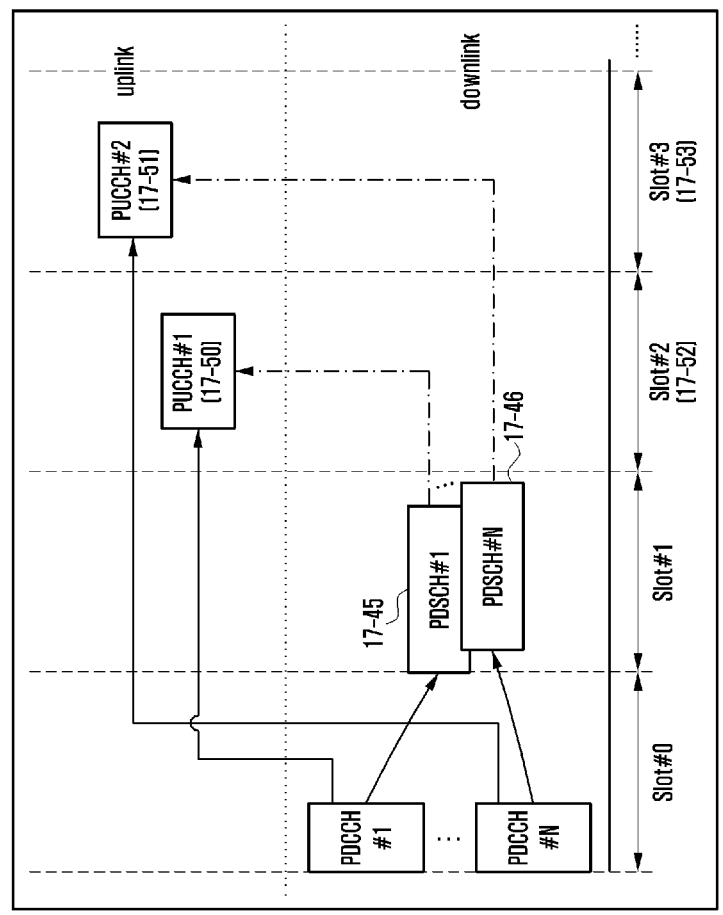
FIG. 17C illustrates a HARQ-ACK transmission method according to a DCI format and a PUCCH format for non coherent joint transmission (NC-JT) according to an embodiment of the disclosure.
Figure 17D:
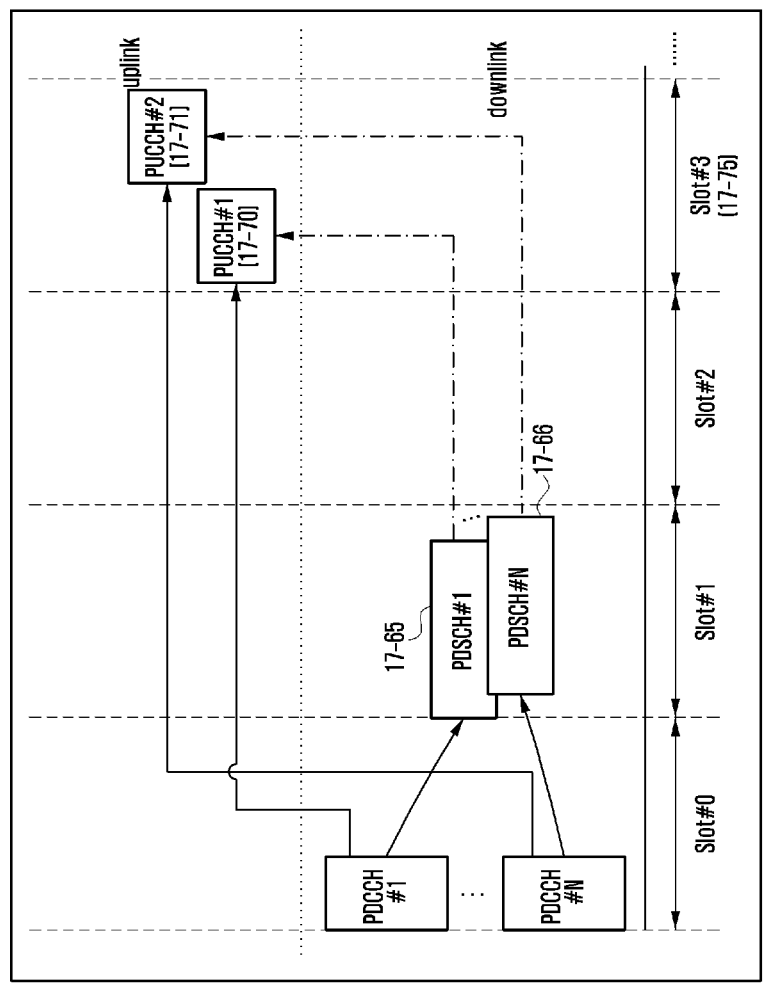
FIG. 17D illustrates a HARQ-ACK transmission method according to a DCI format and a PUCCH format for non coherent joint transmission (NC-JT) according to an embodiment of the disclosure.

FIG. 17B (option #2) to FIG. 17D (option #4) 17-20, 17-40, and 17-60 illustrate the case of multi-PDCCH-based NC-JT. At this time, the respective options may be divided according to the number of PUCCH resources through which HARQ-ACK information corresponding to the PDSCH of each TRP and the location of the PUCCH resource in the time axis.

FIG. 17B illustrates a HARQ-ACK transmission method according to a DCI format and a PUCCH format for non coherent joint transmission (NC-JT) according to an embodiment of the disclosure.

FIG. 17B (option #2: joint HARQ-ACK) 17-20 illustrates an example in which the UE transmits HARQ-ACK information corresponding to the PDSCH 17-25 or 17-26 of each TRP through one PUCCH resource 17-30. At this time, HARQ-ACK information for each of all TRPs may be generated on the basis of a single HARQ-ACK codebook, or HARQ-ACK information for each TRP may be generated on the basis of an individual HARQ-ACK codebook. In this case, HARQ-ACK information for respective TRPs may be concatenated and transmitted in one PUCCH resource.

When an individual HARQ-ACK codebook for each TRP is used, the TRPs may be divided as at least one of a set of CORESETs having the same higher-layer index, a set of CORESETs belonging to the same TCI state, beam, or beam group, and a set of search spaces belonging to the same TCI state, beam, or beam group as defined in embodiment 1-1.

FIG. 17C illustrates a HARQ-ACK transmission method according to a DCI format and a PUCCH format for non coherent joint transmission (NC-JT) according to an embodiment of the disclosure.

FIG. 17C (option #3: inter-slot time-division multiplexed (TDMed) separate HARQ-ACK) 17-40 illustrates an example in which the UE transmits HARQ-ACK information corresponding to PDSCHs 17-45 and 17-46 of respective TRPs through PUCCH resources 17-50 and 17-51 of different slots 17-52 and 17-53. The slot for transmitting the PUCCH resource for each TRP may be determined by the $K_1$ value. When the $K_1$ values indicated by a plurality of PDCCHs indicate the same slot, it may be considered that the corresponding PDCCHs are transmitted by the same TRP and all of the HARQ-ACK information corresponding thereto may be transmitted. At this time, concatenated HARQ-ACK information in one PUCCH resource located within the same slot may be transmitted to the TRP.

FIG. 17D illustrates a HARQ-ACK transmission method according to a DCI format and a PUCCH format for non coherent joint transmission (NC-JT) according to an embodiment of the disclosure.

FIG. 17D (option #4: intra-slot TDMed separate HARQ-ACK) 17-60 illustrates a situation in which HARQ-ACK information corresponding to PDSCHs 17-64 and 17-66 of respective TRPs are transmitted through different PUCCH resources 17-70 and 17-71 in different symbols within the same slot 17-75. The slot for transmitting the PUCCH resource for each TRP may be determined by the $K_1$ value, and when $K_1$ values indicated by a plurality of PDCCHs indicate the same slot, the UE may select a PUCCH resource and determine a transmission symbol through at least one of the following methods.

PUCCH Resource Group Configuration for Each TRP

A PUCCH resource group for HARQ-ACK transmission may be configured for each TRP. When TRPs are divided by the CORESET or/and the search space like in embodiment 1-1, the PUCCH resource for HARQ-ACK transmission for each TRP may be selected from a PUCCH resource group for the corresponding TRP. TDM may be expected in PUCCH resources selected from different PUCCH resource groups. That is, it may be expected that the selected PUCCH resources do not overlap in units of symbols (within the same slot). After generating an individual HARQ-ACK codebook for each TRP, the UE may transmit the HARQ-ACK codebook in the PUCCH resource selected for each TRP.

Different PRI Indications for Respective TRPs

When TRPs are divided by the CORESET or/and the search space like in embodiment 1-1, the PUCCH resource for each TRP may be selected according to the PRI. That is, the PUCCH resource selection process in Rel-15 may be performed independently for each TRP. At this time, the PRI used for determining the PUCCH resource for each TRP should be different. For example, the UE may not expect that PRIs used for determining PUCCH resources for respective TRPs are indicated as the same value. For example, the PDCCH for TRP 1 may include the PRI configured as PRI=n and the PDCCH for TRP 2 may include the PRI configured as PRI=m. Further, TDM may be expected between PUCCH resources indicated by PRIs for respective TRPs. That is, it may be expected that the selected PUCCH resources do not overlap in units of symbols (within the same slot). An individual HARQ-ACK codebook for each TRP is generated and then transmitted in the selected PUCCH resource selected for each TRP.

$K_1$ is Defined in Units of Subslots.

$K_1$ may be defined in units of subslots according to the PUCCH resource selection process in Rel-15. For example, the UE may generate the HARQ-ACK codebook for PDSCHs/PDCCHs indicated to report HARQ-ACK in the same subslot and then transmit the same through the PUCCH resource indicated by the PRI. The process of generating the HARQ-ACK codebook and selecting the PUCCH resource may be irrelevant to division of TRPs for respective CORESETs and/or search spaces.

When the UE support NC-JT reception, one of the options may be configured through a higher layer or implicitly selected according to circumstances. For example, the UE supporting multi-PDCCH-based NC-JT may select one of option 2 (joint HARQ-ACK) and option 3 or 4 (separate HARQ-ACK) through a higher layer. In another example, according to whether single PDCCH-based NC-JT or multi-PDCCH-based NC-JT is supported/configured, option 1 may be selected in the former and one of option 2, 3, and 4 may be selected in the latter.

In another example, in multi-PDCCH-based NC-JT, a used option may be determined according to selection of the PUCCH resource. When PUCCH resources of the same slot correspond to different TRPs, HARQ-ACK may be transmitted according to option 4 if the corresponding PUCCH resources are different and do not overlap in units of symbols, and HARQ-ACK may be transmitted according to option 2 if the PUCCH resources overlap in units of symbols and the allocated symbols are the same. When different TRPs select PUCCH resources in different slots, HARQ-ACK may be transmitted according to option 3.

The configuration for the options may be dependent on the UE capability. For example, the BS may receive the UE capability according to the procedure and may configure the options on the basis thereof. For example, option 4 may be allowed only for the UE having the capability supporting intra-slot TDMed separate HARQ-ACK and the UE which does not have the corresponding capability may not expect the configuration according to option 4.

Figure 17E:
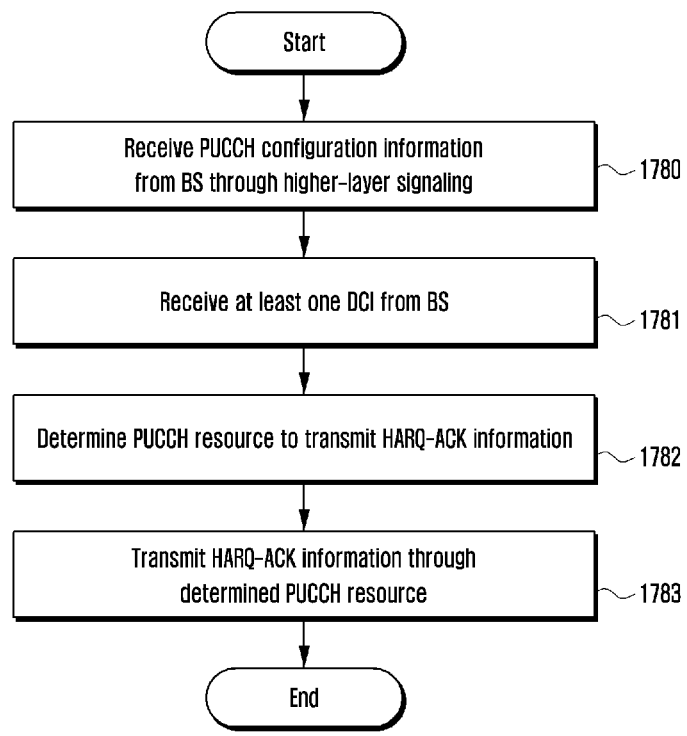
FIG. 17E illustrates an example of a method by which the UE transmits HARQ-ACK for NC-JT transmission to the BS according to an embodiment of the disclosure.

FIG. 17E illustrates an example of a method by which the UE transmits HARQ-ACK for NC-JT transmission to the BS according to an embodiment of the disclosure.

FIG. 17E illustrates an example of a method by which the UE transmits HARQ-ACK information for NC-JT transmission to the BS. According to FIG. 17E, (although not illustrated), the UE may transmit the capability for the options to the BS through the UE capability, and the BS may explicitly configure which option is applied to the UE on the basis of capability information transmitted by the UE or implicitly apply a specific option. The UE may receive PUCCH configuration information from the BS through higher-layer signaling in operation 1780. The PUCCH configuration information may include at least one piece of information in Table 21, Table 22, Table 29, and Table 30, and may include at least one piece of PUCCH group configuration information, information for configuring the relation between the PRI and the PUCCH resource as show in Table 26, and information for configuring candidates of K1 as show in Table 21. Thereafter, the UE may receive DCI for scheduling downlink data on the PDCCH from the BS (which may be interchangeably used with PDCCH reception) in operation 1781 and identify an HARQ-ACK payload which should be transmitted according to the above-described method on the basis of the applied option, a PDSCH-to-HARQ feedback timing indicator included in the DCI, and a PRI, so as to determine a PUCCH resource to transmit HARQ-ACK in operation 1782. Subsequently, the UE transmits HARQ-ACK information in the determined PUCCH resource in operation 1783.

Not all operations of the method should be performed, and specific operations may be omitted or orders thereof may be changed.

Figure 17F:
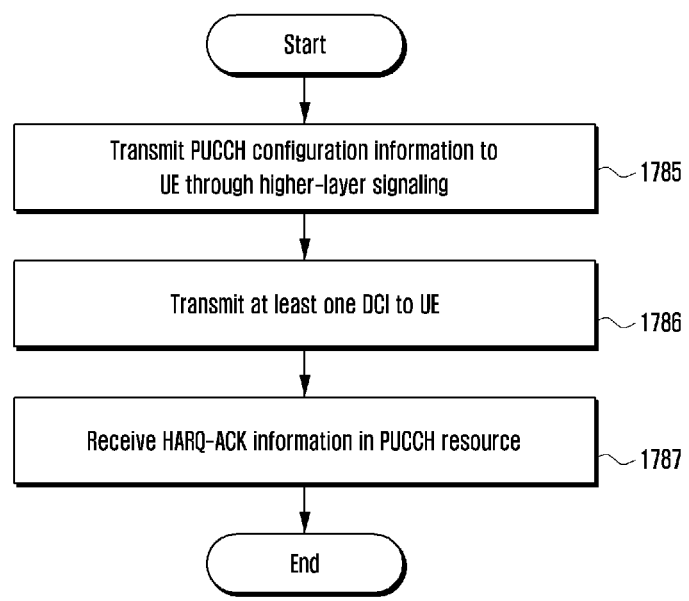
FIG. 17F illustrates an example of a method by which the BS receives HARQ-ACK for NC-JT transmission from the UE according to an embodiment of the disclosure.

FIG. 17F illustrates an example of a method by which the BS receives HARQ-ACK for NC-JT transmission from the UE according to an embodiment of the disclosure.

FIG. 17F illustrates an example of a method by which the BS receives HARQ-ACK information for NC-JT transmission from the UE. According to FIG. 17F, (although not illustrated), the BS may receive the UE capability for the options transmitted by the UE and may explicitly configure which option is applied to the UE on the basis of capability information transmitted by the UE or implicitly apply a specific option. The BS may transmit PUCCH configuration information to the UE through higher-layer signaling in operation 1785. The PUCCH configuration information may include at least one piece of information in Table 21, Table 22, Table 29, and Table 30, and may include at least one piece of PUCCH group configuration information, information for configuring the relation between the PRI and the PUCCH resource as show in Table 26, and information for configuring candidates of K1 as show in Table 21. Thereafter, the BS may transmit DCI for scheduling downlink data on the PDCCH to the UE (which may be interchangeably used with PDCCH transmission) in operation 1786 and identify an HARQ-ACK payload which should be transmitted according to the above-described method on the basis of the applied option, a PDSCH-to-HARQ feedback timing indicator included in the DCI, and a PRI, so as to determine a PUCCH resource to transmit HARQ-ACK. Subsequently, the UE transmits HARQ-ACK information in the determined PUCCH resource, and the BS receives HARQ-ACK information in a PUCCH resource determined in the same way in operation 1787.

Not all operations of the method should be performed, and specific operations may be omitted or orders thereof may be changed.

Embodiment 3: Default Beam Configuration for PUCCH Transmission to Single TRP

In PUCCH transmission, when SpatialRelationInfo and/or path attenuation RS is not configured in the PUCCH and NC-JT is not configured, the default beam for PUCCH transmission may be configured as follows.

Case 1: The case in which PDCCH is configured in a PUCCH transmission cell: a default beam for PUCCH transmission may follow a beam of the PDCCH. The beam for PDCCH transmission is configured in units of CORESETs, and thus the default beam for PUCCH transmission may be determined as one of the beams of CORESETs configured in the corresponding cell. For example, a beam for a CORESET having the lowest index among the CORESETs configured in the corresponding cell may be determined. The 'configured CORESETs' may include a CORESET used for initial access, that is, CORESET0. Alternatively, only CORESETs except for the CORESET configured in PDCCH-Config after the RRC configuration, that is, CORESET0 may be indicated. Further, the "beam for the CORESET" may be a TCI state configured in a specific CORESET through RRC or one TCI state activated by a MAC-CE among a plurality of TCI states when the plurality of TCI states are configured through RRC. As described above, when the beam for the CORESET is used as the default beam for PUCCH transmission, the UE may apply a spatial domain filter for receiving an RS configured in the CORESET and/or indicated by the activated TCI state to PUCCH transmission.

Case 2. The case in which a PDCCH is not configured in a PUCCH transmission cell: when the PUCCH transmission cell is the PUCCH-SCell, the PDCCH may not be configured in the corresponding cell. In this case, since there is no PDCCH beam to be referred to, the default beam for PUCCH transmission may be determined as a beam for a PDSCH configured in the corresponding cell if the PUCCH transmission cell is a cell in which PDSCH cell is also configured. The 'beam for the PDSCH' may be a TCI state configured through RRC for a PDSCH of the corresponding cell or one of activated TCI states, the TCI states being some of a plurality of TCI states activated by a MAC-CE when the plurality of TCI states are configured through RRC. For example, it may be a TCI state having the lowest index among the activated TCI states. As described above, when the beam for the PDSCH is used as the default beam for PUCCH transmission, the UE may apply a spatial domain filter for receiving an RS configured in the PDSCH and/or indicated by the activated TCI state to PUCCH transmission.

For the two cases, constrains for the application of the default beam for PUCCH transmission may be configured. For example, the beam for the PDCCH/PDSCH may be used as the default beam for PUCCH transmission only when beam correspondence between the downlink and the uplink is established. Whether the beam correspondence is established may be determined through reporting of a UE capability, that is, a capability indicating whether the beam correspondence is supported by a specific band. Further, constraints according to the used band may be configured. For example, the PUCCH default beam can be applied only in FR2, and one of the reasons is that the beam correspondence is a value reported only in FR2. Further, the PUCCH default beam may be applied only when it is explicitly configured by the BS. For example, an explicit parameter to apply the PUCCH default beam may be configured by RRC, a MAC-CE, or the like.

Embodiment 4: Default Beam Configuration for PUCCH Transmission to Multiple TRPs Cases in which NC-JT is configured may be classified as follows and a PUCCH default beam suitable for each classification may be configured.

Figure 18:
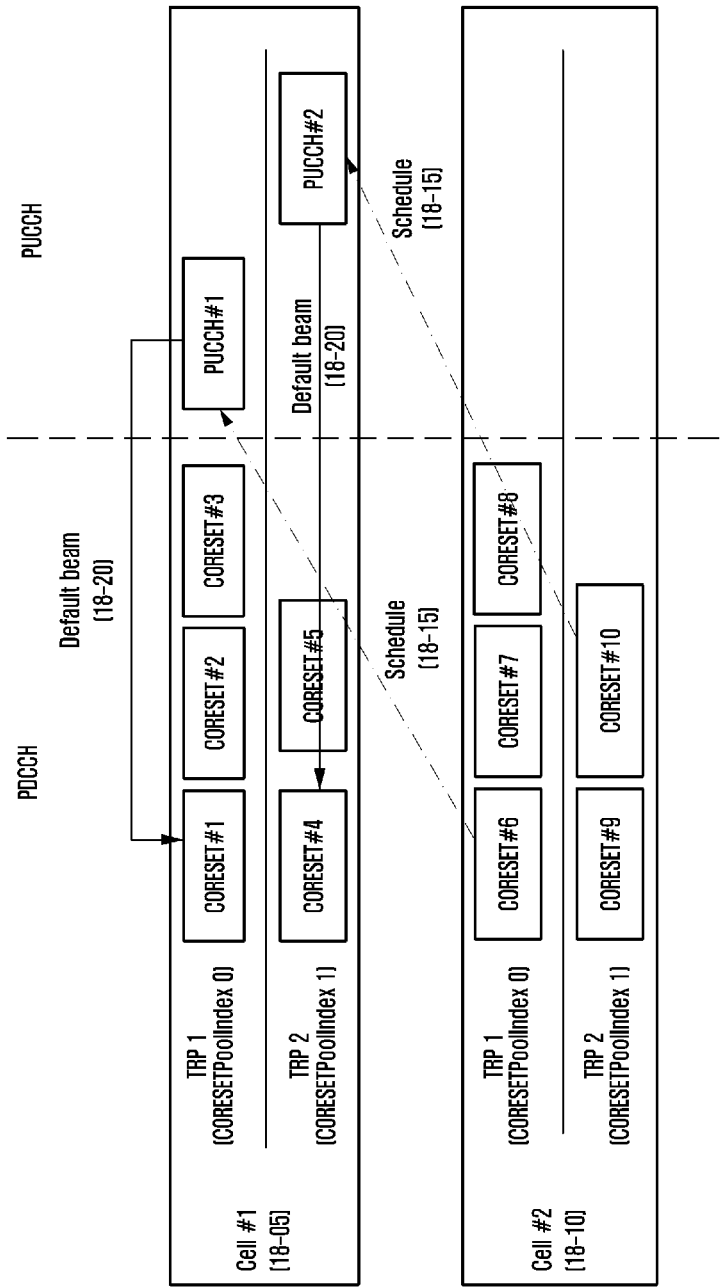
FIG. 18 illustrates an example of applying a PUCCH default beam for each target TRP according to an embodiment of the disclosure.

FIG. 18 illustrates an example of applying a PUCCH default beam for each target TRP according to an embodiment of the disclosure.

Classification 1. Multi-PDCCH-Based NC-JT Transmission

In the following classification, whether NC-JT of the PDCCH transmission cell is configured may be determined according to whether two different CORESETPoolIndex are configured in the PDCCH transmission cell as described in embodiment 1-1. Whether NC-JT of the PUCCH transmission cell is configured may be determined according to whether two different CORESETPoolIndex are configured in the PDCCH of the same cell. A condition for determining that the PUCCH transmission cell and the PDCCH transmission cell are the "same cells" may be the case in which the PUCCH transmission cell and the PDCCH transmission cell belong to the same cell configuration, for example, the PUCCH transmission cell and the PDCCH transmission cell belong to the same ServingCellConfig among one or more ServingCellConfig configurations configured through RRC or the case in which servingCellID of the PUCCH transmission cell and the PDCCH transmission cell are the same. When PDCCH transmission is not configured in the same cell, it may be determined that NC-JT is not configured in the PUCCH transmission cell.

In the following classification, the PUCCH is transmitted to one or a plurality of TRPs. For convenience of description, a target of TRP to which the UE transmits a specific PUCCH is named a target TRP.

Classification 1-1. The Case in which NC-JT is Configured in Both a PDCCH Transmission Cell and a PUCCH Transmission Cell In the corresponding classification, a target TPR for PUCCH transmission may be explicitly/implicitly indicated. For example, when Separate HARQ-ACK is configured, a target TRP of the PUCCH for HARQ-ACK transmission may correspond to a TRP index of the PDCCH scheduling the corresponding PUCCH, for example, a CORESET-PoolIndex value. In this case, when the PUCCH default beam presented in embodiment 3 is used, the same default beam is applied to all PUCCHs in which SpatialRelationInfo is not configured, and thus the PUCCH may not be properly transmitted to the target TRP. Accordingly, when the target TRP of the PUCCH is indicated, it is required to apply an independent PUCCH default beam for each target TRP. FIG. 18 illustrates an example of applying a PUCCH default beam for each target TRP. In FIG. 18, a target TRP of a PUCCH transmission cell 18-05 indicates a TRP index indicated to a CORESET 18-15 of a cell 18-10 scheduling the PUCCH, for example, CORESETPoolIndex. At this time, when PDCCH transmission is configured in the PUCCH transmission cell 18-05, a default beam 18-20 for the PUCCH indicated by the target TRP may be designated as one of beams of CORESETs selected from the CORESETs configured for the PDCCH, the selected CORESETs having a TRP index which is the same as the target TRP, for example, CORESETPoolIndex. A method of designating one of the beams of the selected CORESETs may include a method of selecting an index of a CORESET according to a specific reference. For example, a beam for a CORESET having the lowest index among the selected CORESETs may be designated as indicated by reference numeral 18-15.

The method of configuring the PUCCH default beam for each target TRP may have constraints. For example, when joint HARQ-ACK is configured, the target TRP may not be distinguished, and thus the configuration of the PUCCH default transmission beam for each target TRP may be limited only to the case in which separate HARQ-ACK is configured.

Alternatively, the configuration of an independent PUCCH default beam for each target TRP may increase UE complexity, and accordingly, when there are a plurality of target TRPs, only one PUCCH default beam may be configured and the same PUCCH default beam may be applied to all target TRPs. The 'same PUCCH default beam' may be a PUCCH default beam corresponding to a specific target TRP, for example, a PUCCH default beam corresponding to CORESETPoolIndex=0. Alternatively, the 'same PUCCH default beam' may be the PUCCH default beam presented in embodiment 3.

Alternatively, when NC-JT is configured in the PUCCH transmission cell, it may be forced to configure the PUCCH beam. For example, the UE may expect that spatialRelationInfo of the PUCCH transmitted in the above case is not configured or activated. The operation of the case may have constrains. For example, the operation may be limited only to the case in which separate HARQ-ACK is configured.

Classification 1-2. NC-JT is Configured in a PDCCH Transmission Cell, but No NC-JT is Configured in a PUCCH Transmission Cell In such a corresponding classification, when separate HARQ-ACK is configured, a target TRP may be designated in a PUCCH for transmitting HARQ-ACK, but there may be no default beam to be referred to for transmission to the target TRP in a PUCCH transmission cell. In this case, the same PUCCH default beam may be applied to all target TRPs. The 'same PUCCH default beam' may be a PUCCH default beam corresponding to a specific target TRP, for example, a PUCCH default beam corresponding to CORESETPoolIndex=0, which may be limited only to the case in which the CORESET is configured in the PUCCH transmission cell. Alternatively, the 'same PUCCH default beam' may be the PUCCH default beam presented in embodiment 3.

Alternatively, when NC-JT is configured in the PDCCH transmission cell for scheduling HARQ-ACK, a beam for the PUCCH to be transmitted may be forced to be configured. For example, the UE may expect that spatialRelationInfo of the PUCCH transmitted in the above case is not configured or activated.

Classification 1-3. No NC-JT is Configured in a PDCCH Transmission Cell but NC-JT is Configured in a PUCCH Transmission Cell In such a corresponding classification, a target TRP may be designated even though no NC-JT is configured in the PDCCH transmission cell. For example, CORESETPoolIndex may be not designated in all CORESETs of the PDCCH transmission cell or the same CORESETPoolIndex may be designated. In this case, it may be required to apply the PUCCH default beam to the designated target TRP. In one example, a PUCCH default beam for a specific target TRP of the PUCCH transmission cell may be designated as one of beams of CORESETs selected from the CORESETs configured for the PDCCH of the corresponding cell, the selected CORESETs having a TRP index which is the same as the target TRP, for example, CORESETPoolIndex. A method of designating one of the beams of the selected CORESETs may include a method of selecting an index of a CORESET according to a specific reference. For example, a beam for a CORESET having the lowest index among the selected CORESETs may be designated.

Classification 1-4. The Case in which No NC-JT is Configured in Both a PDCCH Transmission Cell and a PUCCH Transmission Cell The case may operate according to embodiment 3.

Classification 2. Single PDCCH-Based NC-JT Transmission

The corresponding classification is targeted at the case in which NC-JT is configured in the PUCCH transmission cell, that is, a maximum of two TCI states are mapped to one TCI codepoint of the PDSCH of the corresponding cell according to the operation of embodiment 3. In this case, a TCI state having the lowest index corresponding to a default beam for PUCCH transmission may correspond to at least one of the following interpretations.

Interpretation 1. The TCI state has the lowest TCI state ID among TCI states activated by a MAC-CE in a list of TCI states configured within PDSCH-Config in RRC IE, that is, a list of TCI states including tci-StatesToAddModList and tci-StatesToReleaseList Interpretation 2. The TCI state corresponds to the lowest TCI codepoint among TCI states corresponding to respective TCI codepoints in DCI, activated by a MAC-CE In the case of interpretation 2, the lowest TCI codepoint may indicate two TCI states in which case the number of default beams for PUCCH transmission may be two. Since the application of two transmission beams in PUCCH transmission is not supported at present, a method of selecting one of the default beams or restricting the configuration of the two default beams is needed. A detailed method is described below.

Method 1. When the lowest TCI codepoint indicates two TCI states, one of the two TCI states is selected. A selection method is based on a TCI state ID. That is, among the two TCI states, the lowest TCI state ID or the highest TCI state ID may be selected.

Method 2. The lowest TCI codepoint indicates only one TCI state. In this case, the UE may not expect that the lowest TCI codepoint indicates two TCI states.

Method 3. The definition of the 'lowest TCI codepoint' is changed. The PUCCH default beam is configured to correspond to the lowest codepoint among codepoints indicating one TCI state among all TCI codepoints.

Subsequently, a reference signal (sounding reference signal (SRS)) for uplink channel measurement is described in detail. The BS may indicate SRS transmission to the UE for uplink channel measurement, and the UE may transmit an SRS according to an indication.

Figure 19:
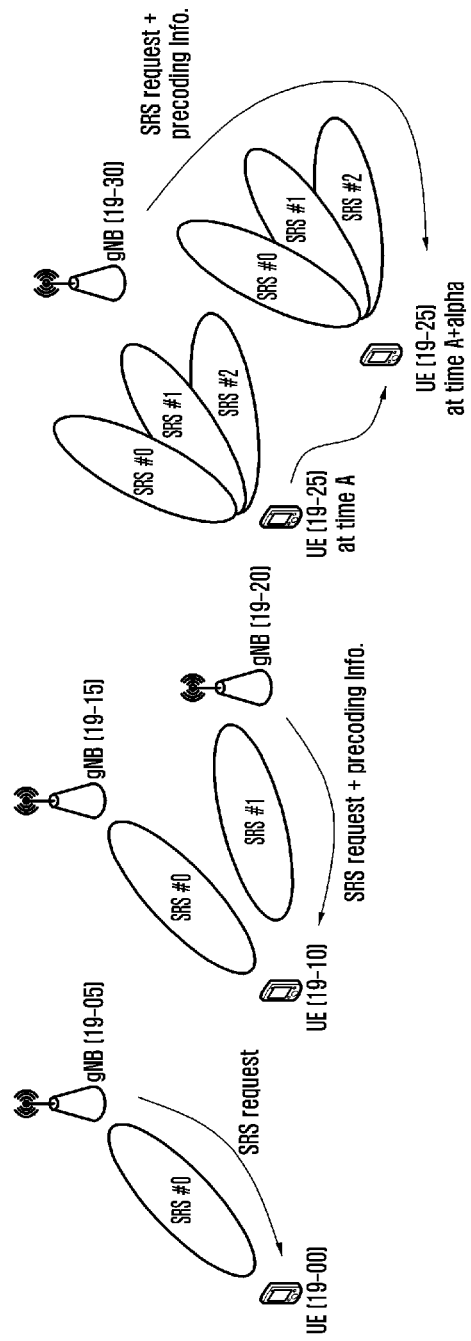
FIG. 19 illustrates the structure of the UE in a wireless communication system according to an embodiment of the disclosure.

FIG. 19 illustrates examples of various operation scenarios of the SRS.

Referring to FIG. 19, at least three SRS operation scenarios below can be considered in the NR system.

1) A gNB 19-05 configures a one-direction beam in a UE 19-00 (configuring a one-direction beam/precoding in the specifications includes applying no beam/precoding or applying a wide beam (cell-coverage or sector coverage), and the UE 19-00 transmits an SRS according to a transmission period and an offset of the SRS in the case of a periodic SRS or a semi-persistent SRS and according to an SRS request of the gNB (at a predetermined time after the SRS request) in the case of an aperiodic SRS. At this time, the SRSs do not need additional information for beam/precoding.

2) gNBs 19-15 and 19-20 configure beams in one or more directions in a UE 19-10, and the UE 19-10 may transmit a plurality of SRSs beamformed in the one or more directions. For example, as illustrated in the example of FIG. 19, it is possible to configure SRS resource (or port) #0 to be beamformed to the gNB 19-15 and SRS resource (or port) #1 to be beamformed to the gNB 19-20. In this case, the gNBs 19-15 and 19-20 are required to inform not only the SRS request but also SRS beam/precoding information unlike method 1).

3) A gNB 19-30 configures beams in one or more directions in a UE 19-25, and the UE 19-25 may transmit a plurality of SRSs beamformed in the one or more directions. For example, as illustrated in the example of FIG. 19, the gNB may configure the UE to transmit the SRSs by applying different beams/precodings to SRS resource (or port) #0, SRS resource (or port) #1, and SRS resource (or port) #2. Accordingly, in spite of high mobility of the UE, stable communication may be performed through beam/precoder diversity. For example, the UE 19-25 may provide channel state information to the gNB 19-30 through SRS #2 at a time point of time A and provide channel state information to the gNB 19-30 through SRS #0 at a time point of time A+alpha. In this case, the gNB 19-30 is required to inform not only the SRS request but also SRS beam/precoding information unlike method 1).

The above description has been made on the basis of SRS transmission, but may be similarly expanded to different UL channel or/and RS transmission such as a PRACH, a PUSCH, a PUCCH, and the like, and a detailed description for all cases is omitted to prevent the subject of the disclosure from being unclear.

Figure 20:
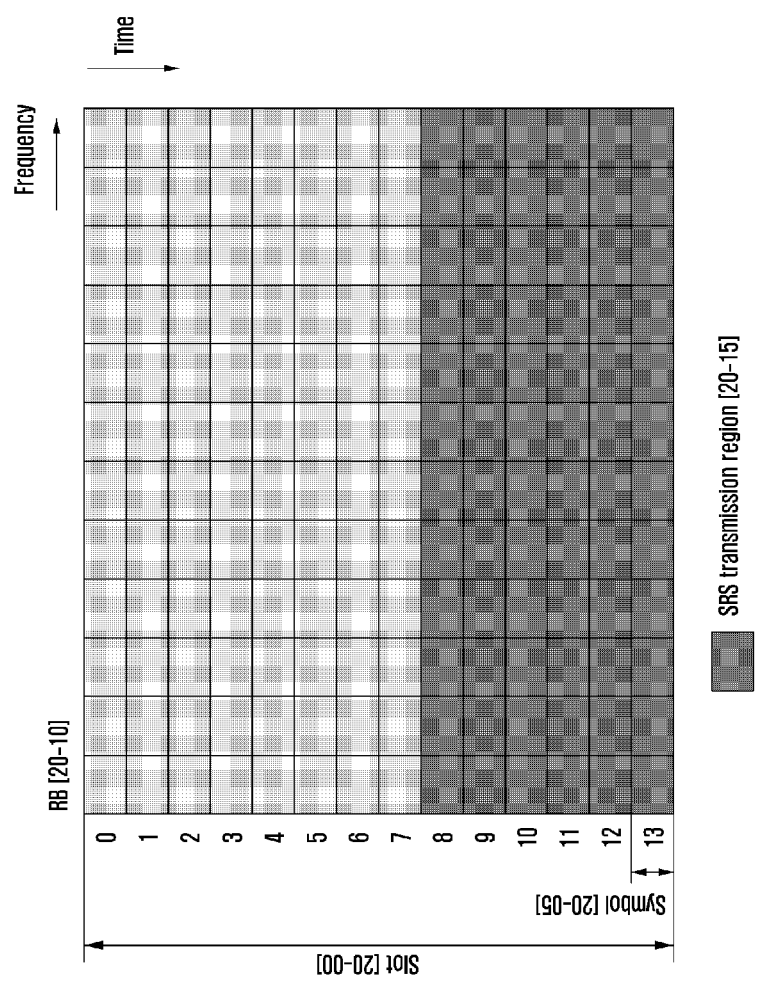
FIG. 20 illustrates the structure of the BS in a wireless communication system according to an embodiment of the disclosure.

FIG. 20 illustrates an uplink transmission structure of a wireless communication system according to an embodiment of the disclosure.

Referring to FIG. 20, a basic transmission unit of the 5G or NR system is a slot 20-00, each slot includes 14 symbols 20-05 on the basis of the assumption of a normal cyclic prefix (CP) length, and one symbol may correspond to one UL waveform (CP-OFDM or DFT-S-OFDM) symbol.

A resource block (RB) 20-10 is a resource allocation unit corresponding to one slot on the basis of a time domain and may include 12 subcarriers on the basis of a frequency domain.

An uplink structure may be largely divided into a data region and a control region. Unlike the LTE system, the control region may be configured at a predetermined uplink location and transmitted in the 5G or NR system. The data region includes a series of communication resources including data such as a voice, a packet, and the like transmitted to each UE and corresponds to the remaining resources except for the control region in the subframe. The control region includes a series of communication resources for a downlink channel quality report from each UE, reception ACK/NACK for a downlink signal, an uplink scheduling request, and the like.

The UE may simultaneously transmit its own data and control information in the data region and the control region. According to an embodiment, symbols in which the UE can periodically transmit the SRS within one slot may be the last 6-symbol section 20-15, and may be transmitted through a preconfigured SRS transmission band within a UL BWP based on the frequency domain. However, this is only an example, and symbols capable of transmitting the SRS may be expanded to another time section or may be transmitted through a frequency band. When RBs capable of transmitting the SRS are transmitted in the frequency domain, the number of RBs may be a multiple of 4 RBs and a maximum of 272 RBs.

According to an embodiment, the number of symbols of the SRS may be configured as 1, 2, or 4, and successive symbols may be transmitted. In the 5G or NR system, repetitive transmission of SRS symbols is allowed. Specifically, a repetitive transmission factor (repetition factor r) of the SRS symbols is $r \in \{1,2,4\}$, where $r \leq N$. For example, when one SRS antenna is mapped to one system and transmitted, a maximum of 4 symbols may be repeatedly transmitted. Meanwhile, different 4 antenna ports may be transmitted through different 4 symbols. At this time, each antenna port is mapped to one symbol, and thus repetitive transmission of SRS symbols is not allowed. The above example is only an example, and the number N of symbols of the SRS and the repetition factor r may be expanded to different values.

The SRS may include constant amplitude zero auto correlation (CAZAC) sequences. CAZAC sequences including SRSs transmitted from a plurality of UEs have different cyclic shift values. Further, in one CAZAC sequence, each of the CAZAC sequences generated through a cyclic shift has a zero correlation value with sequences having a cyclic shift value different therefrom. SRSs simultaneously allocated to the same frequency domain using such a characteristic may be divided according to the CAZAC sequence cyclic shift value configured by the BS for each SRS.

SRSs of a plurality of UEs may be divided according to not only the cyclic shift value but also a frequency location. The frequency location may be divided by SRS subband unit allocation or Comb. The 5G or NR system may support Comb2 and Comb4. In the case of Comb2, one SRS may be allocated only to an even-numbered or odd-numbered subcarrier within the SRS subband. At this time, each of the even-numbered subcarriers and the odd-numbered subcarriers may configure one Comb.

Each UE may receive allocation of the SRS subband on the basis of a tree structure. The UE may perform hopping on SRSs allocated to each subband at every SRS transmission time point. Accordingly, all transmission antennas of the UE may transmit SRSs through the entire uplink data transmission bandwidth.

Figure 21:
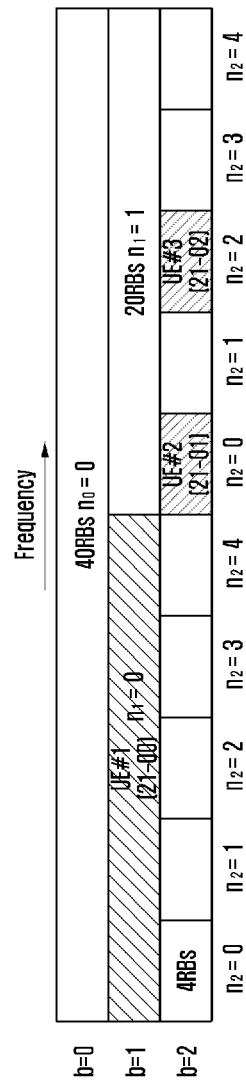
FIG. 21 illustrates the structure in which SRSs are allocated for each subband according to an embodiment of the disclosure.

FIG. 21 illustrates the structure in which SRSs are allocated for each subband.

Referring to FIG. 21, an example in which, when there is a data transmission band corresponding to 40 RBs in the frequency, the SRSs are allocated to each UE on the basis of a tree structure configured by the BS is illustrated.

In FIG. 21, when a level index of the tree structure is b, a highest level (b=0) of the tree structure may include one SRS subband in a bandwidth of 40 RBs. At a second level (b=1), 2 SRS subbands of a bandwidth of 20 RBs may be generated from the SRS subband at level b=0. Accordingly, there may be 2 SRS subbands in the entire data transmission band at the second level (b=1). At a third level (b=2), 5 SRS subbands of 4 RBs may be generated from the one SRS subband of 20 RBs at the next above level (b=1), and there may be a structure in which 10 SRS subbands of 4 RBs exist at one level.

The configuration of the tree structure may have various numbers of levels, various sizes of the SRS subband, and various numbers of SRS subbands per level according to the configuration of the BS. The number of SRS subbands at the level b generated from one SRS subband at a higher level may be defined as $N_b$, and indexes for $N_b$ SRS subbands may be defined as $n_b=\{0, \ldots, N_b-1\}$. As subbands vary depending on the level, UEs may be allocated for each subband per level as illustrated in FIG. 21. For example, UE 1 21-00 may be allocated to a first SRS subband ($n_1=0$) among 2 SRS subbands, each of which has a bandwidth of 20 RBs at level b=1, and UE 2 21-01 and UE 3 21-02 may be allocated to a first SRS subband ($n_2=0$) and a third SRS subband ($n_2=2$) below a second SRS subband of 20 RBs, respectively. Through the processes, a plurality of UEs may simultaneously transmit SRSs through a plurality of SRS subbands within one CC.

Specifically, for the SRS subband configuration, NR supports SRS bandwidth configurations shown in Table 34 below.

Table 34

TABLE 34

| $C_{SRS}$ | $B_{SRS}=0$ | | $B_{SRS}=1$ | | $B_{SRS}=2$ | | $B_{SRS}=3$ | |
| | $m_{SRS,0}$ | $N_0$ | $m_{SRS,1}$ | $N_1$ | $m_{SRS,2}$ | $N_2$ | $m_{SRS,3}$ | $N_3$ |
| --- | --- | --- | --- | --- | --- | --- | --- | --- |
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

Further, NR supports SRS frequency hopping on the basis of values in Table 34 above, and a detailed procedure follows Table 35 below.

TABLE 35

When SRS is transmitted on a given SRS resource, the sequence $r^{(p_i)}(n, l')$ for each OFDM symbol l' and for each of the antenna ports of the SRS resource shall be multiplied with the amplitude scaling factor $\beta_{SRS}$ in order to conform to the transmit power specified in [5, 38.213] and mapped in sequence starting with $r^{(p_i)}(0, l')$ to resource elements (k, l) in a slot for each of the antenna ports $p_i$ according to TABLE 35-continued $$a^{(p_i)}_{K_{TC}k'+k_0^{(p_i)},l'+l_0} = \begin{cases} \frac{1}{\sqrt{N_{sp}}}\beta_{SRS}r^{(p_i)}(k',l') & k' = 0, 1, \ldots, M^{SRS}_{sc,b} - 1 \\ & l' = 0, 1, \ldots, N^{SRS}_{symb} - 1 \\ 0 & \text{otherwise} \end{cases}$$

The length of the sounding reference signal sequence is given by
$M_{sc,b}{}^{SRS} = m_{SRS,b}N_{sc}{}^{RB}/K_{TC}$
where $m_{SRS,b}$ is given by a selected row of Table 6.4.1.4.3-1 with $b = B_{SRS}$ where $B_{SRS} \in \{0,1,2,3\}$ is given by the field b-SRS contained in the higher-layer parameter freqHopping. The row of the table is selected according to the index $C_{SRS} \in \{0,1,\ldots,63\}$ given by the field c-SRS contained in the higher-layer parameter freqHopping.
The frequency-domain starting position $k_0^{(p_i)}$ is defined by $$k_0^{(p_i)} = \overline{k_0}^{(p_i)} + \sum_{b=0}^{B_{SRS}} K_{TC} M^{SRS}_{sc,b} n_b$$

where
$\overline{k_0}^{(p_i)} = n_{shift}N_{sc}{}^{RB} + k_{TC}^{(p_i)}$ $$k_{TC}^{(p_i)} = \begin{cases} (\overline{k}_{TC} + K_{TC}/2) \bmod K_{TC} & \text{if } n^{cs}_{SRS} \in \{n^{cs,max}_{SRS}/2, \ldots, n^{cs,max}_{SRS} - 1\} \text{ and} \\ & N^{SRS}_{sp} = 4 \text{ and } p_i \in \{1001, 1003\} \\ \overline{k}_{TC} & \text{otherwise} \end{cases}$$

If $N_{BWP}{}^{start} \leq n_{shift}$ the reference point for $k_0^{(p_i)} = 0$ is subcarrier 0 in common resource block 0, otherwise the reference point is the lowest subcarrier of the BWP.
The frequency domain shift value $n_{shift}$ adjusts the SRS allocation with respect to the reference point grid and is contained in the higher-layer parameter freqDomainShift in the SRS-Config IE. The transmission comb offset $\overline{k}_{TC} \in \{0,1,\ldots, K_{TC} - 1\}$ is contained in the higher-layer parameter transmissionComb in the SRSConfig IE and $n_b$ is a frequency position index.
Frequency hopping of the sounding reference signal is configured by the parameter $b_{hop} \in \{0,1,2,3\}$, given by the field b-hop contained in the higher-layer parameter freqHopping.
If $b_{hop} \geq B_{STS}$, frequency hopping is disabled and the frequency position index $n_b$ remains constant (unless re-configured) and is defined by
$n_b = \lfloor 4n_{RRC}/m_{SRS,b} \rfloor \bmod N_b$
for all $N_{symb}{}^{SRS}$ OFDM symbols of the SRS resource. The quantity $n_{RRC}$ is given by the higher-layer parameter freqDomainPosition and the values of $m_{SRS,b}$ and $N_b$ for $b = B_{SRS}$ are given by the selected row of Table 6.4.1.4.3-1 corresponding to the configured value of $C_{SRS}$.
if $b_{hop} < B_{SRS}$, frequency hopping is enabled and the frequency position indices $n_b$ are defined by $$n_b = \begin{cases} \lfloor 4n_{RRC}/m_{SRS,b} \rfloor \bmod N_b & b \leq b_{hop} \\ (F_b(n_{SRS}) + \lfloor 4n_{RRC}/m_{SRS,b} \rfloor) \bmod N_b & \text{otherwise} \end{cases}$$

where $N_b$ is given by Table 6.4.1.4.3-1, $$F_b(n_{SRS}) = \begin{cases} (N_b/2)\left\lfloor \frac{n_{SRS} \bmod \prod_{b'=b_{hop}}^{b} N_{b'}}{\prod_{b'=b_{hop}}^{b-1} N_{b'}} \right\rfloor + \left\lfloor \frac{n_{SRS} \bmod \prod_{b'=b_{hop}}^{b} N_{b'}}{2\prod_{b'=b_{hop}}^{b-1} N_{b'}} \right\rfloor & \text{if } N_b \text{ even} \\ \lfloor N_b/2 \rfloor \lfloor n_{SRS} / \prod_{b'=b_{hop}}^{b-1} N_{b'} \rfloor & \text{if } N_b \text{ odd} \end{cases}$$

and where $N_{b_{hop}} = 1$ regardless of the value of $N_b$. The quantity $n_{SRS}$ counts the number of SRS transmissions. For the case of an SRS resource configured as aperiodic by the higher-layer parameter resourceType, it is given by $n_{SRS} = \lfloor l'/R \rfloor$ within the slot in which the $N_{symb}{}^{SRS}$ symbol SRS resource is transmitted. The quantity $R \leq N_{sym}{}^{SRS}$ is the repetition factor given by the field repetitionFactor contained in the highter-layer parameter resourceMapping.

As described above, the 5G or NR UE supports a single user (SU)-MIMO scheme and has a maximum of 4 transmission antennas. Further, the NR UE may simultaneously transmit SRSs through a plurality of CCs or a plurality of SRS subbands within the CCs. Unlike the LTE system, in the 5G or NR system, various numerologies may be supported, a plurality of SRS transmission symbols may be variously configured, and repetitive SRS transmission through a repetition factor may be allowed. Accordingly, it is required to count SRS transmissions considering the same. Counting SRS transmissions may be variously used. For example, counting SRS transmissions may be used to support antenna switching according to SRS transmission. Specifically, a time point at which the SRS is transmitted, an antenna corresponding to the transmitted SRS, and a band in which the SRS is transmitted may be determined by the SRS transmission counting.

The BS may configure configuration information for transmitting an uplink reference signal to the UE. Specifically, the BS may indicate SRS configuration information for each uplink BWP to the UE in the form of higher-layer signaling srs-Config as shown in Table 36.

TABLE 36

| |  |
|---|---|
| BWP-UplinkDedicated ::= | SEQUENCE { |
| pucch-Config | SetupRelease { PUCCH-Config } OPTIONAL, -- Need M |
| (PUCCH configuration for one BWP of serving cell) | |
| pusch-Config | SetupRelease { PUSCH-Config } OPTIONAL, -- Need M |
| (PUSCH configuration for one BWP of serving cell) | |

TABLE 36-continued

| | |
|---|---|
| configuredGrantConfig | SetupRelease { ConfiguredGrantConfig} OPTIONAL, -- Need M |
| (configuration for type 1 or type 2 of configured grant) | |
| srs-Config | SetupRelease { SRS-Config } OPTIONAL, -- Need M |
| (uplink sounding reference signal (SRS) configuration) | |
| beamFailureRecoveryConfig | SetupRelease { BeamFailureRecoveryConfig } OPTIONAL, -- COND SpCellOnly |
| (configuration for beam failure recovery) | |
| ..., | |
| } | |

According to an embodiment, a detailed structure of higher-layer signaling srs-Config may include at least some of the parameters listed in Table 37.

TABLE 37

| | |
|---|---|
| SRS-Config ::= | SEQUENCE { |
| srs-ResourceSetToReleaseList | SEQUENCE |
| (SIZE(1..maxNrofSRS-ResourceSets)) OF SRS-ResourceSetId OPTIONAL, | -- Need N |
| (released SRS resource set list) | |
| srs-ResourceSetToAddModList | SEQUENCE |
| (SIZE(1..maxNrofSRS-ResourceSets)) OF SRS-ResourceSet OPTIONAL, | -- Need N |
| (added or modified SRS resource set list) | |
| srs-ResourceToReleaseList | SEQUENCE |
| (SIZE(1..maxNrofSRS-Resources)) OF SRS-ResourceId OPTIONAL, | -- Need N |
| (released SRS resource list) | |
| srs-ResourceToAddModList | SEQUENCE |
| (SIZE(1..maxNrofSRS-Resources)) OF SRS-Resource OPTIONAL, | -- Need N |
| (added or modified SRS resource list) | |
| tpc-Accumulation | ENUMERATED {disabled} |
| OPTIONAL, | -- Need S |
| (indicate whether to perform accumulation of TPC command) | |
| ..., | |
| } | |
| SRS-ResourceSet ::= | SEQUENCE { |
| srs-ResourceSetId | SRS-ResourceSetId, |
| (SRS resource set identifier) | |
| srs-ResourceIdList | SEQUENCE |
| (SIZE(1..maxNrofSRS-ResourcesPerSet) ) OF SRS-ResourceId OPTIONAL, -- Cond Setup | |
| (identifiers of SRS resources included in corresponding SRS resource set) | |
| resourceType | CHOICE { |
| (configure time domain operation of SRS resource) | |
| aperiodic | SEQUENCE { |
| (configure aperiodic SRS) | |
| aperiodicSRS-ResourceTrigger | INTEGER |
| (1..maxNrofSRS-TriggerStates-1), | |
| (DCI codepoint for transmitting SRS according to SRS resource set configuration of corresponding area) | |
| csi-RS | NZP-CSI-RS- |
| ResourceId | OPTIONAL, -- Cond |
| NonCodebook | |
| (identifier of CSI-RS resource associated with SRS resource set) | |
| slotoffset | INTEGER (1..32) |
| OPTIONAL, -- Need S | |
| (slot offset between DCI trigger time point and actual transmission of SRS resource set) | |
| ..., | |
| [[ | |
| aperiodicSRS-ResourceTriggerList | SEQUENCE |
| (SIZE(1..maxNrofSRS-TriggerStates-2)) | OF |
| INTEGER (1..maxNrofSRS-TriggerStates-1) | OPTIONAL -- Need M |
| (list of additional DCI codepoints for transmitting SRS according to SRS resource set configuration of corresponding area) | |
| ]] | |
| }, | |

TABLE 37-continued

| | | |
|---|---|---|
| semi-persistent<br>(configure semi-persistent SRS) | | SEQUENCE { |
| associatedCSI-RS<br>ResourceId NonCodebook<br>(identifier of CSI-RS resource associated with non-codebook-based SRS resource set) | | NZP-CSI-RS-<br>OPTIONAL, -- Cond |
| ... | | |
| },<br>periodic<br>(configure periodic SRS) | | SEQUENCE { |
| associatedCSI-RS<br>ResourceId NonCodebook | | NZP-CSI-RS-<br>OPTIONAL, -- Cond |
| ... | | |
| }<br>},<br>usage<br>{beamManagement, codebook, nonCodebook, antennaSwitching},<br>(indicate place used of SRS reosurce set) | | ENUMERATED |
| alpha<br>OPTIONAL, -- Need S<br>(alpha value for SRS power control) | | Alpha |
| p0<br>OPTIONAL, -- Cond Setup<br>(P0 value for SRS power control) | | INTEGER (-202..24) |
| pathlossReferenceRS<br>(reference signal for estimating SRS path loss) | | CHOICE { |
| ssb-Index<br>(path loss reference SSR/PBCH block index) | | SSB-Index, |
| csi-RS-Index<br>ResourceId<br>(path loss reference CSI-RS resource index)<br>}<br>OPTIONAL, -- Need M | | NZP-CSI-RS- |
| srs-PowerControlAdjustmentStates<br>separateClosedLoop}<br>(indicate method of SRS power control)<br>...,<br>} | | ENUMERATED { sameAsFci2,<br>OPTIONAL, -- Need S |
| SRS-ResourceSetId ::=<br>ResourceSets-1) | | INTEGER (0..maxNrofSRS- |
| SRS-Resource ::= | | SEQUENCE { |
| srs-ResourceId<br>(SRS resource identifier) | | SRS-ResourceId, |
| nrofSRS-Ports<br>ports2, ports4},<br>(number of SRS ports) | | ENUMERATED {port1, |
| ptrs-PortIndex<br>OPTIONAL, -- Need R<br>(PTRS port index of SRS resources for supporting non-codebook-based uplink MIMO) | | ENUMERATED {n0, n1 } |
| transmissionComb<br>(configure SRS comb value and comb offset as comb value of 2 or 4) | | CHOICE { |
| n2 | | SEQUENCE { |
| combOffset-n2<br>(comb offset when comb value is 2) | | INTEGER (0..1), |
| cyclicShift-n2<br>(configure cyclic shift when comb value is 2)<br>}, | | INTEGER (0..7) |
| n4 | | SEQUENCE { |
| combOffset-n4<br>(comb offset when comb value is 4) | | INTEGER (0..3), |
| cyclicShift-n4<br>(configure cyclic shift when comb value is 4)<br>}<br>}, | | INTEGER (0..11) |
| resourceMapping<br>(OFDM symbol position information of SRS resource) | | SEQUENCE { |
| startPosition<br>(SRS resource position in time domain, map as 0 is the last symbol,<br>1 is second last symbol) | | INTEGER (0..5), |
| nrofSymbols<br>n4} ,<br>the number of OFDM symbols) | | ENUMERATED {n1, n2, |
| repetitionFactor<br>n4}<br>(repetition factor)<br>}, | | ENUMERATED {n1, n2, |
| freqDomainPosition | | INTEGER (0..67), |

TABLE 37-continued

| | |
|---|---|
| (frequency domain position of SRS resource) | |
|   freqDomainShift | INTEGER (0..268), |
| (frequency domain shift value of SRS resource) | |
|   freqHopping | SEQUENCE { |
| (frequency hopping information of SRS resource) | |
| c-SRS | INTEGER (0..63), |
| ($C_{SRS}$ information) | |
|     b-SRS | INTEGER (0..3), |
| ($B_{srs}$ information) | |
|     b-hop | INTEGER (0..3) |
| ($b_{hop}$ information) | |
|   }, | |
|   groupOrSequenceHopping | ENUMERATED { neither, |
| groupHopping, sequenceHopping }, | |
| (information indicating whether to perform group hopping or sequence hopping for SRS resources) | |
|   resourceType | CHOICE { |
|     aperiodic | SEQUENCE { |
|       ... | |
|     }, | |
|     semi-persistent | SEQUENCE { |
|       periodicityAndOffset-sp | SRS- |
| PeriodicityAndOffset, | |
| (period and slot offset information for semi-persistent SRS resources) | |
|       ... | |
|     }, | |
|     periodic | SEQUENCE { |
|       periodicityAndOffset-p | SRS- |
| PeriodicityAndOffset, | |
| (period and slot offset information for periodic SRS resources) | |
|       ... | |
|     } | |
|   }, | |
|   sequenceId | INTEGER (0..1023), |
| (initial sequence identifier for performing group hopping and sequence hopping) | |
|   spatialRelationInfo | SRS-SpatialRelationInfo |
| OPTIONAL,     -- Need R | |
| (spatial relation configuraiton information between target SRS and reference RS) | |
|   ..., | |
| } | |
| SRS-PeriodicityAndOffset ::= | CHOICE { |
|   sl1 | NULL, |
|   sl2 | INTEGER(0..1), |
|   sl4 | INTEGER(0..3), |
|   sl5 | INTEGER(0..4), |
|   sl8 | INTEGER(0..7), |
|   sl10 | INTEGER(0..9), |
|   sl16 | INTEGER(0..15), |
|   sl20 | INTEGER(0..19), |
|   sl32 | INTEGER(0..31), |
|   sl40 | INTEGER(0..39), |
|   sl64 | INTEGER(0..63), |
|   sl80 | INTEGER(0..79), |
|   sl160 | INTEGER(0..159), |
|   sl320 | INTEGER(0..319), |
|   sl640 | INTEGER(0..639), |
|   sl1280 | INTEGER(0..1279), |
|   sl2560 | INTEGER(0..2559) |
| } | | srs-Config may include one or more SRS resource sets. One SRS resource set includes one or more SRS resources having the same time domain operation and place used. The time domain operation which can be configured in the SRS resource set may be one of "periodic", "semi-persistent", and "aperiodic". Meanwhile, the place used of the SRS resource set may be configured as a usage parameter within the SRS resource set, and may have one value among "beamManagement: beam management", "codebook: codebook-based uplink transmission", "nonCodebook: noncodebook-based uplink transmission", and "downlink channel information acquisition using antennaSwitching: reciprocity".

Meanwhile, resource allocation information in the time-frequency axis of SRS resources and information on frequency hopping may be independently configured for each SRS resource. Further, the UE also can configure a spatial domain transmission filter to be used for SRS resource transmission independently for each SRS resource. The spatial domain transmission filter may be indicated by a parameter spatialRelationInfo, and the parameter may include an index of a downlink or uplink reference signal. When the parameter spatialRelationInfo indicates an index of a CSI-RS resource or SSB, the UE may understand that a spatial domain transmission filter which is the same as a spatial domain receive filter used when the referred CSI-RS resource or SSB is received is used. Alternatively, spatial relation info refers to another SRS resource index, the UE may understand that a spatial domain transmission filter used when the referred SRS resource is transmitted is used.

Subsequently, a method of configuring SRS transmission power is described in detail. Maximum transmission power available for uplink transmission of the UE may be limited according to a power class of the UE, an MPR according to allocated RBs and a modulation order, out of band emission, maximum permissible exposure (MPE), and the like. The UE may control transmission power for transmitting an uplink reference signal, a control signal, and data under the limited maximum transmission power. Parameters used for determining transmission power of the UE may include at least $P_0$, a path attenuation (pathloss) estimation value, the size of allocated frequency blocks, and the like. According to some embodiments, SRS transmission power at a transmission time point i for a serving cell c, a frequency f, and a BWP b may be determined as shown in Equation 2.

$$P_{SRS,b,f,c}(i,q_s,l) = \min\{P_{CMAX,f,c}(i), P_{0\text{-}SRS,b,f,c}(q_s) + 10 \log_{10}(2^\mu \cdot M_{RB,b,f,c}^{SRS}(i)) + \alpha_{SRS,b,f,c}(q_s) \cdot PL_{b,f,c}(q_d) + h_{b,f,c}(i,l)\}[dBm]$$  Equation 2

In Equation 2 above, each parameter has the following meaning.

$q_s$: denotes an index of an SRS resource set. As described below, a parameter for SRS transmission power is configured for each SRS resource set.

$P_{CMAX,f,c}(i)$: denotes maximum transmission output of the UE in a serving cell c and a frequency f and may be determined by the UE according to a P-max value (a preset value if there is no BS) configured by the BS through system information or RRC, a power class of the UE embedded into the UE, the number of uplink serving cells used by the UE, and an MPR.

$P_{0\text{-}SRS,b,f,c}(j)$: denotes a value configured by the BS through system information or RRC in order to guarantee a link quality of the reception BS.

$2^\mu \cdot M_{RB,b,f,c}^{SRS}(i)$: denotes the size of frequency blocks allocated for uplink transmission. At this time, $2\mu$ may be a parameter for compensating for different power densities (power spectral density (PSD)) according to subcarrier spacing. For example, when subcarrier spacing of 15 kHz is used, $\mu=0$. When subcarrier is changed to 30 kHz, that is, has doubled although the same number of frequency blocks are used, the power density may decrease by half compared to the case in which subcarrier spacing of 15 kHz is used. Accordingly, in order to compensate for this, it is required to increase power twice. More specifically, for example, when two frequency blocks are used, 10 log 10(2×2⁰)=3 dB is needed in the case of subcarrier spacing of 15 kHz, but transmission power may be increased to 10 log 10(2×2¹)=6 dB in the case of subcarrier spacing of 30 kHz in order to maintain the power density which is the same as that in the case of subcarrier spacing of 15 kHz.

α: denotes a parameter for compensating for a path attenuation value and has a value between 0 and 1, and may be a value configured by the BS through system information or RRC. For example, path attenuation may be compensated by 100% in the case of α=1, and may be compensated by only 80% in the case of α=0.8.

$PL_{b,f,c}(q_d)$: denotes a path attenuation estimation value measured through a reference signal $q_d$. At this time, the path attenuation value may be estimated through Equation 3.

Transmission power of signal used for estimating path attenuation−reference signal received power (RSRP) measurement value of signal used for estimating path attenuation  Equation 3

In Equation 3 above, a signal $q_d$ used for estimating path attenuation may be one of signals including a CSI-RS transmitted by the gNB, a secondary synchronization signal (SSS) transmitted by the gNB, or a demodulation reference signal (DMRS) transmitted through an SSS or a physical broadcast channel (PBCH). More specifically, the gNB may transmit information on transmission power of the reference signal to UE1 through system information or an RRC configuration, and UE1 may measure an RSRP value by using the reference signal transmitted by the gNB. The RSRP value may be L1-RSRP or L3-RSRP to which a filter indicated through system information/RRC configuration is applied $h_{b,f,c}(i, l)$: denotes a TPC command for closed-loop or open-loop power control of SRS resources. The UE may receive an independent TPC command in every closed-loop or open-loop by operating a plurality of closed-loop or open-loop power controls for each uplink channel or PUCCH/PUSCH/SRS, and 1 indicates an index of the closed-loop or the open-loop.

Subsequently, a method of configuring PUCCH transmission power is described in detail. According to some embodiments, PUCCH transmission power at a transmission time point i for a serving cell c, a frequency f, and a BWP b may be determined as shown in Equation 4.

$$P_{PUCCH,b,f,c}(i,q_u,q_d,l) = \min\{P_{CMAX,f,c}(i), P_{0\text{-}PUCCH,b,f,c}(q_u) + 10 \log 10(2\mu \cdot M_{RB,b,f,c}^{PUCCH}(i)) + PL_{b,f,c}(q_d) + \Delta_{F\text{-}PUCCH}(F) + \Delta_{TF,b,f,c}(i) + g_{b,f,c}(i,l)\}[dBm]$$  Equation 4

In Equation 4 above, each parameter has the following meaning.

$P_{CMAX,f,c}(i)$: denotes maximum transmission output of the UE in a serving cell and a frequency f and may be determined by the UE according to a P-max value (a preset value if there is no BS) configured by the BS through system information or RRC, a power class of the UE embedded into the UE, the number of uplink serving cells used by the UE, and an MPR.

$P_{0\text{-}PUCCH,b,f,c}(q_u)$: denotes a value configured by the BS through system information or RRC in order to guarantee a link quality of the reception UE.

$2^\mu \cdot M_{RB,b,f,c}^{PUCCH}(i)$: denotes the size of frequency blocks allocated for uplink transmission. At this time, $2^\mu$ may be a parameter for compensating for different power densities (power spectral density (PSD)) according to subcarrier spacing. For example, when subcarrier spacing of 15 kHz is used, $\mu=0$. When subcarrier is changed to 30 kHz, that is, has doubled although the same number of frequency blocks are used, the power density may decrease by half compared to the case in which subcarrier spacing of 15 kHz is used. Accordingly, in order to compensate for this, it is required to increase power twice. More specifically, for example, when two frequency blocks are used, 10 log 10(2×2⁰)=3 dB is needed in the case of subcarrier spacing of 15 kHz, but transmission power may be increased to 10 log 10(2×2¹)=6 dB in the case of subcarrier spacing of 30 kHz in order to maintain the power density which is the same as that in the case of subcarrier spacing of 15 kHz.

$PL_{b,f,c}(q_d)$: denotes a path attenuation estimation value measured through a reference signal $q_d$. At this time, the path attenuation value may be estimated through Equation 3 above.

$\Delta_{F\text{-}PUCCH}$ (F): denotes a compensation value of transmission power configured for each PUCCH format. The compensation value may be indicated through individual system information/RRC configuration for each PUCCH format.

$\Delta_{TF,b,f,c}(i)$: denotes a compensation value of transmission power according to efficiency of resources of the PUCCH channel. As the resource efficiency is higher (that is, when smaller resources are used to transmit the same bits or when larger bits are transmitted in the same resources), it is required to use higher transmission power. Accordingly, the compensation value is determined through a ratio of the number of resource elements (REs) to an amount of UCI information. For example, in the case of PUCCH format 0 or format 1, the compensation value is determined as $$\Delta_{TF,b,f,c}(i) = 10\log_{10}\left(\frac{N_{ref}^{PUCCH}}{N_{symb}^{PUCCH}(i)}\right) + \Delta_{UCI}(i)$$

where $N_{symb}^{PUCCH}(i)$ denotes the number of symbols allocated for PUCCH transmission and $N_{ref}^{PUCCH}$ denotes a reference value differently configured for each PUCCH format. For example, $N_{ref}^{PUCCH}=2$ in the case of PUCCH format 0, and $N_{ref}^{PUCCH}=N_{symb}^{slot}=14$ in the case of format 1. Further, $\Delta_{UCI}(i)=10\log_{10}(O_{UCI}(i))$ denotes a value indicating an amount of UCI information transmitted in PUCCH resources, and $\Delta_{UCI}(i)=0$ in the case of PUCCH format 0. Meanwhile, in the case of PUCCH format 2/3/4, the compensation value may be determined as a function according to a BPRE of PUCCH resources, that is, the number of bits per RE. The function may have the form of a monotone increasing function for the BPRE and may be expressed as, for example, a linear function, a log function, or the like.

$g_{b,f,c}(i, l)$: denotes a TPC command for closed-loop or open-loop power control of SRS resources. The UE may receive an independent TPC command in every closed-loop or open-loop by operating a plurality of closed-loop or open-loop power controls for each uplink channel or PUCCH/PUSCH/SRS, and l indicates an index of the closed-loop or the open-loop.

Some of the PUCCH transmission power configurations may be configured along with a beam configuration. That is, an RS configuration and a $P_{0\text{-}PUCCH,b,f,c}(j)$ configuration for estimating path attenuation may be included in the pucch-spatialRelationInfo configuration. At this time, a list of RSs for estimating path attenuation may be indicated by pathlossReferenceRSs in Table 38, and one of the RSs indicated by the list may be mapped to pucch-PathlossReferenceRS-Id within the pucch-spatialRelationInfo configuration in Table 29. The number of path attenuation estimation RSs which can be configured through pathlossReferenceRSs may be a maximum of four. The ssb-Index is configured when PUCCH-PathlossReferenceRS is connected to the SS/PBCH through referenceSignal in Table 38, and csi-RS-Index is configured when PUCCH-PathlossReferenceRS is connected to the CSI-RS.

TABLE 38

| PUCCH-PowerControl ::= | SEQUENCE { |
|---|---|
| deltaF-PUCCH-f0 | INTEGER (–16..15)  OPTIONAL, -- Need R |
| deltaF-PUCCH-f1 | INTEGER (–16..15)  OPTIONAL, -- Need R |
| deltaF-PUCCH-f2 | INTEGER (–16..15)  OPTIONAL, -- Need R |
| deltaF-PUCCH-f3 | INTEGER (–16..15)  OPTIONAL, -- Need R |
| deltaF-PUCCH-f4 | INTEGER (–16..15)  OPTIONAL, -- Need R |
| p0-Set | SEQUENCE (SIZE (1..maxNrofPUCCH-P0-PerSet)) OF |
| P0-PUCCH OPTIONAL, -- Need M | |
| pathlossReferenceRSs | SEQUENCE (SIZE |
| (1..maxNrofPUCCH-PathlossReferenceRSs)) OF PUCCH-PathlossReferenceRS   OPTIONAL, -- Need M | |
| twoPUCCH-PC-AdjustmentStates | ENUMERATED {twoStates}       OPTIONAL, -- Need S |
| ..., | |
| } | |
| P0-PUCCH ::= | SEQUENCE { |
| P0-PUCCH-Id | P0-PUCCH-Id, |
| p0-PUCCH-Value | INTEGER (–16..15) |
| } | |
| P0-PUCCH-Id ::= | INTEGER (1..8) |
| PUCCH-PathlossReferenceRS ::= | SEQUENCE { |
| pucch-PathlossReferenceRS-Id | PUCCH-PathlossReferenceRS-Id, |
| referenceSignal | CHOICE { |
| ssb-Index | SSB-Index, |
| csi-RS-Index | NZP-CSI-RS-ResourceId |
| } | |
| } | |

Next, PUSCH transmission is described. First, a scheduling scheme of PUSCH transmission is described. PUSCH transmission may be dynamically scheduled by a UL grant within DCI or may operate by configured grant Type 1 or Type 2. Dynamic scheduling of PUSCH transmission can be indicated by DCI format 0_0, 0_1, or 0_2.

Configured grant Type 1 PUSCH transmission may be semi-statically configured through reception of configuredGrantConfig including rrc-ConfiguredUplinkGrant in Table 39 through higher-layer signaling without reception of a UL grant within DCI. Configured grant Type 2 PUSCH transmission may be semi-persistently scheduled by a UL grant within DCI after reception of configuredGrantConfig which does not include rrc-ConfiguredUplinkGrant in Table 39 through higher-layer signaling. When PUSCH transmission operates by a configured grant, parameters applied to PUSCH transmission are applied through configuredGrantConfig which is higher-layer signaling of Table 39 except for dataScramblingIdentityPUSCH, txConfig, codebookSubset, maxRank, and scaling of UCI-OnPUSCH provided as pusch-Config of Table 40 which is higher-layer signaling. When the UE receives transformPrecoder within configuredGrantConfig which is higher-layer signaling of Table 39, the UE applies tp-pi2BPSK within pusch-Config of Table 40 to PUSCH transmission operating by the configuredgrant.

is the same as an antenna port for SRS transmission. PUSCH transmission may follow each of a codebook-based transmission method and a non-codebook-based transmission method according to whether a value of txConfig within pusch-Config of Table 40 which is higher-layer signaling is 'codebook' or 'nonCodebook'.

As described above, PUSCH transmission may be dynamically scheduled through DCI format 0_0, 0_1, or 0_2, or semi-statically configured by the configured grant. When the UE receives an indication of scheduling of PUSCH transmission through DCI format 0_0, the UE performs a beam configuration for PUSCH transmission by using pucch-spatialRelationInfoID corresponding to a UE-specific PUCCH resource corresponding to a minimum ID

TABLE 39

```
ConfiguredGrantConfig ::=            SEQUENCE {
    frequencyHopping                 ENUMERATED {intraSlot, interSlot}
OPTIONAL,       -- Need S,
    cg-DMRS-Configuration            DMRS-UplinkConfig,
    mcs-Table                        ENUMERATED {qam256, qam64LowSE}
OPTIONAL,       -- Need S
    mcs-TableTransformPrecoder       ENUMERATED {qam256, qaw64LowSE}
OPTIONAL,       -- Need S
    uci-OnPUSCH                      SetupRelease { CG-UCI-OnPUSCH }
OPTIONAL,       -- Need M
    resourceAllocation               ENUMERATED { resourceAllocationType0,
resourceAllocationType1, dynamicSwitch },
    rbg-Size                         ENUMERATED {config2}
OPTIONAL,       -- Need S
    powerControlLoopToUse            ENUMERATED {n0, n1},
    p0-PUSCHAlpha                    P0-PUSCB-AlphaSetId,
    transformPrecoder                ENUMERATED {enabled, disabled}
OPTIONAL,       -- Need S
    nrofHARQ-Processes               INTEGER(1..16),
    repK                             ENUMERATED {n1, n2, n4, n8},
    repK-RV                          ENUMERATED {s1-0231, s2-0303, s3-0000}
OPTIONAL,       -- Need R
    periodicity                      ENUMERATED {
                                       sym2, sym7, sym1x14, sym2x14,
sym4x14, sym5x14, sym8x14, sym10x14, sym16x14, sym20x14,
                                       sym32x14, sym40x14, sym64x14,
sym80x14, sym128x14, sym160x14, sym256x14, sym320x14, sym512x14,
                                       sym640x14, sym1024x14, sym1280x14,
sym2560x14, sym5120x14,
                                       sym6, sym1x12, sym2x12, sym4x12,
sym5x12, sym8x12, sym10x12, sym16x12, smy20x12, sym32x12,
                                       sym40x12, sym64x12, sym80x12,
sym128x12, sym160x12, sym256x12, sym320x12, sym512x12, sym640x12,
                                       sym1280x12, sym2560x12
    },
    configuredGrantTimer             INTEGER (1..64)
OPTIONAL,       -- Need R
    rrc-ConfiguredUplinkGrant        SEQUENCE {
        timeDomainOffset             INTEGER (0..5119),
        timeDomainAllocation         INTEGER   (0..15),
        frequencyDomianAllocation    BIT STRING (SIZE(18)),
        antennaPort                  INTEGER (0..31),
        dmrs-SeqInitialization       INTEGER (0..1)
OPTIONAL,       -- Need R
        precodingAndNumberOfLayers   INTEGER (0..63),
        srs-ResourceIndicator        INTEGER (0..15)
OPTIONAL,       -- Need R
        mcsAndTBS                    INTEGER (0..31),
        freguencyHoppingOffset       INTEGER (1..
maxNrofPhysicalResourceBlocks-1)    OPTIONAL,   -- Need R
        pathlossReferenceIndex       INTEGER (0..maxNrofPUSCH-
PathlossReferenceRSs-1),
        ...
    }
OPTIONAL,       -- Need R
    ...
}
```

Subsequently, a PUSCH transmission method is described. A DMRS antenna port for PUSCH transmission within the activated uplink BWP in the serving cell in which case the PUSCH transmission is based on a single antenna port. The UE does not expect scheduling of PUSCH transmission through DCI format 0_0 within a BWP in which the PUCCH resource including pucch-spatialRelationInfo is not configured. When the UE does not receive a configuration of txConfig within pusch-Config of Table 40, the UE does not expect reception of scheduling through DCI format 0_1.

configured through precodingAndNumberOfLayers which is higher-layer signaling. The TPMI is used to indicate a precoder applied to PUSCH transmission. When the UE receives a configuration of one SRS resource, the TPMI is used to indicate a precoder to be applied to the one configured SRS resource. When the UE receives a configuration of

TABLE 40

| | |
|---|---|
| PUSCH-Config ::= | SEQUENCE { |
| dataScramblingIdentityPUSCH | INTEGER (0..1023) |
| OPTIONAL, -- Need S | |
| txConfig | ENUMERATED {codebook, nonCodebook} |
| OPTIONAL, -- Need S | |
| dmrs-UplinkForPUSCH-MappingTypeA | SetupRelease { DMRS-UplinkConfig } |
| OPTIONAL, -- Need M | |
| dmrs-UplinkForPUSCH-MappingTypeB | SetupRelease { DMRS-UplinkConfig } |
| OPTIONAL, -- Need M | |
| pusch-PowerControl | PUSCH-PowerControl |
| OPTIONAL, -- Need M | |
| frequencyHopping | ENUMERATED {intraSlot, interSlot} |
| OPTIONAL, -- Need S | |
| frequencyHoppingOffsetLists | SEQUENCE (SIZE (1..4)) OF INTEGER (1.. |
| maxNrofPhysicalResourceBlocks-1) | |
| OPTIONAL, -- Need M | |
| resourceAllocation | ENUMERATED { resourceAllocationType0, |
| resourceAllocationType1, dynamicSwitch}, | |
| pusch-TimeDomainAllocationList | SetupRelease { PUSCH- |
| TimeDomainResourceAllocationList } | OPTIONAL, -- Need M |
| pusch-AggregationFactor | ENUMERATED { n2, n4, n8 } |
| OPTIONAL, -- Need S | |
| mcs-Table | ENUMERATED {qam256, qam64LowSE} |
| OPTIONAL, -- Need S | |
| mcs-TableTransformPrecoder | ENUMERATED {qam256, qam64LowSE} |
| OPTIONAL, -- Need S | |
| transformPrecoder | ENUMERATED {enabled, disabled} |
| OPTIONAL, -- Need S | |
| codebookSubset | ENUMERATED |
| {fullyAndPartialAndNonCoherent, partialAndNonCoherent,nonCoherent} | |
| OPTIONAL, -- Cond codebookBased | |
| maxBank | INTEGER (1..4) |
| OPTIONAL, -- Cond codebookBased | |
| rbg-Size | ENUMERATED { config2} |
| OPTIONAL, -- Need S | |
| uci-OnPUSCH | SetupRelease { UCI-OnPUSCH} |
| OPTIONAL, -- Need M | |
| tp-pi2BPSK | ENUMERATED {enabled} |
| OPTIONAL, -- Need S | |
| ... | |
| } | |

Subsequently, codebook-based PUSCH transmission is described. Codebook-based PUSCH transmission may be dynamically scheduled through DCI format 0_0 or 0_1 or semi-statically operate by the configured grant. When codebook-based PUSCH is dynamically scheduled by DCI format 0_1 or is semi-statically configured by the configured grant, the UE determines a precoder for PUSCH transmission on the basis of an SRS resource indicator (SRI), a transmission precoding matrix indicator (TPMI), and a transmission rank (the number of PUSCH transmission layers).

At this time, the SRI may be given through an SRS resource indicator field within DCI or may be configured through srs-ResourceIndicator which is higher-layer signaling. In codebook-based PUSCH transmission, the UE may receive a configuration of at least one SRS resource and a maximum of two SRS resources. When the UE receives the SRI through DCI, the SRS resource indicated by the corresponding SRI is the SRS resource corresponding to the SRI among SRS resources transmitted earlier than the PDCCH including the corresponding SRI. Further, the TPMI and the transmission rank may be given through field precoding information and number of layers within DCI or may be a plurality of SRS resources, the TPMI is used to indicate a precoder to be applied to SRS resources indicated through the SRI.

The precoder to be used for PUSCH transmission is selected from an uplink codebook having the number of antenna ports which is the same as a value of nrofSRS-Ports within SRS-Config which is higher-layer signaling. In codebook-based PUSCH transmission, the UE determines a codebook subset on the basis of the TPMI and a codebookSubset within pusch-Config which is higher-layer signaling. The codebookSubset within pusch-Config which is higher-layer signaling may be configured as one of 'fullyAndPartialAndNonCoherent', 'partialAndNonCoherent', or 'nonCoherent' on the basis of the UE capability which the UE reports to the BS. When the UE reports 'partialAndNonCoherent' as the UE capability, the UE does not expect a configuration of the value of the codebookSubset which is higher-layer signaling as 'fullyAndPartialAndNonCoherent'. Further, when the UE reports 'nonCoherent' as the UE capability, the UE does not expect a configuration of the value of the codebookSubset which is higher-layer signaling as 'fullyAndPartialAndNonCoherent' or 'partialAndNonCoherent'. When nrofSRS-Ports within SRS-ResourceSet which is higher-layer signaling indicate two SRS antenna ports, the UE does not expect a configuration of the value of the codebookSubset which is higher-layer signaling as 'partialAndNonCoherent'.

The UE may receive a configuration of one SRS resource set having a value of usage within SRS-ResourceSet which is higher-layer signaling configured as 'codebook', and one SRS resource may be indicated through the SRI within the corresponding SRS resource set. When several SRS resources are configured within the SRS resource set having the value of usage within SRS-ResourceSet which is higher-layer signaling configured as 'codebook', the UE expects a configuration of the same value of nrofSRS-Ports within the SRS-Resource which is higher-layer signaling for all SRS resources.

The UE may transmit one or a plurality of SRS resources included in the SRS resource set having the value of usage configured as 'codebook' to the BS according to higher-layer signaling, and the BS may select one of the SRS resources transmitted by the UE and instruct the UE to perform PUSCH transmission by using transmission beam information of the corresponding SRS resource. At this time, in codebook-based PUSCH transmission, the SRI is used as information for selecting an index of one SRS resource and is included in DCI. In addition, the BS may insert information indicating the TPMI and the rank to be used for PUSCH transmission by the UE into DCI. The UE performs PUSCH transmission by applying a precoder indicated by the rand and the TPMI indicated on the basis of the transmission beam of the corresponding SRS resource using the SRS resource indicated by the SRI.

Subsequently, non-codebook-based PUSCH transmission is described. Non-codebook-based PUSCH transmission may be dynamically scheduled through DCI format 0_0 or 0_1 or semi-statically operate by the configured grant. When at least one SRS resource is configured within the SRS resource set having the value of usage configured as 'non-Codebook' within SRS-ResourceSet which is higher-layer signaling, the UE may receive scheduling of non-codebook-based PUSCH transmission through DCI format 0_1.

For the SRS resource set having the value of usage configured as 'nonCodebook' within SRS-ResourceSet which is higher-layer signaling, the UE may receive a configuration of one connected non-zero power CSI-RS (NZP CSI-RS). The UE may calculate a precoder for SRS transmission through measurement for the NZP CSI-RS resource connected to the SRS resource set. When a difference between the last reception symbol of the aperiodic NZP CSI-RS resource connected to the SRS resource set and the first symbol of aperiodic SRS transmission in the UE is smaller than 42 symbols, the UE does not expect an update of information on the precoder for SRS transmission.

When the value of resource Type within SRS-ResourceSet which is higher-layer signaling is configured as 'aperiodic', the connected NZP CSI-RS is indicated by an SRS request which is a field within DCI format 0_1 or 1_1. At this time, when the connected NZP CSI-RS resource is an aperiodic NZP CSI-RS resource, the case in which the value of the SRS request field within DCI format 0_1 or 1_1 is not '00' indicates the existence of the connected NZP CSI-RS. At this time, the corresponding DCI should not indicate cross carrier or cross BWP scheduling. Further, when the value of the SRS request indicates the existence of the NZP CSI-RS, the corresponding NZP CSI-RS is located in a slot in which the PDCCH including the SRS request field is transmitted. At this time, TCI states configured in the scheduled subcarrier are not configured as QCL-TypeD.

When the periodic or semi-persistent SRS resource set is configured, the connected NZP CSI-RS may be indicated through an associatedCSI-RS within SRS-ResourceSet which is higher-layer signaling. For non-codebook-based transmission, the UE does not expect configurations of both spatialRelationInfo which is higher layer signaling for the SRS resource and associatedCSI-RS within SRS-ResourceSet which is higher-layer signaling.

When the UE receives a configuration of a plurality of SRS resources, the UE may determine a precoder and a transmission rank to be applied to PUSCH transmission on the basis of an SRI indicated by the BS. At this time, the SRI may be indicated through an SRS resource indicator field within DCI or may be configured through srs-ResourceIndicator which is higher-layer signaling. Like the codebook-based PUSCH transmission, when the UE receives the SRI through DCI, the SRS resource indicated by the corresponding SRI is the SRS resource corresponding to the SRI among SRS resources transmitted earlier than the PDCCH including the corresponding SRI. The UE may use one or a plurality of SRS resources for SRS transmission, and the maximum number of SRS resources which can be simultaneously transmitted in the same symbol within one SRS resource set and the maximum number of SRS resources are determined by the UE capability which the UE reports to the BS. At this time, SRS resources which the UE simultaneously transmits occupy the same RB. The UE configures one SRS port for each SRS resource. The number of SRS resource sets having the value of usage configured as 'nonCodebook' within SRS-ResourceSet which is higher-layer signaling is only one, and the maximum number of SRS resources for non-codebook-based PUSCH transmission can be 4.

The BS transmits one NZP-CSI-RS connected to the SRS resource set, and the UE calculates a precoder to be used for one or a plurality of SRS resource transmissions within the corresponding SRS resource set on the basis of the measurement result when the corresponding NZP-CSI-RS is received. When transmitting one or a plurality of SRS resources within the SRS resource set having usage configured as 'nonCodebook' to the BS, the UE applies the calculated precoder and the BS selects one or a plurality of SRS resources from among the one or plurality of received SRS resources. At this time, in non-codebook-based PUSCH transmission, the SRI indicates an index which may express one SRS resource or a combination of a plurality of SRS resources, and the SRI is included in the DCI. The number of SRS resources indicated by the SRI transmitted by the BS may be the number of transmission layers of the PUSCH, and the UE transmits the PUSCH by applying the precoder applied to SRS resources to each layer.

Subsequently, a method of configuring PUSCH transmission power is described in detail. The determination of PUSCH transmission power by the UE follows Equation 5 below.

$$P_{PUSCH,b,f,c}(i,j,q_d,l) = \min\{P_{CMAX,f,c}(i), P_{0\_PUSCH,b,f,c}(j) + 10\log 10(2^{\mu} \cdot M_{RB,b,f,c}^{PUSCH}(i)) + \alpha_{b,f,c}(j) \cdot PL_{b,f,c}(q_d) + \Delta_{TF,b,f,c}(i) + f_{b,f,c}(i,l)\}[dBm] \quad \text{Equation 5}$$

In Equation 5 above, each parameter has the following meaning.

$P_{CMAX,f,c}(i)$: denotes maximum transmission output of the UE in a serving cell c and a frequency f and may be determined by the UE according to a P-max value (a preset value if there is no BS) configured by the BS through system information or RRC, a power class of the UE embedded into the UE, the number of uplink serving cells used by the UE, and an MPR.

$P_{0\text{-}PUSCH,b,f,c}(j)$: denotes a value configured by the BS through system information or RRC in order to guarantee a link quality of the reception UE.

$2\mu \cdot M_{RB,b,f,c}^{PUSCH}(i)$: denotes the size of frequency blocks allocated for uplink transmission. At this time, $2^\mu$ may be a parameter for compensating for different power densities (power spectral density (PSD)) according to subcarrier spacing. For example, when subcarrier spacing of 15 kHz is used, $\mu=0$. When subcarrier is changed to 30 kHz, that is, has doubled although the same number of frequency blocks are used, the power density may decrease by half compared to the case in which subcarrier spacing of 15 kHz is used. Accordingly, in order to compensate for this, it is required to increase power twice. More specifically, for example, when two frequency blocks are used, $10 \log 10(2\times2^0)=3$ dB is needed in the case of subcarrier spacing of 15 kHz, but transmission power may be increased to $10 \log 10(2\times2^1)=6$ dB in the case of subcarrier spacing of 30 kHz in order to maintain the power density which is the same as that in the case of subcarrier spacing of 15 kHz.

$\alpha$: denotes a parameter for compensating for a path attenuation value and has a value between 0 and 1, and may be a value configured by the BS through system information or RRC. For example, path attenuation may be compensated by 100% in the case of $\alpha=1$, and may be compensated by only 80% in the case of $\alpha=0.8$.

$PL_{b,f,c}(q_d)$: denotes a path attenuation estimation value measured through a reference signal $q_d$. At this time, the path attenuation value may be estimated through Equation 3 above.

$\Delta_{TF,b,f,c}(i)$: denotes a compensation value of transmission power according to efficiency of a frequency (spectral efficiency) of the PUSCH channel. That is, as the frequency efficiency is higher (that is, when smaller resources are used to transmit the same bits or when larger bits are transmitted in the same resources), it is required to use higher transmission power. The compensation value is determined through a ratio of the number of used resource elements (REs) to an amount of information transmitted through PUSCH resources. More specifically, the compensation value may be determined as a function according to a BPRE of PUSCH resources, that is, the number of bits per RE. The function may have the form of a monotone increasing function for the BPRE and may be expressed as, for example, a linear function, a log function, or the like. A value of a coefficient multiplied by or added to the function may vary depending on the type of information to be transmitted through the PUSCH, that is, a UL-SCH or a CSI.

$f_{b,f,c}(i, 1)$: denotes a TPC command for closed-loop or open-loop power control. The UE may receive an independent TPC command in every closed-loop or open-loop by operating a plurality of closed-loop or open-loop power controls, and 1 indicates an index of the closed-loop or the open-loop.

For the transmission power control parameters, $P_{0\text{-}PUSCH,b,f,c}$, $\alpha$, $q_d$, 1 may be associated with the SRI. That is, through the SRI indicated during PUSCH scheduling, the transmission power parameters $P_{0\text{-}PUSCH,b,f,c}$, $\alpha$, $q_d$, 1 corresponding thereto may be determined, and accordingly, PUSCH transmission power may be determined. The relation between the SRI and the transmission power control parameters may be defined by higher-layer parameters shown in Table 41 below.

TABLE 41

```
PUSCH-PowerControl ::= SEQUENCE {
    tpc-Accumulation              ENUMERATED { disabled } OPTIONAL, -- NEED S
    msg3-Alpha                    Alpha OPTIONAL, -- Need S
    p0-NominalWithoutGrant        INTEGER (-202..24) OPTIONAL, -- NEED M
    p0-AlphaSets                  SEQUENCE (SIZE (1..maxNrofP0-PUSCH-AlphaSets)) OF P0-PUSCH-AlphaSet
                                  OPTIONAL, -- Need M
    pathlossReferenceRSToAddModList   SEQUENCE (SIZE (1..maxNrofPUSCH-PathlossReferenceRSs)) OF
    PUSCH-PathlossReferenceRS
                                  OPTIONAL, -- Need N
    pathlossReferenceRSToReleaseList  SEQUENCE (SIZE (1..maxNrofPUSCH-PathlossReferenceRSs)) OF
    PUSCH-PathlossReferenceRS-Id
                                  OPTIONAL, -- Need N
    two-PUSCH-PC-AdjustmentStates ENUMERATED {twoStates} OPTIONAL, -- Need S
    deltaMCS                      ENUMERATED {enabled} OPTIONAL, -- Need S
    sri-PUSCH-MappingToAddModList SEQUENCE (SIZE (1..maxNrofSRI-PUSCH-Mappings)) OF
    SRI-PUSCH-PowerControl
                                  OPTIONAL, -- Need N
    sri-PUSCH-MappingToReleaseList    SEQUENCE (SIZE (1..maxNrofSRI-PUSCH-Mappings)) OF
    SRI-PUSCH-PowerControlId
                                  OPTIONAL -- Need N
}
SRI-PUSCH-PowerControl ::= SEQUENCE {
    sri-PUSCH-PowerControlId      SRI-PUSCH-PowerControlId,
    sri-PUSCH-PathlossReferenceRS-Id  PUSCH-PathlossReferenceRS-Id,
    sri-P0-PUSCH-AlphaSetId       P0-PUSCH-AlphaSetId,
    sri-PUSCH-ClosedLoopIndex     ENUMERATED { i0, i1 }
}
```

A set of transmission power parameters for respective SRIs used for PUSCH transmission may be determined through sri-PUSCH-MappingToAddModList among the parameters, and the set of transmission power parameters may be provided in the form of SRI-PUSCH-PowerControl IE.

When the multi-TRP is used, an independent transmission power control parameter for each TRP may be configured to control the uplink transmission power. Meanwhile, the independent control parameter needs to be configured and activated for each PUCCH resource through RRC/MAC-CE/DCI. In order to reduce overhead for the configuration and activation, a method of configuring a default value of the transmission power control parameter for each PUCCH resource according to each TRP is disclosed in the following embodiment. Further, when the multi-TRP is used to improve reliability of the uplink signal, a single PUCCH resource may be repeatedly transmitted to the multi-TRP, and at this time, a method of configuring the default value of the transmission power control parameter for each TRP is disclosed. The description is limited only to the PUCCH channel, but is only for convenience of description, and may be similarly applied to other uplink channels, for example, a PUSCH, an SRS, and a PRACH.

Embodiment 5: Default Transmission Power Control Parameter Configuration for PUCCH Transmission to Multiple TRPs The present embodiment describes various examples of a method of configuring a default transmission power control parameter.
Classification 1. Multi-PDCCH-Based NC-JT Transmission
Classification 1-1. The Case in which NC-JT is Configured in Both a PDCCH Transmission Cell and a PUCCH Transmission Cell In the corresponding classification, a target TPR for PUCCH transmission may be explicitly/implicitly indicated. For example, when Separate HARQ-ACK is configured, a target TRP of the PUCCH for HARQ-ACK transmission may correspond to a TRP index of the PDCCH scheduling the corresponding PUCCH, for example, a CORESET-PoolIndex value. In this case, when the transmission power control parameter is not explicitly configured in each PUCCH, the same default transmission power parameter may be applied without division of the target TRP. However, target TRPs are different, different path attenuations are experienced due to a link difference between the UE and the respective TRPs, and applied uplink beams are also different. Accordingly, it is required to apply a different transmission power parameter according to each target TRP.

As one method, there may be a method of configuring individual default PUCCH spatial relation info according to each target TRP. That is, default PUCCH spatial relation info corresponding to TRP index #0 may be configured, and default PUCCH spatial relation info corresponding to TRP index #1 may be configured. Default PUCCH spatial relation info for each TRP index may have a different PUCCH spatial relation info ID, and the ID may be predefined. For example, the PUCCH spatial relation info ID corresponding to TRP index #0 may be 0, and the PUCCH spatial relation info ID corresponding to TRP index #1 may be 1. Further, an independent transmission power parameter may be applied to the PUCCH spatial relation info corresponding to each PUCCH spatial relation info ID. For example, an independent path attenuation RS, closed loop index, and P0 may be configured. At this time, for a PUCCH resource corresponding to each TRP index, transmission power may be determined through the application of the default PUCCH spatial relation info for each TRP index. The connection relation between each TRP index and the PUCCH resource may be defined according to the method described in embodiment 4. The method has an advantage of indicating default transmission power for each TRP and a transmission beam at the same time.

In another method, a default value of the power control parameter may be assumed for each target TRP without any configuration of the PUCCH spatial relation info. The disclosure can be used when the PUCCH spatial relation info configuration is not indicated to the UE like in initial access.

An example of the method of configuring the default value of each PUCCH power control parameter is described below.

$P_{0-PUCCH,b,f,c}(q_u)$: $P_{0-PUCCH,b,f,c}(q_u) = P_{0-NOMINAL-PUCCH} + P_{0-UE-PUCCH}(q_u)$. At this time, $P_{0-NOMINAL-PUCCH}$ or $P_{0-UE-PUCCH}(q_u)$ may be provided independently for each target TRP. For example, $P_{0-NOMINAL-PUCCH}$ corresponding to each TRP index may be independently configured through RRC. Further, $P_{0-UE-PUCCH}(q_u)$ may be indicated through a parameter p0-Set within PUCCH-PowerControl IE in Table 38, and the parameter p0-Set includes a list containing a plurality of pairs of {P0-PUCCH-Id, $P_{0-UE-PUCCH}(q_u)$}, and thus the connection relation between the TRP index for PUCCH transmission and the pair may be configured after pairs of {P0-PUCCH-Id, $P_{0-UE-PUCCH}(q_u)$)} are configured as many as the number of TRPs within the list. The connection relation may be predefined. For example, a pair for P0-PUCCH-Id having the lowest value may be connected to a first TRP index, and a pair for a second P0-PUCCH-Id may be connected to a second TRP index. At this time, the first/second TRP index may be determined according to the definition in embodiment 4. For example, the first TRP index may indicate CORESETPoolIndex=0, and the second TRP index may indicate CORESETPoolIndex=1.

$PL_{b,f,c}(q_d)$: the BS may configure or assume two or more pathloss RSs in the UE. For example, the BS may configure a plurality of pathloss RSs for PUCCH power control within pathlossRefereneRSs IE in which case the connection relation between the pathloss RS and the TRP index may be established. The connection relation may be predefined. For example, a pathloss RS corresponding to a zeroth index may be connected to a first TRP index, and a pathloss RS corresponding to a first index may be connected to a second TRP index. Alternatively, the pathlossRS for each TRP may be implicitly indicated while there is no pathlossReferenceRSs IE configuration. For example, it may be assumed that a specific RS used for the first TRP index, for example, a QCL-typeD RS of a TCI state used in the lowest CORESET within CORESETPoolIndex=0 is a pathlossRS for the first TRP index. Further, it may be assumed that a specific RS used for the second TRP index, for example, a QCL-typeD RS of a TCI state used in the lowest CORESET within CORESET-PoolIndex=1 is a pathlossRS for the second TRP index. In the implicit indication method, when there is no QCL-typeD RS in the TCI state like in FR1, an RS having another QCL-type, for example, one of QCL-typeA/B/C may be assumed as the pathloss RS.

$g_{b,f,c}(i, l)$: the BS may configure or assume two or more PUCCH closed loop power controls in the UE for the purpose of multi-TRP power control. An index of the closed loop power control may be configured as 0 or 1, and the connection relation between the closed loop power control index and the TRP index may be established. The connection relation may be predefined. For example, closed loop power control index 0 may be connected to a first TRP index, and closed loop power control index 1 may be connected to a second TRP index.

The method of configuring the PUCCH default transmission power parameter for each target TRP may have constraints. For example, when joint HARQ-ACK is configured, the target TRP may not be distinguished, and thus the configuration of the PUCCH default transmission power parameter for each target TRP may be limited only to the case in which separate HARQ-ACK is configured.

Classification 1-2. The Case in which NC-JT is Configured in a PDCCH Transmission Cell but No NC-JT is Configured in a PUCCH Transmission Cell In such a corresponding classification, when separate HARQ-ACK is configured, a target TRP may be designated in a PUCCH for transmitting HARQ-ACK, but there may be no default transmission power parameter configuration to be referred to for transmission to the target TRP in a PUCCH transmission cell. In this case, the same PUCCH default transmission power parameter configuration may be applied to all target TRPs. The 'same PUCCH default transmission power parameter configuration' may be a PUCCH default transmission power parameter configuration corresponding to a specific target TRP, for example, a PUCCH default transmission power parameter configuration corresponding to CORESETPoolIndex=0, which may be limited only to the case in which the CORESET is configured in the PUCCH transmission cell. Alternatively, the 'same PUCCH default beam' may be the PUCCH default beam presented in embodiment 3.

Alternatively, when NC-JT is configured in the PDCCH transmission cell for scheduling HARQ-ACK, a transmission power parameter configuration for the PUCCH to be transmitted may be forced to be configured. For example, the UE may not expect that spatialRelationInfo of the PUCCH transmitted in the above case is not configured or activated.

Classification 1-3. The Case in which No NC-JT is Configured in a PDCCH Transmission Cell but NC-JT is Configured in a PUCCH Transmission Cell In such a corresponding classification, a target TRP may be designated even though no NC-JT is configured in the PDCCH transmission cell. For example, no CORESETPoolIndex may be designated in all CORESETs of the PDCCH transmission cell or the same CORESETPoolIndex may be designated. In this case, it may be required to apply the PUCCH default transmission power parameter configuration to the designated target TRP. In one example, a PUCCH default transmission power parameter configuration for a specific target TRP of the PUCCH transmission cell may be designated as one of beams of selected CORESETs, the selected CORESETs having a TRP index which is the same as the target TRP, for example, CORESETPoolIndex among the CORESETs configured for the PDCCH of the corresponding cell. A method of designating one of the beams of the selected CORESETs may include a method of selecting an index of a CORESET according to a specific reference. For example, a beam for a CORESET having the lowest index among the selected CORESETs may be designated.

Classification 1-4. The Case in which No NC-JT is Configured in Both a PDCCH Transmission Cell and a PUCCH Transmission Cell The case may follow the conventional single TRP operation.

The embodiments in classifications 1-1 to 1-4 have focused on the PUCCH transmission power parameter for convenience of description, but the description can be similarly applied to a transmission power parameter for another channel, that is, a PUSCH, an SRS, or a PRACH. At this time, the PUCCH transmission power parameter may be replaced with a transmission power parameter for the corresponding channel. For example, the pathloss RS for the PUCCH may be replaced with a pathloss RS for the PUSCH. Meanwhile, a parameter inherently used in a specific channel may be added. For example, mapping between the TRP and the SRS resource set may be added for SRS transmission power control. As described above, since the SRS transmission power is controlled in units of resource sets, a first TRP index may correspond to SRS resource set #0 in uplink multi-TRP transmission, a second TRP index may correspond to SRS resource set #1, and SRS resources within the corresponding SRS resource set may be used for SRS transmission and PUSCH transmission. At this time, the first/second TRP index may be defined according to the above-described example, that is, CORESETPoolIndex.

Classification 2. Single PDCCH-Based NC-JT Transmission

The corresponding classification is targeted at the case in which single PDCCH-based NC-JT is configured in the PUCCH transmission cell, that is, a maximum of two TCI states are mapped to one TCI codepoint of the PDSCH of the corresponding cell. At this time, NC-JT transmission may be applied not only to the PDSCH but also to at least one of a PDCCH, a PUCCH, a PUSCH. The application of NC-JT transmission to the PDCCH, the PUSCH, or the PUSCH may mean that the channel is repeatedly transmitted from two or more cells/TRPs/beams or to cells/TRPs/beams.

In this case, the default transmission power parameter for uplink transmission may be implicitly induced from a TCI state having the lowest index among TCI states activated in the PDSCH in which case the TCI state having the lowest index may be at least one of the following interpretations.

Interpretation 1. The TCI state has the lowest TCI state ID among TCI states activated by a MAC-CE in a list of TCI states configured within PDSCH-Config in RRC IE, that is, a list of TCI states including tci-StatesToAddModList and tci-StatesToReleaseList Interpretation 2. The TCI state corresponds to the lowest TCI codepoint among TCI states corresponding to respective TCI codepoints in DCI, activated by a MAC-CE Interpretation 3. The TCI state corresponds to the lowest TCI codepoint among TCI codepoints used for multi-TRP transmission in respective TCI codepoints in DCI activated by a MAC-CE, that is, TCI codepoints each of which has two activated TCI states.

The RS within the TCI state selected according to interpretation 1 to interpretation 3 may be used as the pathloss RS for uplink transmission. At this time, when there are two RSs within the TCI state, the RS selected as the pathloss RS may be a QCL-typeD RS. When there is no QCL-typeD RS like in FR1, that is, when only one RS exists within the TCI state, the RS selected as the pathloss RS may be an RS having one type of QCL-typeA/B/C.

Meanwhile, in the case of interpretation 3, the lowest TCI codepoint may indicate two TCI states in which case the number of default transmission power parameters for uplink transmission may be two. At this time, the two transmission power parameters may be used for uplink transmission to different TRPs. For example, when the PUCCH is repeatedly transmitted to the multi-TRP, one of the two transmission power parameters may be selected for each PUCCH transmission occasion. The relation between the PUCCH transmission occasion and the TRP and the relation between the TRP and the transmission power parameter may be pre-configured by the BS or pre-appointed between the BS and the UE. For example, when the PUCCH is repeatedly transmitted to the multi-TRP N times, the mapping relation indicating a TRP to which a specific PUCH transmission occasion is transmitted may be pre-configured. The pre-configuration may be defined in the form of {first transmission occasion→TRP #1}, {second transmission occasion→TRP #2}, {third transmission occasion→TRP

1}, . . . , that is, as the cyclical mapping relation. Alternatively, the pre-configuration may be defined in the form of {first transmission occasion→TRP #1}, {second transmission occasion→TRP #1}, {third transmission occasion→TRP #2}, . . . , that is, as the sequential mapping relation. Subsequently, the relation between the TRP and the transmission power parameter may be defined in the form in which an RS for a first TCI state is used as the transmission power parameter in TRP #1 and an RS for a second TCI state is used as the transmission power parameter in TRP #2. As a result, the relation between the PUCCH transmission occasion and the transmission power parameter may be defined in which case the TRP relation may be omitted. That is, the form of {first transmission occasion→transmission power parameter #1}, {second transmission occasion→transmission power parameter #2}, {third transmission occasion→transmission power parameter #1}, . . . , may be defined in the cyclical mapping relation, and the form of {first transmission occasion→transmission power parameter #1}, {second transmission occasion→transmission power parameter #1}, {third transmission occasion→transmission power parameter #2}, . . . , may be defined in the sequential mapping relation.

In the case of interpretation 3, the pathloss RS may implicitly use the RS within the TCI state, and the remaining transmission power parameters may use preconfigured values. For example, $P_{0\text{-}NOMINAL\text{-}PUCCH}$ or $P_{0\text{-}UE\text{-}PUCCH}(q_u)$ within $P_{0\text{-}PUCCH,b,f,c}(q_u)$ may be provided independently for each target TRP. For example, $P_{0\text{-}NOMINAL\text{-}PUCCH}$ corresponding to each TRP index may be independently configured through RRC. Further, $P_{0\text{-}UE\text{-}PUCCH}(q_u)$ may be indicated through a parameter p0-Set within PUCCH-PowerControl IE in Table 38, and the parameter p0-Set includes a list containing a plurality of pairs of {P0-PUCCH-Id, $P_{0\text{-}UE\text{-}PUCCH}(q_u)$}, and thus the connection relation between the TRP index for PUCCH transmission and the pair may be configured after pairs of {P0-PUCCH-Id, $P_{0\text{-}UE\text{-}PUCCH}(q_u)$} are configured as many as the number of TRPs within the list. The connection relation may be predefined. For example, a pair for P0-PUCCH-Id having the lowest value may be connected to a first TRP index, and a pair for a second P0-PUCCH-Id may be connected to a second TRP index. At this time, the first/second TRP index may be obtained through the mapping relation between the PUCCH transmission occasion and the TRP.

Further, for PUCCH closed loop power control $g_{b,f,c}(i, l)$, two or more PUCCH closed loop power controls may be configured or assumed for the purpose of multi-TRP power control. An index of the closed loop power control may be configured as 0 or 1, and the connection relation between the closed loop power control index and the TRP index may be established. The connection relation may be predefined. For example, closed loop power control index 0 may be connected to a first TRP index, and closed loop power control index 1 may be connected to a second TRP index. At this time, the first/second TRP index may be obtained through the mapping relation between the PUCCH transmission occasion and the TRP.

The embodiment in classification 2 has focused on the PUCCH transmission power parameter for convenience of description, but the description can be similarly applied to a transmission power parameter for another channel, that is, a PUSCH, an SRS, or a PRACH. At this time, the PUCCH transmission power parameter may be replaced with a transmission power parameter for the corresponding channel. For example, the pathloss RS for the PUCCH may be replaced with a pathloss RS for the PUSCH. Meanwhile, a parameter inherently used in a specific channel may be added. For example, mapping between the TRP and the SRS resource set may be added for SRS transmission power control. As described above, since the SRS transmission power is controlled in units of resource sets, a first TRP index may correspond to SRS resource set #0 in uplink multi-TRP transmission, a second TRP index may correspond to SRS resource set #1, and SRS resources within the corresponding SRS resource set may be used for SRS transmission and PUSCH transmission. At this time, the first/second TRP index may be defined according to the above-described example, that is, mapping between the transmission occasion and the TRP.

Figure 22:
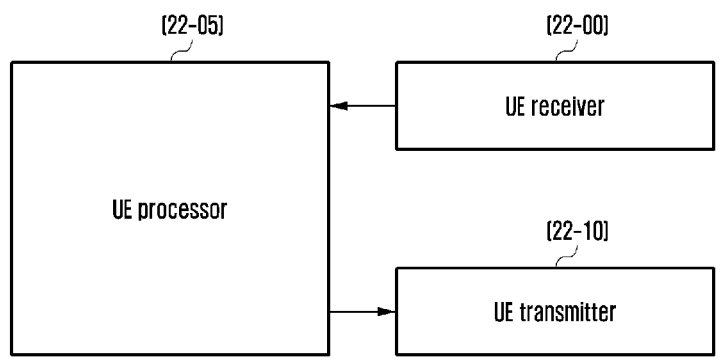
FIG. 22 illustrates the structure of the UE in a wireless communication system according to an embodiment of the disclosure.

FIG. 22 illustrates the structure of the UE in a wireless communication system according to an embodiment of the disclosure.

Referring to FIG. 22, the UE may include a transceiver including a UE receiver 22-00 and a UE transmitter 22-10, a memory (not shown), and a UE processor 22-05 (or a UE controller or a processor). The transceiver 22-00 and 22-10 of the UE, the memory, and the UE processor 22-05 may operate according to the above-described communication method of the UE. However, the elements of the UE are not limited to the above example. For example, the UE may include more or fewer elements than the above elements. Further, the transceiver, the memory, and the processor may be implemented in the form of a single chip.

The transceiver may transmit and receive a signal to and from the BS. The signals may include control information and data. To this end, the transceiver may include an RF transmitter for up-converting and amplifying a frequency of the transmitted signal and an RF receiver for low-noise amplifying the received signal and down-converting the frequency. However, this is only an embodiment of the transceiver, and the elements of the transceiver are not limited to the RF transmitter and the RF receiver.

Further, the transceiver may receive a signal through a radio channel, output the signal to the processor, and transmit the signal output from the processor through the radio channel.

The memory may store a program and data required for the operation of the UE. Further, the memory may store control information or data included in the signal transmitted and received by the UE. The memory may be configured by storage media such as ROM, RAM, hard disc, CD-ROM, and DVD, or a combination of the storage media. The number of memories may be plural.

The processor may control a series of processes to make the UE operate according to the various embodiments of the disclosure. For example, the processor may control elements of the UE to receive DCI including two layers and simultaneously receive a plurality of PDSCHs. The number of processors may be plural, and the processor may perform an operation of controlling the elements of the UE by executing the program stored in the memory.

Figure 23:
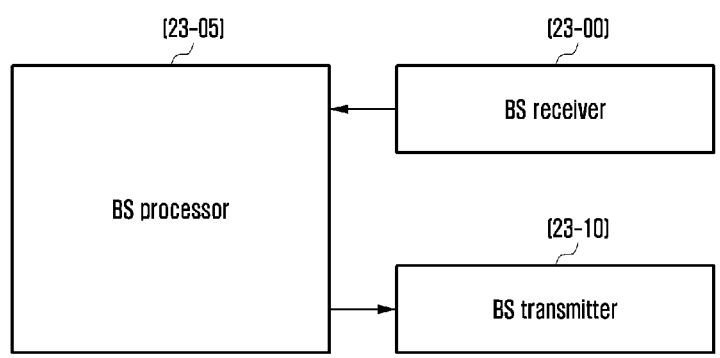
FIG. 23 illustrates the structure of the BS in a wireless communication system according to an embodiment of the disclosure.

FIG. 23 illustrates the structure of the BS in a wireless communication system according to an embodiment of the disclosure.

Referring to FIG. 23, the BS may include a transceiver including a BS receiver 23-00 and a BS transmitter 23-10, a memory (not shown), and a BS processor 23-05 (BS controller or processor). The transceiver 23-00 and 23-10 of the BS, the memory, and the BS processor 23-05 may operate according to the communication method of the BS. However, the elements of the BS are not limited to the above example. For example, the BS may include more or fewer elements than the above-described elements. Further, the transceiver, the memory, and the processor may be implemented in the form of a single chip.

The transceiver may transmit and receive a signal to and from the UE. The signals may include control information and data. To this end, the transceiver may include an RF transmitter for up-converting and amplifying a frequency of the transmitted signal and an RF receiver for low-noise amplifying the received signal and down-converting the frequency. However, this is only an embodiment of the transceiver, and elements of the transceiver are not limited to the RF transmitter and the RF receiver.

The transceiver may receive a signal through a radio channel, output the signal to the processor, and transmit the signal output from the processor through the radio channel.

The memory may store a program and data required for the operation of the BS. The memory may store control information or data included in a signal transmitted and received by the BS. The memory may be configured by storage media such as ROM, RAM, hard disc, CD-ROM, and DVD, or a combination of the storage media. The number of memories may be plural.

The processor may control a series of processes to make the BS operate according to the various embodiments of the disclosure. For example, the processor may configure DCI of two layers including allocation information of a plurality of PDSCHs and control each element of the BS to transmit the DCI. The number of processors may be plural, and the processor may perform an operation of controlling the elements of the BS by executing the program stored in the memory.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a random access memory and a flash memory, a read only memory (ROM), an electrically erasable programmable read only memory (EEPROM), a magnetic disc storage device, a compact disc-ROM (CD-ROM), digital versatile discs (DVDs), or other type optical storage devices, or a magnetic cassette. Alternatively, any combination of some or all of them may form a memory in which the program is stored. Further, a plurality of such memories may be included in the electronic device.

In addition, the programs may be stored in an attachable storage device which may access the electronic device through communication networks such as the Internet, Intranet, Local Area Network (LAN), Wide LAN (WLAN), and Storage Area Network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for the convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings are merely specific examples that have been presented to easily explain the technical contents of the disclosure and help understanding of the disclosure, and are not intended to limit the scope of the disclosure. That is, it will be apparent to those skilled in the art that other variants based on the technical idea of the disclosure may be implemented. Further, the above respective embodiments may be employed in combination, as necessary. For example, a part of one embodiment of the disclosure may be combined with a part of another embodiment to operate a base station and a terminal. As an example, a part of embodiment 1 of the disclosure may be combined with a part of embodiment 2 to operate a base station and a terminal. Further, although the above embodiments have been described by way of the FDD LTE system, other variants based on the technical idea of the embodiments may also be implemented in other systems such as TDD LTE, 5G, and NR systems.

In the drawings in which methods of the disclosure are described, the order of the description does not always correspond to the order in which steps of each method are performed, and the order relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

The invention claimed is:

1. A method performed by a user equipment (UE) in a communication system, the method comprising:
    determining a spatial domain filter for a physical uplink control channel (PUCCH) transmission based on a control resource set (CORESET) with a lowest index among a plurality of CORESETs in a cell in case of identifying that (i) a pathloss reference signal is not configured, (ii) spatial relation information for the PUCCH transmission is not configured and (iii) two control resource set (CORESET) pool indexes are not configured; and
    transmitting, to a base station, the PUCCH transmission using the spatial domain filter,
    wherein in case that two transmission configuration indication (TCI) states are activated for the CORESET by a UE-specific physical downlink control channel (PDCCH) medium access control (MAC) control element (CE) for the CORESET, the spatial domain filter is determined further based on a first TCI state among the two TCI states.

2. The method of claim 1,
    wherein the plurality of CORESETs is associated with a same CORESET pool index.

3. The method of claim 1, further comprising:
    receiving a beam list configuration related to each of the plurality of CORESETs; and configuring a downlink beam corresponding to each CORESET as a default beam for an uplink, based on the beam list configuration.

4. The method of claim 1, wherein the UE-specific PDCCH MAC CE includes the two TCI states and a CORESET index of the CORESET.

5. A method performed by a base station in a communication system, the method comprising:
transmitting, to a user equipment (UE), a UE-specific physical downlink control channel (PDCCH) medium access control (MAC) control element (CE); and
receiving, from the UE, a physical uplink control channel (PUCCH) transmission,
wherein in case that (i) a pathloss reference signal is not configured to the UE, (ii) spatial relation information for the PUCCH transmission is not configured to the UE and (iii) two control resource set (CORESET) pool indexes are not configured to the UE, the PUCCH corresponds to a spatial domain filter for the PUCCH transmission,
wherein the spatial domain filter is associated with a CORESET with a lowest index among a plurality of CORESETs in a cell, and
wherein in case that two transmission configuration indication TCI states are activated for the CORESET by the UE-specific PDCCH MAC CE for the CORESET, the spatial domain filter is further associated with a first TCI state among the two TCI states.

6. The method of claim 5,
wherein the plurality of CORESETs is associated with a same CORESET pool index.

7. The method of claim 5, further comprising:
transmitting, to the UE, a beam list configuration related to each of the plurality of CORESETs,
wherein a downlink beam corresponding to each CORESET is configured as a default beam for an uplink, based on the beam list configuration.

8. The method of claim 5, wherein the UE-specific PDCCH MAC CE includes the two TCI states and a CORESET index of the CORESET.

9. A user equipment (UE) in a communication system, the UE comprising:
a transceiver; and
a processor coupled with the transceiver and configured to:
determine a spatial domain filter for a physical uplink control channel (PUCCH) transmission based on a control resource set (CORESET) with a lowest index among a plurality of CORESETs in a cell in case of identifying that (i) a pathloss reference signal is not configured, (ii) spatial relation information for the PUCCH transmission is not configured and (iii) two control resource set (CORESET) pool indexes are not configured; and
transmit, to a base station, the PUCCH transmission using the spatial domain filter,
wherein, in case that two transmission configuration indication (TCI) states are activated for the CORESET by a UE-specific physical downlink control channel (PDCCH) medium access control (MAC) control element (CE) for the CORESET, the spatial domain filter is determined further based on a first TCI state among the two TCI states.

10. The UE of claim 9,
wherein the plurality of CORESETs is associated with a same CORESET pool index.

11. The UE of claim 9, wherein the processor is further configured to:
receive a beam list configuration related to each of the plurality of CORESETs, and
configure a downlink beam corresponding to each CORESET as a default beam for an uplink, based on the beam list configuration.

12. The UE of claim 9, wherein the UE-specific PDCCH MAC CE includes the two TCI states and a CORESET index of the CORESET.

13. A base station in a communication system, the base station comprising:
a transceiver; and
a processor coupled with the transceiver and configured to:
transmit, to a user equipment (UE), a UE-specific physical downlink control channel (PDCCH) medium access control (MAC) control element (CE); and
receive, from the UE, a physical uplink control channel (PUCCH) transmission,
wherein in case that (i) a pathloss reference signal is not configured to the UE, (ii) spatial relation information for the PUCCH transmission is not configured to the UE and (iii) two control resource set (CORESET) pool indexes are not configured to the UE, the PUCCH corresponds to a spatial domain filter for the PUCCH transmission,
wherein the spatial domain filter is associated with a CORESET with a lowest index among a plurality of CORESETs in a cell, and
wherein in case that two transmission configuration indication TCI states are activated for the CORESET by the UE-specific PDCCH MAC CE for the CORESET, the spatial domain filter is further associated with a first TCI state among the two TCI states.

14. The base station of claim 13,
wherein the processor is further configured to transmit, to the UE, a beam list configuration related to each of the plurality of CORESETs,
wherein a downlink beam corresponding to each CORESET is configured as a default beam for an uplink, based on the beam list configuration, and
wherein the plurality of CORESETs is associated with a same CORESET pool index.

15. The base station of claim 13, wherein the UE-specific PDCCH MAC CE includes the two TCI states and a CORESET index of the CORESET.

* * * * *